(12) United States Patent (10) Patent No.: US 8,713,641 B1
Pagan et al. (45) Date of Patent: Apr. 29, 2014

(54) SYSTEMS AND METHODS FOR AUTHORIZING, AUTHENTICATING AND ACCOUNTING USERS HAVING TRANSPARENT COMPUTER ACCESS TO A NETWORK USING A GATEWAY DEVICE

(75) Inventors: Florence C. I. Pagan, Los Angeles, CA (US); Joel E. Short, Los Angeles, CA (US)

(73) Assignee: Nomadix, Inc., Agoura Hills, CA (US)

( * ) Notice: Subject to any disclaimer, the term of this patent is extended or adjusted under 35 U.S.C. 154(b) by 0 days.

(21) Appl. No.: 09/458,602

(22) Filed: Dec. 8, 1999

Related U.S. Application Data

(60) Provisional application No. 60/111,497, filed on Dec. 8, 1998.

(51) Int. Cl.
*G06F 7/04* (2006.01)

(52) U.S. Cl.
USPC ............................................ 726/4; 713/153

(58) Field of Classification Search
USPC ................. 713/153, 154, 155, 168, 201, 202; 709/220, 225, 226, 228, 229; 726/4, 5, 726/7, 8, 15, 26, 27
See application file for complete search history.

(56) References Cited

U.S. PATENT DOCUMENTS

| | | | |
|---|---|---|---|
| 4,026,642 A | 5/1977 | Tanaka et al. |
| 4,233,661 A | 11/1980 | Bolton et al. |
| 4,509,277 A | 4/1985 | Bolton |
| 4,649,533 A | 3/1987 | Chorley et al. |
| 4,654,793 A | 3/1987 | Elrod |
| 4,677,588 A | 6/1987 | Benjamin |
| 4,691,346 A | 9/1987 | Vanacore |
| 4,757,267 A | 7/1988 | Riskin |
| 4,806,743 A | 2/1989 | Thenery |
| 4,811,011 A | 3/1989 | Sollinger |
| 4,816,654 A | 3/1989 | Anderl et al. |
| 5,019,697 A | 5/1991 | Postman |
| 5,030,807 A | 7/1991 | Landt et al. |
| 5,065,393 A | 11/1991 | Sibbitt |
| 5,113,499 A | 5/1992 | Ankney et al. |

(Continued)

FOREIGN PATENT DOCUMENTS

AU 2003255101 3/2004
AU 2006207853 11/2007

(Continued)

OTHER PUBLICATIONS

Acsend Communications Inc., Virtual Private Networks, 1997.*

(Continued)

*Primary Examiner* — Beemnet Dada
(74) *Attorney, Agent, or Firm* — Knobbe Martens Olson & Bear LLP

(57) ABSTRACT

A system and method for authorizing, authenticating and accounting users having transparent access to a destination network, wherein the users otherwise have access to a home network through home network settings resident on the user's computers, and wherein the users can access the destination network without altering the home network settings and without installing software on the user's computer. The system includes a gateway device for receiving a request from a user for access to the destination network, and means for identifying an attribute associated with the user based upon a packet received by the gateway device, wherein the packet is transmitted from the user's computer, and wherein the user's computer is configured for accessing the home network.

88 Claims, 13 Drawing Sheets

(56) References Cited

U.S. PATENT DOCUMENTS

| | | |
|---|---|---|
| 5,124,984 A | 6/1992 | Engel |
| 5,142,622 A | 8/1992 | Owens |
| 5,148,389 A | 9/1992 | Hughes |
| 5,149,945 A | 9/1992 | Johnson et al. |
| 5,159,592 A | 10/1992 | Perkins |
| 5,166,931 A | 11/1992 | Riddle |
| 5,185,860 A | 2/1993 | Wu |
| 5,221,838 A | 6/1993 | Gutman et al. |
| 5,226,120 A | 7/1993 | Brown et al. |
| 5,235,595 A | 8/1993 | O'Dowd |
| 5,243,652 A * | 9/1993 | Teare et al. .................. 380/250 |
| 5,251,207 A | 10/1993 | Abensour et al. |
| 5,253,161 A | 10/1993 | Nemirovsky et al. |
| 5,258,906 A | 11/1993 | Kroll |
| 5,280,581 A | 1/1994 | Bathrick et al. |
| 5,287,269 A | 2/1994 | Dorrough et al. |
| 5,287,461 A | 2/1994 | Moore |
| 5,289,371 A | 2/1994 | Abel et al. |
| 5,289,536 A | 2/1994 | Hokari |
| 5,293,488 A | 3/1994 | Riley |
| 5,309,437 A | 5/1994 | Perlman et al. |
| 5,319,648 A | 6/1994 | Bux et al. |
| 5,321,395 A | 6/1994 | Van Santbrink |
| 5,325,362 A | 6/1994 | Aziz |
| 5,329,619 A | 7/1994 | Page |
| 5,334,821 A | 8/1994 | Campo et al. |
| 5,335,268 A | 8/1994 | Kelly, Jr. et al. |
| 5,337,352 A | 8/1994 | Kobayashi et al. |
| 5,351,186 A | 9/1994 | Bullock et al. |
| 5,369,705 A | 11/1994 | Bird |
| 5,371,852 A | 12/1994 | Attanasio et al. |
| 5,377,060 A | 12/1994 | Nigam |
| 5,406,555 A | 4/1995 | Yoshida |
| 5,410,543 A | 4/1995 | Seitz et al. |
| 5,412,654 A | 5/1995 | Perkins |
| 5,420,862 A | 5/1995 | Perlman |
| 5,425,029 A | 6/1995 | Hluchyj et al. |
| 5,425,085 A | 6/1995 | Weinberger et al. |
| 5,426,427 A | 6/1995 | Chinnock et al. |
| 5,430,782 A | 7/1995 | Brady et al. |
| 5,432,789 A | 7/1995 | Armstrong et al. |
| 5,442,633 A | 8/1995 | Perkins et al. |
| 5,446,735 A | 8/1995 | Tobagi et al. |
| 5,448,623 A | 9/1995 | Wiedeman et al. |
| 5,481,542 A | 1/1996 | Logston |
| 5,490,139 A | 2/1996 | Baker et al. |
| 5,490,252 A | 2/1996 | Macera |
| 5,517,618 A | 5/1996 | Wada et al. |
| 5,517,622 A | 5/1996 | Ivanoff et al. |
| 5,519,769 A | 5/1996 | Weinberger et al. |
| 5,526,489 A | 6/1996 | Nilakantan |
| 5,533,026 A | 7/1996 | Ahmadi |
| 5,538,007 A | 7/1996 | Gorman |
| 5,539,736 A | 7/1996 | Johnson et al. |
| 5,548,646 A | 8/1996 | Aziz |
| 5,550,984 A | 8/1996 | Gelb |
| 5,553,223 A | 9/1996 | Greenlee et al. |
| 5,557,677 A | 9/1996 | Prytz |
| 5,557,748 A | 9/1996 | Norris |
| 5,572,528 A | 11/1996 | Shuen |
| 5,574,779 A | 11/1996 | Ely |
| 5,583,864 A | 12/1996 | Lightfoot |
| 5,586,121 A | 12/1996 | Moura et al. |
| 5,586,269 A | 12/1996 | Kubo |
| 5,592,537 A | 1/1997 | Moen |
| 5,596,722 A | 1/1997 | Rahnema |
| 5,597,693 A | 1/1997 | Evans et al. |
| 5,598,536 A | 1/1997 | Slaughter |
| 5,602,991 A | 2/1997 | Berteau |
| 5,604,896 A | 2/1997 | Duxbury |
| 5,606,668 A | 2/1997 | Shwed |
| 5,608,786 A | 3/1997 | Gordon |
| 5,612,730 A | 3/1997 | Lewis |
| 5,615,339 A | 3/1997 | Ban |
| 5,617,540 A | 4/1997 | Civanlar et al. |
| 5,617,565 A | 4/1997 | Augenbraun et al. |
| 5,623,600 A | 4/1997 | Ji et al. |
| 5,623,601 A | 4/1997 | Vu |
| 5,633,868 A | 5/1997 | Baldwin et al. |
| 5,633,999 A | 5/1997 | Clowes |
| 5,636,216 A | 6/1997 | Fox et al. |
| 5,636,371 A | 6/1997 | Yu |
| 5,644,719 A | 7/1997 | Aridas |
| 5,649,001 A | 7/1997 | Thomas |
| 5,651,002 A | 7/1997 | Van Seters et al. |
| 5,651,058 A | 7/1997 | Hackett-Jones et al. |
| 5,652,908 A | 7/1997 | Douglas |
| 5,657,452 A | 8/1997 | Kralowetz |
| 5,659,684 A | 8/1997 | Giovannoni |
| 5,664,102 A | 9/1997 | Faynberg |
| 5,664,228 A | 9/1997 | Mital |
| 5,678,041 A | 10/1997 | Baker |
| 5,694,549 A | 12/1997 | Carlin et al. |
| 5,696,898 A | 12/1997 | Baker et al. |
| 5,696,899 A | 12/1997 | Kalwitz |
| 5,699,520 A | 12/1997 | Hodgson |
| 5,708,654 A | 1/1998 | Arndt et al. |
| 5,708,655 A | 1/1998 | Toth et al. |
| 5,708,780 A * | 1/1998 | Levergood et al. ........... 709/229 |
| 5,710,883 A | 1/1998 | Hong et al. |
| 5,717,737 A | 2/1998 | Doviak |
| 5,724,355 A | 3/1998 | Bruno et al. |
| 5,724,510 A | 3/1998 | Arndt |
| 5,727,159 A | 3/1998 | Kikinis |
| 5,727,950 A | 3/1998 | Cook et al. |
| 5,740,171 A | 4/1998 | Mazzola et al. |
| 5,742,604 A | 4/1998 | Edsall et al. |
| 5,742,668 A | 4/1998 | Pepe et al. |
| 5,742,762 A | 4/1998 | Scholl et al. |
| 5,744,789 A | 4/1998 | Kashi |
| 5,745,699 A | 4/1998 | Lunn et al. |
| 5,745,884 A | 4/1998 | Carnegie et al. |
| 5,749,075 A | 5/1998 | Toader et al. |
| 5,751,961 A | 5/1998 | Smyk |
| 5,751,971 A | 5/1998 | Dobbins et al. |
| 5,754,774 A | 5/1998 | Bittinger et al. |
| 5,757,784 A | 5/1998 | Liebowitz |
| 5,757,924 A | 5/1998 | Friedman et al. |
| 5,758,083 A | 5/1998 | Singh et al. |
| 5,758,186 A | 5/1998 | Hamilton |
| 5,761,309 A | 6/1998 | Ohashi et al. |
| 5,761,683 A | 6/1998 | Logan et al. |
| 5,764,890 A | 6/1998 | Glasser |
| 5,768,384 A | 6/1998 | Berson |
| 5,774,535 A | 6/1998 | Castro |
| 5,774,668 A | 6/1998 | Choquier |
| 5,774,869 A | 6/1998 | Toader |
| 5,781,189 A | 7/1998 | Holleran et al. |
| 5,781,550 A | 7/1998 | Templin et al. |
| 5,781,552 A | 7/1998 | Hashimoto |
| 5,781,909 A | 7/1998 | Logan et al. |
| 5,787,483 A | 7/1998 | Jam et al. |
| 5,790,541 A | 8/1998 | Patrick et al. |
| 5,790,548 A | 8/1998 | Sistanizadeh |
| 5,790,800 A | 8/1998 | Gauvin et al. |
| 5,793,762 A | 8/1998 | Penners et al. |
| 5,793,763 A | 8/1998 | Mayes et al. |
| 5,793,966 A | 8/1998 | Amstein et al. |
| 5,793,978 A | 8/1998 | Fowler |
| 5,794,221 A | 8/1998 | Egendorf |
| 5,796,952 A | 8/1998 | Davis et al. |
| 5,798,706 A | 8/1998 | Kraemer et al. |
| 5,802,047 A | 9/1998 | Kinoshita |
| 5,802,285 A | 9/1998 | Hirviniemi |
| 5,802,310 A | 9/1998 | Rajaraman |
| 5,802,320 A | 9/1998 | Baehr et al. |
| 5,802,454 A | 9/1998 | Goshay et al. |
| 5,802,502 A | 9/1998 | Gell et al. |
| 5,805,803 A * | 9/1998 | Birrell et al. .................... 726/12 |
| 5,806,043 A | 9/1998 | Toader |
| 5,809,415 A | 9/1998 | Rossmann |
| 5,812,531 A | 9/1998 | Cheung et al. |
| 5,812,776 A | 9/1998 | Gifford |
| 5,812,786 A | 9/1998 | Seazholtz |

(56) References Cited

U.S. PATENT DOCUMENTS

| | | |
|---|---|---|
| 5,812,819 A | 9/1998 | Rodwin |
| 5,815,664 A | 9/1998 | Asano |
| 5,818,845 A | 10/1998 | Moura et al. |
| 5,822,526 A | 10/1998 | Waskiewicz |
| 5,825,772 A | 10/1998 | Dobbins et al. |
| 5,832,229 A | 11/1998 | Tomoda |
| 5,835,061 A | 11/1998 | Stewart |
| 5,835,720 A | 11/1998 | Nelson et al. |
| 5,835,724 A | 11/1998 | Smith |
| 5,835,725 A | 11/1998 | Chiang |
| 5,835,727 A | 11/1998 | Wong |
| 5,841,769 A | 11/1998 | Okanoue et al. |
| 5,844,973 A | 12/1998 | Venkatraman |
| 5,845,070 A | 12/1998 | Ikudome |
| 5,848,233 A | 12/1998 | Radia |
| 5,852,812 A | 12/1998 | Reeder |
| 5,854,901 A | 12/1998 | Cole et al. |
| 5,856,974 A | 1/1999 | Gervais |
| 5,859,971 A | 1/1999 | Bittinger et al. |
| 5,862,325 A | 1/1999 | Reed et al. |
| 5,862,328 A | 1/1999 | Colyer |
| 5,862,345 A | 1/1999 | Okanoue et al. |
| 5,864,610 A | 1/1999 | Ronen |
| 5,864,683 A | 1/1999 | Boebert |
| 5,881,234 A | 3/1999 | Schwob |
| 5,884,035 A | 3/1999 | Butman et al. |
| 5,889,470 A | 3/1999 | Kaycee et al. |
| 5,889,958 A | 3/1999 | Willens |
| 5,893,077 A | 4/1999 | Griffin |
| 5,894,321 A | 4/1999 | Downs |
| 5,894,479 A | 4/1999 | Mohammed |
| 5,901,287 A | 5/1999 | Bull et al. |
| 5,903,732 A | 5/1999 | Reed |
| 5,909,441 A | 6/1999 | Alexander, Jr. et al. |
| 5,909,549 A | 6/1999 | Compliment et al. |
| 5,910,954 A | 6/1999 | Bronstein et al. |
| 5,915,093 A | 6/1999 | Berlin |
| 5,915,119 A | 6/1999 | Cone |
| 5,916,302 A | 6/1999 | Dunn |
| 5,918,016 A | 6/1999 | Brewer et al. |
| 5,918,018 A | 6/1999 | Gooderum |
| 5,920,699 A | 7/1999 | Bare |
| 5,922,049 A | 7/1999 | Radia |
| 5,923,853 A | 7/1999 | Danneels |
| 5,930,255 A | 7/1999 | Tsukamoto et al. |
| 5,931,917 A | 8/1999 | Nguyen |
| 5,936,542 A | 8/1999 | Kleinrock et al. |
| 5,938,726 A | 8/1999 | Reber et al. |
| 5,940,394 A | 8/1999 | Killian |
| 5,941,947 A | 8/1999 | Brown |
| 5,941,988 A | 8/1999 | Bhagwat |
| 5,946,308 A | 8/1999 | Dobbins et al. |
| 5,946,687 A | 8/1999 | Gehani |
| 5,948,061 A | 9/1999 | Merriman et al. |
| 5,949,875 A | 9/1999 | Walker |
| 5,950,195 A | 9/1999 | Stockwell et al. |
| 5,951,694 A | 9/1999 | Choquier |
| 5,953,398 A | 9/1999 | Hill |
| 5,958,015 A | 9/1999 | Dascalu |
| 5,958,018 A | 9/1999 | Eng |
| 5,960,409 A | 9/1999 | Wexler |
| 5,963,915 A | 10/1999 | Kirsch |
| 5,968,126 A | 10/1999 | Ekstrom |
| 5,968,176 A | 10/1999 | Nessett et al. |
| 5,969,678 A | 10/1999 | Stewart |
| 5,970,490 A | 10/1999 | Morgenstern |
| 5,978,387 A | 11/1999 | Sherman |
| 5,979,757 A | 11/1999 | Tracy et al. |
| 5,982,773 A | 11/1999 | Nishimura |
| 5,987,430 A | 11/1999 | van Horne et al. |
| 5,987,498 A | 11/1999 | Athing et al. |
| 5,987,523 A | 11/1999 | Hind |
| 5,987,611 A | 11/1999 | Freund |
| 5,991,292 A | 11/1999 | Focsaneanu et al. |
| 5,991,828 A | 11/1999 | Horie et al. |
| 5,999,536 A | 12/1999 | Kawafuji |
| 5,999,912 A | 12/1999 | Wodraz |
| 6,003,770 A | 12/1999 | Schilling |
| 6,006,258 A | 12/1999 | Kalajan |
| 6,006,272 A | 12/1999 | Aravamudan et al. |
| 6,011,782 A | 1/2000 | DeSimone |
| 6,012,083 A | 1/2000 | Savitzky |
| 6,012,088 A | 1/2000 | Li et al. |
| 6,014,698 A | 1/2000 | Griffiths |
| 6,018,771 A | 1/2000 | Hayden |
| 6,024,440 A | 2/2000 | Murthy et al. |
| 6,026,440 A | 2/2000 | Shrader et al. |
| 6,028,848 A | 2/2000 | Bhatia |
| 6,031,836 A | 2/2000 | Haserodt |
| 6,035,281 A | 3/2000 | Crosskey |
| 6,035,405 A | 3/2000 | Gage et al. |
| 6,038,233 A | 3/2000 | Hamamoto |
| 6,041,057 A | 3/2000 | Stone |
| 6,044,062 A | 3/2000 | Brownrigg |
| 6,047,051 A | 4/2000 | Ginzboorg et al. |
| 6,047,268 A * | 4/2000 | Bartoli et al. .................. 705/35 |
| 6,052,120 A | 4/2000 | Nahi et al. |
| 6,052,725 A | 4/2000 | McCann et al. |
| 6,055,236 A | 4/2000 | Nessett |
| 6,055,243 A | 4/2000 | Vincent |
| 6,058,389 A | 5/2000 | Chandra et al. |
| 6,058,418 A | 5/2000 | Kobata |
| 6,058,429 A | 5/2000 | Ames et al. |
| 6,061,334 A | 5/2000 | Berlovitch et al. |
| 6,061,349 A | 5/2000 | Coile |
| 6,061,356 A | 5/2000 | Terry |
| 6,061,650 A | 5/2000 | Malkin |
| 6,061,668 A | 5/2000 | Sharrow |
| 6,061,739 A | 5/2000 | Reed |
| 6,064,674 A * | 5/2000 | Doidge et al. ................. 370/398 |
| 6,070,187 A | 5/2000 | Subramaniam et al. |
| 6,070,191 A | 5/2000 | Narendran et al. |
| 6,070,243 A | 5/2000 | See et al. |
| 6,073,160 A | 6/2000 | Grantham |
| 6,073,175 A | 6/2000 | Tavs |
| 6,075,776 A | 6/2000 | Tanimoto et al. |
| 6,078,953 A | 6/2000 | Vaid et al. |
| 6,084,528 A | 7/2000 | Beach et al. |
| 6,085,247 A | 7/2000 | Parsons, Jr. et al. |
| 6,088,451 A | 7/2000 | He |
| 6,088,725 A | 7/2000 | Kondo et al. |
| 6,091,732 A | 7/2000 | Alexander |
| 6,092,196 A * | 7/2000 | Reiche ............................ 726/6 |
| 6,094,659 A | 7/2000 | Bhatia |
| 6,094,663 A | 7/2000 | Snow et al. |
| 6,098,172 A | 8/2000 | Coss et al. |
| 6,101,543 A | 8/2000 | Alden |
| 6,108,330 A | 8/2000 | Bhatia |
| 6,112,239 A | 8/2000 | Kenner et al. |
| 6,115,376 A * | 9/2000 | Sherer et al. .................. 370/389 |
| 6,115,545 A | 9/2000 | Mellquist |
| 6,119,160 A | 9/2000 | Zhang et al. |
| 6,119,161 A | 9/2000 | Lita et al. |
| 6,119,162 A | 9/2000 | Li et al. |
| 6,122,268 A | 9/2000 | Okanoue |
| 6,122,670 A * | 9/2000 | Bennett et al. ................ 709/236 |
| 6,128,298 A | 10/2000 | Wootton |
| 6,128,601 A | 10/2000 | Van Horne et al. |
| 6,128,664 A | 10/2000 | Yanagidate et al. |
| 6,128,739 A | 10/2000 | Fleming, III |
| 6,130,892 A | 10/2000 | Short et al. |
| 6,134,680 A | 10/2000 | Yeomans |
| 6,137,791 A | 10/2000 | Frid |
| 6,137,869 A | 10/2000 | Voit |
| 6,138,142 A | 10/2000 | Linsk |
| 6,138,144 A | 10/2000 | DeSimone |
| 6,138,162 A | 10/2000 | Pistriotto et al. |
| 6,141,010 A | 10/2000 | Hoyle |
| 6,141,653 A | 10/2000 | Conklin |
| 6,141,686 A | 10/2000 | Jackowski et al. |
| 6,141,690 A | 10/2000 | Weiman |
| 6,144,991 A | 11/2000 | England |
| 6,147,976 A | 11/2000 | Shand |
| 6,147,995 A | 11/2000 | Dobbins et al. |

(56) References Cited

U.S. PATENT DOCUMENTS

| | | | |
|---|---|---|---|
| 6,148,336 A | 11/2000 | Thomas et al. |
| 6,154,172 A | 11/2000 | Piccionelli |
| 6,154,764 A | 11/2000 | Nitta |
| 6,154,775 A | 11/2000 | Coss |
| 6,154,839 A | 11/2000 | Arrow |
| 6,157,377 A | 12/2000 | Shah-Nazaroff |
| 6,157,647 A | 12/2000 | Husak |
| 6,157,925 A | 12/2000 | Jenkins et al. |
| 6,157,946 A | 12/2000 | Itakura et al. |
| 6,157,953 A | 12/2000 | Chang |
| 6,158,008 A | 12/2000 | Maria |
| 6,160,874 A | 12/2000 | Dickerman |
| 6,161,139 A | 12/2000 | Win et al. |
| 6,166,730 A | 12/2000 | Goode |
| 6,167,445 A | 12/2000 | Gai et al. |
| 6,167,513 A | 12/2000 | Inoue |
| 6,173,322 B1 | 1/2001 | Hu |
| 6,175,867 B1 | 1/2001 | Taghadoss |
| 6,175,869 B1 | 1/2001 | Ahuja et al. |
| 6,181,699 B1 | 1/2001 | Crinion et al. |
| 6,182,141 B1 | 1/2001 | Blum et al. |
| 6,182,154 B1 | 1/2001 | Campagnoni |
| 6,189,030 B1 | 2/2001 | Kirsch et al. |
| 6,194,992 B1 | 2/2001 | Short et al. |
| 6,199,100 B1 | 3/2001 | Filepp |
| 6,201,962 B1 | 3/2001 | Sturniolo |
| 6,202,169 B1 | 3/2001 | Razzaghe-Ashrafi |
| 6,205,148 B1 | 3/2001 | Takahashi |
| 6,205,481 B1 | 3/2001 | Heddaya |
| 6,208,977 B1 | 3/2001 | Hernandez et al. |
| 6,212,560 B1 | 4/2001 | Fairchild |
| 6,219,694 B1 | 4/2001 | Lazaridis et al. |
| 6,219,786 B1 | 4/2001 | Cunningham |
| 6,219,790 B1 | 4/2001 | Lloyd |
| 6,223,205 B1 | 4/2001 | Harchol-Balter et al. |
| 6,223,286 B1 | 4/2001 | Hashimoto |
| 6,226,675 B1 | 5/2001 | Meltzer et al. |
| 6,226,677 B1 | 5/2001 | Slemmer |
| 6,226,752 B1 | 5/2001 | Gupta et al. |
| 6,232,764 B1 | 5/2001 | Rettig et al. |
| 6,233,604 B1 | 5/2001 | Van Horne et al. |
| 6,233,618 B1 | 5/2001 | Shannon |
| 6,233,686 B1 | 5/2001 | Zenchelsky et al. |
| 6,236,332 B1 | 5/2001 | Conkright et al. |
| 6,237,026 B1 | 5/2001 | Prasad |
| 6,237,037 B1 | 5/2001 | Larsson |
| 6,240,091 B1 | 5/2001 | Ginzboorg |
| 6,240,402 B1 | 5/2001 | Lynch-Aird |
| 6,240,513 B1 | 5/2001 | Friedman |
| 6,240,533 B1 | 5/2001 | Slemmer |
| 6,243,379 B1 | 6/2001 | Veerina et al. |
| 6,247,054 B1 | 6/2001 | Malkin |
| 6,249,527 B1 | 6/2001 | Verthein et al. |
| 6,249,820 B1 | 6/2001 | Dobbins |
| 6,253,327 B1 * | 6/2001 | Zhang et al. ............... 713/201 |
| 6,256,307 B1 | 7/2001 | Salmonson |
| 6,256,674 B1 | 7/2001 | Manning et al. |
| 6,259,405 B1 | 7/2001 | Stewart |
| 6,266,335 B1 | 7/2001 | Bhaskaran |
| 6,282,180 B1 | 8/2001 | Paneth |
| 6,286,038 B1 | 9/2001 | Reichmeyer et al. |
| 6,286,039 B1 | 9/2001 | van Horne et al. |
| 6,288,739 B1 | 9/2001 | Hales |
| 6,292,478 B1 | 9/2001 | Farris |
| 6,295,291 B1 | 9/2001 | Larkins |
| 6,298,383 B1 | 10/2001 | Gutman |
| 6,304,857 B1 | 10/2001 | Heindel |
| 6,307,836 B1 | 10/2001 | Jones et al. |
| 6,308,212 B1 | 10/2001 | Besaw |
| 6,308,213 B1 | 10/2001 | Valencia |
| 6,308,273 B1 | 10/2001 | Goertzel et al. |
| 6,310,886 B1 | 10/2001 | Barton |
| 6,311,275 B1 | 10/2001 | Jin |
| 6,317,790 B1 | 11/2001 | Bowker et al. |
| 6,317,837 B1 | 11/2001 | Kenworthy |
| 6,321,336 B1 | 11/2001 | Applegate |
| 6,326,918 B1 | 12/2001 | Stewart |
| 6,327,242 B1 | 12/2001 | Amicangioli et al. |
| 6,330,586 B1 | 12/2001 | Yates |
| 6,331,983 B1 | 12/2001 | Haggerty et al. |
| 6,338,046 B1 | 1/2002 | Saari et al. |
| 6,339,595 B1 | 1/2002 | Rekhter et al. |
| 6,343,066 B2 | 1/2002 | Magill et al. |
| 6,345,291 B2 | 2/2002 | Murphy, Jr. et al. |
| 6,349,289 B1 | 2/2002 | Peterson et al. |
| 6,353,614 B1 | 3/2002 | Borella et al. |
| 6,359,892 B1 | 3/2002 | Szlam |
| 6,366,893 B2 | 4/2002 | Hannula |
| 6,370,142 B1 | 4/2002 | Pitcher et al. |
| 6,377,982 B1 | 4/2002 | Rai |
| 6,377,990 B1 | 4/2002 | Slemmer et al. |
| 6,381,646 B2 | 4/2002 | Zhang |
| 6,381,650 B1 | 4/2002 | Peacock |
| 6,385,653 B1 | 5/2002 | Sitaraman et al. |
| 6,389,462 B1 | 5/2002 | Cohen |
| 6,393,466 B1 | 5/2002 | Hickman et al. |
| 6,393,468 B1 | 5/2002 | McGee |
| 6,393,484 B1 | 5/2002 | Massarani |
| 6,397,255 B1 | 5/2002 | Nurenberg et al. |
| 6,405,258 B1 | 6/2002 | Erimli et al. |
| 6,408,336 B1 * | 6/2002 | Schneider et al. ............. 709/229 |
| 6,410,543 B1 | 6/2002 | Strobel et al. |
| 6,412,073 B1 | 6/2002 | Rangan |
| 6,414,635 B1 | 7/2002 | Stewart et al. |
| 6,418,118 B1 | 7/2002 | Hay et al. |
| 6,418,324 B1 | 7/2002 | Doviak |
| 6,424,636 B1 | 7/2002 | Seazholtz |
| 6,424,659 B2 | 7/2002 | Viswanadham et al. |
| 6,425,003 B1 | 7/2002 | Herzog et al. |
| 6,427,170 B1 | 7/2002 | Sitaraman |
| 6,427,174 B1 | 7/2002 | Sitaraman et al. |
| 6,430,621 B1 | 8/2002 | Srikanth et al. |
| 6,434,619 B1 * | 8/2002 | Lim et al. ...................... 709/229 |
| 6,434,627 B1 | 8/2002 | Millet et al. |
| 6,438,125 B1 | 8/2002 | Brothers |
| 6,438,528 B1 | 8/2002 | Jensen |
| 6,438,578 B1 | 8/2002 | Schmid |
| 6,452,498 B2 | 9/2002 | Stewart |
| 6,453,353 B1 | 9/2002 | Win |
| 6,453,356 B1 | 9/2002 | Sheard et al. |
| 6,453,361 B1 | 9/2002 | Morris |
| 6,460,084 B1 | 10/2002 | Van Horne et al. |
| 6,463,051 B1 | 10/2002 | Ford |
| 6,463,473 B1 | 10/2002 | Gubbi |
| 6,463,474 B1 | 10/2002 | Fuh |
| 6,463,478 B1 | 10/2002 | Lau et al. |
| 6,466,076 B2 | 10/2002 | Yoshikawa |
| 6,466,976 B1 | 10/2002 | Alles |
| 6,466,981 B1 | 10/2002 | Levy |
| 6,466,986 B1 | 10/2002 | Sawyer et al. |
| 6,470,027 B1 | 10/2002 | Birrell |
| 6,470,385 B1 | 10/2002 | Nakashima et al. |
| 6,470,386 B1 | 10/2002 | Combar |
| 6,473,411 B1 | 10/2002 | Kumaki |
| 6,480,486 B2 | 11/2002 | Kikinis |
| 6,487,538 B1 | 11/2002 | Gupta |
| 6,487,605 B1 | 11/2002 | Leung |
| 6,490,620 B1 | 12/2002 | Ditmer et al. |
| 6,496,516 B1 | 12/2002 | Dabecki et al. |
| 6,496,704 B2 | 12/2002 | Yuan |
| 6,496,850 B1 | 12/2002 | Bowman-Amuah |
| 6,502,131 B1 | 12/2002 | Vaid et al. |
| 6,505,201 B1 | 1/2003 | Haitsuka et al. |
| 6,510,531 B1 | 1/2003 | Gibbons |
| 6,512,754 B2 | 1/2003 | Feder et al. |
| 6,513,060 B1 | 1/2003 | Nixon et al. |
| 6,515,989 B1 | 2/2003 | Ronneke |
| 6,516,416 B2 | 2/2003 | Gregg et al. |
| 6,519,636 B2 | 2/2003 | Engel |
| 6,519,643 B1 | 2/2003 | Foulkes |
| 6,523,028 B1 | 2/2003 | DiDomizio |
| 6,526,052 B1 | 2/2003 | Rijhsinghani et al. |
| 6,526,056 B1 | 2/2003 | Rekhter et al. |
| 6,535,493 B1 | 3/2003 | Lee et al. |

(56) References Cited

U.S. PATENT DOCUMENTS

| | | | |
|---|---|---|---|
| 6,535,511 B1 | 3/2003 | Rao |
| 6,539,395 B1 | 3/2003 | Gjerdingen et al. |
| 6,539,422 B1 | 3/2003 | Hunt et al. |
| 6,539,431 B1 | 3/2003 | Sitaraman et al. |
| 6,546,392 B1 | 4/2003 | Bahlmann |
| 6,546,425 B1 | 4/2003 | Hanson et al. |
| 6,549,220 B1 | 4/2003 | Hsu |
| 6,549,516 B1 | 4/2003 | Albert et al. |
| 6,553,178 B2 | 4/2003 | Abecassis |
| 6,557,038 B1 | 4/2003 | Becker |
| 6,563,793 B1 | 5/2003 | Golden et al. |
| 6,567,405 B1 | 5/2003 | Borella et al. |
| 6,571,221 B1 | 5/2003 | Stewart |
| 6,574,664 B1 | 6/2003 | Liu |
| 6,577,642 B1 | 6/2003 | Fijolek |
| 6,578,078 B1 | 6/2003 | Smith et al. |
| 6,580,717 B1 | 6/2003 | Higuchi |
| 6,584,505 B1 | 6/2003 | Howard |
| 6,587,880 B1 | 7/2003 | Saigo |
| 6,591,306 B1 | 7/2003 | Redlich |
| 6,597,693 B1 | 7/2003 | Leung |
| 6,598,167 B2 | 7/2003 | Devine et al. |
| 6,601,065 B1 | 7/2003 | Nelson et al. |
| 6,609,153 B1 | 8/2003 | Salkewicz |
| 6,609,154 B1 | 8/2003 | Fuh |
| 6,615,212 B1 | 9/2003 | Dutta et al. |
| 6,615,215 B1 | 9/2003 | Petty |
| 6,618,355 B1 | 9/2003 | Gulliford et al. |
| 6,618,398 B1 | 9/2003 | Marchetti et al. |
| 6,625,121 B1 | 9/2003 | Lau et al. |
| 6,625,645 B1 | 9/2003 | Van Horne |
| 6,633,899 B1 | 10/2003 | Coward |
| 6,636,504 B1 | 10/2003 | Albers |
| 6,636,894 B1 | 10/2003 | Short et al. |
| 6,640,251 B1 | 10/2003 | Wiget et al. |
| 6,643,701 B1 | 11/2003 | Aziz et al. |
| 6,654,808 B1 | 11/2003 | Chuah |
| 6,658,625 B1 | 12/2003 | Allen |
| 6,665,718 B1 | 12/2003 | Chuah |
| 6,667,968 B1 | 12/2003 | Tran |
| 6,671,379 B2 | 12/2003 | Nemirovski |
| 6,671,739 B1 | 12/2003 | Reed |
| 6,675,208 B1 | 1/2004 | Rai et al. |
| 6,681,330 B2 | 1/2004 | Bradford et al. |
| 6,687,732 B1 | 2/2004 | Bector |
| 6,691,227 B1 | 2/2004 | Gopal et al. |
| 6,694,437 B1 | 2/2004 | Pao et al. |
| 6,697,018 B2 | 2/2004 | Stewart |
| 6,701,350 B1 | 3/2004 | Mitchell |
| 6,701,361 B1 | 3/2004 | Meier |
| 6,711,146 B2 | 3/2004 | Yegoshin |
| 6,714,987 B1 | 3/2004 | Amin |
| 6,717,943 B1 | 4/2004 | Schwering |
| 6,724,767 B1 | 4/2004 | Chong et al. |
| 6,728,792 B2 | 4/2004 | Wagner |
| 6,728,884 B1 | 4/2004 | Lim |
| 6,728,920 B1 | 4/2004 | Ebersman |
| 6,731,612 B1 | 5/2004 | Koss |
| 6,732,176 B1 | 5/2004 | Stewart |
| 6,735,633 B1 | 5/2004 | Welch et al. |
| 6,735,691 B1 | 5/2004 | Capps |
| 6,738,371 B1 | 5/2004 | Ayres |
| 6,738,382 B1 | 5/2004 | West |
| 6,742,036 B1 | 5/2004 | Das et al. |
| 6,751,677 B1 | 6/2004 | Ilnicki |
| 6,754,831 B2 | 6/2004 | Brownell |
| 6,757,740 B1 | 6/2004 | Parekh et al. |
| 6,759,960 B2 | 7/2004 | Stewart |
| 6,760,416 B1 | 7/2004 | Banks |
| 6,760,444 B1 | 7/2004 | Leung |
| 6,771,609 B1 | 8/2004 | Gudat et al. |
| 6,771,661 B1 | 8/2004 | Chawla |
| 6,775,267 B1 | 8/2004 | Kung |
| 6,775,290 B1 | 8/2004 | Merchant et al. |
| 6,779,035 B1 | 8/2004 | Gbadegesin |
| 6,779,118 B1 | 8/2004 | Ikudome et al. |
| 6,785,704 B1 | 8/2004 | McCanne |
| 6,785,730 B1 | 8/2004 | Taylor |
| 6,789,110 B1 | 9/2004 | Short |
| 6,795,852 B1 | 9/2004 | Kleinrock et al. |
| 6,795,856 B1 | 9/2004 | Bunch |
| 6,810,426 B2 | 10/2004 | Mysore et al. |
| 6,822,954 B2 | 11/2004 | McConnell et al. |
| 6,822,955 B1 | 11/2004 | Brothers |
| 6,823,059 B2 | 11/2004 | Kalmanek |
| 6,826,694 B1 | 11/2004 | Dutta et al. |
| 6,829,239 B1 | 12/2004 | Bhatia et al. |
| 6,834,341 B1 | 12/2004 | Bahl |
| 6,839,757 B1 | 1/2005 | Romano |
| 6,850,532 B2 | 2/2005 | Thubert |
| 6,856,676 B1 | 2/2005 | Pirot et al. |
| 6,856,800 B1 | 2/2005 | Henry et al. |
| 6,857,009 B1 | 2/2005 | Ferreria |
| 6,868,399 B1 | 3/2005 | Short |
| 6,876,668 B1 | 4/2005 | Chawla |
| 6,892,226 B1 | 5/2005 | Tso |
| 6,901,433 B2 | 5/2005 | San Andres |
| 6,907,449 B2 | 6/2005 | Srinivasan |
| 6,915,345 B1 | 7/2005 | Tummala |
| 6,922,672 B1 | 7/2005 | Hailpern |
| 6,934,754 B2 | 8/2005 | West et al. |
| 6,937,597 B1 | 8/2005 | Rosenberg et al. |
| 6,944,661 B2 | 9/2005 | Moore et al. |
| 6,947,398 B1 | 9/2005 | Ahmed |
| 6,950,433 B1 | 9/2005 | Okamoto |
| 6,950,628 B1 | 9/2005 | Meier et al. |
| 6,961,762 B1 | 11/2005 | Yeap |
| 6,970,927 B1 | 11/2005 | Stewart |
| 6,983,327 B2 | 1/2006 | Koperda |
| 6,985,479 B2 | 1/2006 | Leung et al. |
| 6,993,595 B1 | 1/2006 | Luptowski et al. |
| 6,996,073 B2 | 2/2006 | West |
| 7,003,578 B2 | 2/2006 | Kanada et al. |
| 7,007,080 B2 | 2/2006 | Wilson |
| 7,009,556 B2 | 3/2006 | Stewart |
| 7,016,960 B2 | 3/2006 | Howard |
| 7,017,046 B2 | 3/2006 | Doyle et al. |
| 7,020,082 B2 | 3/2006 | Bhagavath et al. |
| 7,020,681 B1 | 3/2006 | Ayyagari et al. |
| 7,032,243 B2 | 4/2006 | Leerssen et al. |
| 7,035,248 B2 | 4/2006 | Wengrovitz |
| 7,043,532 B1 | 5/2006 | Humpleman et al. |
| 7,043,563 B2 | 5/2006 | Vange et al. |
| 7,047,415 B2 | 5/2006 | Doyle et al. |
| 7,051,087 B1 | 5/2006 | Bahl et al. |
| 7,058,594 B2 | 6/2006 | Stewart |
| 7,072,056 B1 | 7/2006 | Greaves et al. |
| 7,080,077 B2 | 7/2006 | Ramamurthy |
| 7,086,077 B2 | 8/2006 | Giammaressi |
| 7,086,085 B1 * | 8/2006 | Brown et al. ..................... 726/7 |
| 7,088,727 B1 | 8/2006 | Short et al. |
| 7,093,020 B1 | 8/2006 | McCarty et al. |
| 7,117,526 B1 | 10/2006 | Short |
| 7,120,678 B2 | 10/2006 | Greuel |
| 7,120,701 B2 | 10/2006 | Warrier et al. |
| 7,124,437 B2 | 10/2006 | Byrne |
| 7,126,915 B1 | 10/2006 | Lu |
| 7,139,268 B1 | 11/2006 | Bhagwat |
| 7,145,898 B1 | 12/2006 | Elliott |
| 7,151,758 B2 | 12/2006 | Kumaki |
| 7,159,035 B2 | 1/2007 | Garcia-Luna-Aceves |
| 7,185,360 B1 | 2/2007 | Anton et al. |
| 7,188,085 B2 | 3/2007 | Pelletier |
| 7,194,554 B1 | 3/2007 | Short |
| 7,197,556 B1 | 3/2007 | Short et al. |
| 7,210,035 B2 | 4/2007 | Doyle et al. |
| 7,216,043 B2 | 5/2007 | Ransom et al. |
| 7,216,152 B2 | 5/2007 | Short et al. |
| 7,225,249 B1 | 5/2007 | Barry |
| 7,240,106 B2 | 7/2007 | Cochran et al. |
| 7,269,653 B2 | 9/2007 | Mentze et al. |
| 7,272,639 B1 | 9/2007 | Levergood et al. |
| 7,283,542 B2 | 10/2007 | Mitchell |
| 7,287,071 B2 | 10/2007 | MacLean |

(56) References Cited

U.S. PATENT DOCUMENTS

| | | | |
|---|---|---|---|
| 7,289,763 B2 | 10/2007 | Denninson et al. |
| 7,293,077 B1 | 11/2007 | Teo |
| 7,313,631 B1 | 12/2007 | Sesmun et al. |
| 7,319,673 B1 | 1/2008 | Briscoe |
| 7,324,972 B1 | 1/2008 | Oliver |
| 7,325,063 B2 | 1/2008 | Dillon |
| 7,333,500 B2 | 2/2008 | Roshko |
| 7,336,960 B2 | 2/2008 | Zavalkovsky et al. |
| 7,349,982 B2 | 3/2008 | Hannum et al. |
| 7,356,841 B2 | 4/2008 | Wilson et al. |
| 7,359,395 B2 | 4/2008 | Toporek et al. |
| 7,373,655 B1 | 5/2008 | Maria |
| 7,376,113 B2 | 5/2008 | Taylor et al. |
| 7,401,120 B2 | 7/2008 | Walbeck |
| 7,428,413 B2 | 9/2008 | Fink |
| 7,437,474 B2 | 10/2008 | Iyer et al. |
| 7,472,191 B2 | 12/2008 | Stewart |
| 7,474,617 B2 | 1/2009 | Molen et al. |
| 7,493,084 B2 | 2/2009 | Meier et al. |
| 7,493,402 B2 | 2/2009 | McCarty et al. |
| 7,512,136 B2 | 3/2009 | Korotin |
| 7,526,538 B2 | 4/2009 | Wilson |
| 7,536,714 B2 | 5/2009 | Yuan |
| 7,539,291 B2 | 5/2009 | D'Angelo et al. |
| 7,552,090 B1 | 6/2009 | Barber |
| 7,554,995 B2 | 6/2009 | Short |
| 7,555,542 B1 | 6/2009 | Ayers et al. |
| 7,580,376 B2 | 8/2009 | West |
| 7,602,782 B2 | 10/2009 | Doviak |
| 7,685,311 B2 | 3/2010 | Friedman et al. |
| 7,689,710 B2 | 3/2010 | Tang et al. |
| 7,689,716 B2 | 3/2010 | Short et al. |
| 7,698,377 B2 | 4/2010 | Parekh et al. |
| 7,698,432 B2 | 4/2010 | Short et al. |
| 7,706,266 B2 | 4/2010 | Plamondon |
| 7,739,383 B1 | 6/2010 | Short et al. |
| 7,743,404 B1 | 6/2010 | Deutschmann et al. |
| 7,748,033 B2 | 6/2010 | Nita et al. |
| 7,752,334 B2 | 7/2010 | Paunikar et al. |
| 7,774,612 B1 | 8/2010 | Deutschmann et al. |
| 7,783,777 B1 | 8/2010 | Pabla et al. |
| 7,809,126 B2 | 10/2010 | Marascio et al. |
| 7,813,741 B2 | 10/2010 | Hendrey et al. |
| 7,818,454 B2 | 10/2010 | Kim et al. |
| 7,822,871 B2 | 10/2010 | Stolorz et al. |
| 7,822,873 B1 | 10/2010 | Paunikar |
| 7,844,729 B1 | 11/2010 | Friedman et al. |
| 7,953,857 B2 | 5/2011 | Short et al. |
| 7,954,144 B1 | 5/2011 | Ebrahimi et al. |
| 8,051,206 B2 | 11/2011 | Paunikar et al. |
| 8,156,246 B2 | 4/2012 | Short et al. |
| 8,190,708 B1 | 5/2012 | Short et al. |
| 8,234,409 B2 | 7/2012 | Paunikar et al. |
| 8,244,886 B2 | 8/2012 | Short et al. |
| 8,266,266 B2 | 9/2012 | Short et al. |
| 8,266,269 B2 | 9/2012 | Short et al. |
| 8,370,477 B2 | 2/2013 | Short et al. |
| 8,370,524 B2 | 2/2013 | Paunikar et al. |
| 8,516,083 B2 | 8/2013 | Short et al. |
| 2001/0003823 A1 | 6/2001 | Mighdoll et al. |
| 2001/0012282 A1 | 8/2001 | Yegoshin |
| 2001/0041571 A1 | 11/2001 | Yuan |
| 2001/0044818 A1 | 11/2001 | Liang |
| 2001/0047392 A1 | 11/2001 | Murphy, Jr. et al. |
| 2001/0054020 A1 | 12/2001 | Barth et al. |
| 2002/0006788 A1 | 1/2002 | Knutsson et al. |
| 2002/0016736 A1 | 2/2002 | Cannon et al. |
| 2002/0021689 A1 | 2/2002 | Robbins |
| 2002/0097674 A1 | 7/2002 | Balabhadrapatruni et al. |
| 2002/0116502 A1 | 8/2002 | Iyer et al. |
| 2002/0116523 A1 | 8/2002 | Warrier et al. |
| 2002/0133412 A1 | 9/2002 | Oliver et al. |
| 2002/0152311 A1 | 10/2002 | Veltman et al. |
| 2002/0178070 A1 | 11/2002 | Leveridge |
| 2003/0061619 A1 | 3/2003 | Giammaressi |
| 2003/0067911 A1 | 4/2003 | Kikinis |
| 2003/0069991 A1 | 4/2003 | Brescia |
| 2003/0083889 A1 | 5/2003 | Macklin |
| 2003/0204756 A1 | 10/2003 | Ransom et al. |
| 2004/0015572 A1 | 1/2004 | Kang |
| 2004/0030797 A1 | 2/2004 | Akinlar et al. |
| 2004/0039798 A1 | 2/2004 | Hotz et al. |
| 2004/0076144 A1 | 4/2004 | Ishidoshiro |
| 2004/0203752 A1 | 10/2004 | Wojaczynski et al. |
| 2005/0021943 A1 | 1/2005 | Ikudome |
| 2005/0102205 A1 | 5/2005 | Yamamoto |
| 2005/0114497 A1 | 5/2005 | Mani et al. |
| 2005/0143065 A1 | 6/2005 | Pathan et al. |
| 2005/0148342 A1 | 7/2005 | Sylvain |
| 2005/0260973 A1 | 11/2005 | van de Groenendaal |
| 2006/0026170 A1 | 2/2006 | Kreitler et al. |
| 2006/0080446 A1 | 4/2006 | Bahl |
| 2006/0089122 A1 | 4/2006 | Zavalkovsky et al. |
| 2006/0135155 A1 | 6/2006 | Chung et al. |
| 2006/0174019 A1 | 8/2006 | Ikudome |
| 2007/0011268 A1 | 1/2007 | Banga et al. |
| 2007/0162598 A1 | 7/2007 | Gorodyansky |
| 2007/0201702 A1 | 8/2007 | Hendricks |
| 2007/0266125 A1 | 11/2007 | Lu |
| 2007/0271598 A1 | 11/2007 | Chen et al. |
| 2007/0294417 A1 | 12/2007 | Ikudome |
| 2008/0148383 A1 | 6/2008 | Pitchaikani et al. |
| 2008/0271109 A1 | 10/2008 | Singh et al. |
| 2009/0024745 A1 | 1/2009 | Short et al. |
| 2011/0030037 A1 | 2/2011 | Olshansky et al. |
| 2011/0131339 A1 | 6/2011 | Brown et al. |
| 2012/0030737 A1 | 2/2012 | Pagan et al. |
| 2012/0185586 A1 | 7/2012 | Olshansky |
| 2012/0290724 A1 | 11/2012 | Noro et al. |
| 2012/0297459 A1 | 11/2012 | Olshansky et al. |
| 2012/0300788 A1 | 11/2012 | Olshansky et al. |
| 2013/0055358 A1 | 2/2013 | Short et al. |

FOREIGN PATENT DOCUMENTS

| | | |
|---|---|---|
| CA | 2 330 857 | 11/1999 |
| CA | 2 296 937 | 7/2000 |
| EP | 0 560 706 A2 | 9/1993 |
| EP | 0 573 739 A2 | 12/1993 |
| EP | 0742657 | 11/1996 |
| EP | 0 762 707 | 3/1997 |
| EP | 0 767 595 A1 | 4/1997 |
| EP | 0 848 338 A1 | 6/1998 |
| EP | 0873037 | 10/1998 |
| EP | 0 889 418 A2 | 1/1999 |
| EP | 0 901 301 A2 | 3/1999 |
| EP | 0 909 073 | 4/1999 |
| EP | 0912026 | 4/1999 |
| EP | 0 917 318 A2 | 5/1999 |
| EP | 0 924 913 A1 | 6/1999 |
| EP | 0946027 | 9/1999 |
| EP | 1 076 975 | 11/1999 |
| EP | 0 986 230 A2 | 3/2000 |
| EP | 1222791 | 5/2001 |
| EP | 1 111 872 | 6/2001 |
| EP | 1 026 853 | 12/2007 |
| EP | 2093928 | 4/2011 |
| GB | 2 283 645 | 5/1995 |
| GB | 2 311 439 A | 9/1997 |
| GB | 2 326 306 | 12/1998 |
| JP | 5-344122 | 12/1993 |
| JP | H06-209319 | 7/1994 |
| JP | 06-348625 | 12/1994 |
| JP | 7030575 | 1/1995 |
| JP | 7-66809 | 3/1995 |
| JP | H07-202931 | 4/1995 |
| JP | 8-65306 A | 3/1996 |
| JP | 8-242231 A | 9/1996 |
| JP | H08-265372 | 11/1996 |
| JP | 9046352 | 2/1997 |
| JP | 09305514 A | 11/1997 |
| JP | 10-105516 A | 4/1998 |
| JP | 10-107839 | 4/1998 |
| JP | 11-055726 | 2/1999 |

(56) References Cited

FOREIGN PATENT DOCUMENTS

| JP | 11055326 | 2/1999 |
|---|---|---|
| JP | 11-177626 | 7/1999 |
| JP | 11-282804 A | 10/1999 |
| JP | 2002-514802 | 11/1999 |
| JP | 2000059416 | 2/2000 |
| JP | 2000-111870 A | 4/2000 |
| JP | 2000-354127 | 12/2000 |
| JP | 2000-354127 A | 12/2000 |
| JP | 2002-111870 | 4/2002 |
| JP | 4471554 | 3/2010 |
| JP | 4791589 | 7/2011 |
| JP | 4846036 | 10/2011 |
| JP | 5047436 | 7/2012 |
| JP | 5084086 | 9/2012 |
| WO | WO 95/27942 A1 | 10/1995 |
| WO | WO 96/05549 | 2/1996 |
| WO | WO 96/39668 A1 | 12/1996 |
| WO | WO 97/02687 | 1/1997 |
| WO | WO 97/09672 | 3/1997 |
| WO | WO 97/11429 A1 | 3/1997 |
| WO | WO 97/22936 A1 | 6/1997 |
| WO | WO 97/27546 | 7/1997 |
| WO | WO 97/415866 | 11/1997 |
| WO | WO 97/48210 | 12/1997 |
| WO | WO 98/11702 A1 | 3/1998 |
| WO | WO 98/12643 A1 | 3/1998 |
| WO | WO 98/16036 A1 | 4/1998 |
| WO | WO 98/16044 | 4/1998 |
| WO | WO 98/36587 A2 | 8/1998 |
| WO | WO 98/40990 A1 | 9/1998 |
| WO | WO 98/54868 A1 | 12/1998 |
| WO | WO 98/57465 A1 | 12/1998 |
| WO | WO 99/01819 A1 | 1/1999 |
| WO | WO 99/15995 A1 | 4/1999 |
| WO | WO 99/28819 | 6/1999 |
| WO | WO 99/38303 | 7/1999 |
| WO | WO 99/39481 | 8/1999 |
| WO | WO 99/46890 | 9/1999 |
| WO | WO 99/55056 A1 | 10/1999 |
| WO | WO 99/57837 A2 | 11/1999 |
| WO | WO 99/57865 A1 | 11/1999 |
| WO | WO 99/57866 | 11/1999 |
| WO | WO 99/65183 A2 | 12/1999 |
| WO | WO 99/66400 | 12/1999 |
| WO | WO 00/27092 | 5/2000 |
| WO | WO 00/58804 | 10/2000 |
| WO | WO 00/79406 A | 12/2000 |
| WO | WO 01/03011 A2 | 1/2001 |
| WO | WO 01/30130 A2 | 5/2001 |
| WO | WO 01/63835 A | 8/2001 |
| WO | WO 02/067531 A1 | 8/2002 |
| WO | WO 2004/017658 | 2/2004 |
| WO | WO 2004/100499 | 11/2004 |

OTHER PUBLICATIONS

Airamo, Virtual Private Networks, 1997.*
USG Product Timeline, Nomadix, Inc., 2701 Ocean Park Blvd., Suite 231, Santa Monica, California 90405.
Universal Subscriber Gateway, Nanadix, Inc., 2701 Ocean Park Blvd., Suite 231, Santa Monica, California 90405.
Schoen et al., Convergence Between Public Switching and the Internet, published Sep. 21, 19997 in *World Telecom Congress Proceedings*, pp. 549-560.
Cisco; *Single-User Network Access Security TACAS+*; Mar. 30, 1995; 9 Pages; Cisco White Paper, XP002124521.
D. Brent Chapman, Elizabeth D. Zwicky;*Building Internet Firewalls*; Nov. 1995; pp. 131-188; O' Reilly; XP002202789.
Susan Hinrichs; *Policy Based Management Bridging the Gap*; Dec. 6, 1999; pp. 209-218; Computer Security Applications Conference, 1999 (ACSAC 1999), Proceedings 15$^{th}$ Annual, Phoenix, Arizona, USA, Dec. 6-10, 1999, Los Angeles, California; IEEE Comput. Sec; XP010368586.
Complaint for Patent Infringement of U.S. Patent Nos. 6,130,892; 7,088,727; 6,636,894; 6,857,009 and 6,868,399.
U.S. Appl. No. 60/084,014, filed May 4, 1998; in re: Ikudome; entitled "User Specific Automatic Web Redirection System".
Atreus Systems Corporations and B2B Connect, In. Partner to Deliver Bundled Broadband Services to Mult-Tenant, High Ri Buildings, Feb. 14, 2000, Business Wire.
NetGame Ltd. Announces its High-Speed, In-Room Hotel Internet Access Product to be Displayed at HITEC 99, Jun. 16, 1999, Business Wire.
Copper-Mountain Introduces CopperPowered Hotel Initiative to Deliver Cost-effective Always-on or Usage-based Broadband Access to Hotel Guests, Dec. 6, 1999, Business Wire.
Nomadix Joins Copper Mountain Networks to Provide High-Speed Internet Access to Hotels Guests, Dec. 6, 199, Business Wire.
Ascend Communications and ATCOM/INFO Announce Development Alliance, Jun. 22, 1999, Business Wire.
PCT International Search Report dated Jun. 15, 2001 for International Application No. PCT/US 00 28541, filed Oct. 16, 2000; Applicant—Nomadix, Inc., et al.
N. Fujino et at, "Mobile information service based on multy-agent architecture", (1997), IEICE Transactions on Communications, JP, Institute of Electronics Information and Comm. Eng. Tokyo, vol. E80-B, NR. 10, pp. 1401-1406; XP000734533; ISSN: 0916-8516.
R. Sietmann; "Tatifmodelle gegen staus auf der infobahn", (1998). Funkschau, DE, Franzis-Verlag K. G. Munchen, vol. 71, NR. 8 pp. 28-30; XP000779238; ISSN: 0016-2841.
Complaint, Demand for Jury Trial; *IP3 Networks. Inc.* vs. *Nomadix, Inc*; Case No. 04 CV 1485 DMS (POR); 45 pages; Filed Jul. 23, 2004; United States District Court, Southern District of California.
Plaintiffs Reply to Defendant's First Amended Answer and Counterclaims, Demand for Jury Trial, Case No. CV07-1946 DDP (VBKx), *Nomadix Inc.* v. *Second Rule LLC et al.*; 6 pages; Filed Jul. 31, 2007, United States District Court, Central District of CA, Western Division.
First Amended Answer, Affirmative Defenses and Counterclaims of Second Rule LLC, Civil Action No. CV 07 1946 GPS (VBKx), *Nomadix, Inc.* vs. *Second Rule LLC*; 15 pages, dated Jul. 16, 2007, United States District Court, Central District of CA.
Amended Complaint, Demand for Jury Trial; *IP3 Networks. Inc.* vs. *Nomadix. Inc.*; Case No. 04 CV 1485 DMS (POR); 48 pages; Sep. 20, 2004; United States District Court, Southern District of California.
Answer and Counterclaims of Nomadix Inc. to the Amended Complaint; *IP3 Networks, Inc.* vs. *Nomadix, Inc.*; Case No. 04 CV 1485 DMS (POR); 44 pages; Filed Oct. 21, 2004; United States District Court, Southern District of California.
Plaintiff/Counter-Defendant IP3 Networks Inc.'s Reply to Defendant Nmoadix, Inc.'s Counterclaim; *IP3 Networks, Inc.* vs. *Nomadix, Inc.*; Case No. 04 CV 1485 DMS (POR); 8 pages; Nov. 15, 2004; United States District Court, Southern District of California.
D. Plummer; *An Ethernet Address Resolution Protocol or Converting Network Protocol Addresses to 48.bit Ethernet Address for Transmission on Ethernet Hardware*; Nov. 1982; 8 pages; Network Working Group, Request for Comments 826.
C. Hornig; *A Standard for the Transmission of IP Datagrams over Ethernet Networks*; Apr. 1984; 3 pages; Network Working Group, Request for Comments 894.
J. Postel; *Multi-Lan Address Resolution*; Oct. 1984; 14 pages; Network Working Group, Request for Comments 925.
R. Braden et al.; *Requirements for Internet Gateways*; Jun. 1987; 50 pages; Network Working Group, Request for Comments 1009.
Smoot Carl-Mitchell et al.; *Using ARP to Implement Transparent Subnet Gateways*; Oct. 1987; 8 pages; Network Working Group, Request for Comments 1027.
P. Mockapetris; *Domain Names—Concepts and Facilities*; Nov. 1987; 49 pages; Network Working Group, Request for Comments 1034.
R. Droms; *Dynamic Host Configuration Protocol*; Oct. 1993; 35 pages; Network Working Group, Request for Comments 1531.
K. Egevang et al.; *The IP Network Address Translator (NAT)*; May 1994; 9 pages; Network Working Group, Request for Comments 1631.

(56) References Cited

OTHER PUBLICATIONS

M. Chatel; *Classical Versus Transparent IP Proxies*; Mar. 1996; 32 pages; Network Working Group, Request for Comments 1919.
T. Berners-Lee et al.; *Hypertext Transfer Protocol—HTTP/1.0*; May 1996; 54 pages; Network Working Group, Request for Comments 1945.
A. Luotonen et al.; *World-Wide Web Proxies*; Apr. 1994; 8 pages.
J. N. Stewart; Working with Proxy Servers; Mar. 1997; pp. 19-22; *WebServer Magazine*.
D. Wessels; *Squid Proxy Server Configuration File 1.93.2.2, "TAG deny_info"*; Mar. 1997; 19 pages; available at <http://www.squid-cache.org/mail-archieve/squid-users/199703/att-0250/squid.conf>; (visited Feb. 1, 2005).
C. Beermann; Re: *Support for cern like Pass/Fair proxy limits?*; 2 pages; available at <http://www.squid-cache.org/mail-archieve/squid-users/199611/0385.html> (visited Feb. 1, 2005).
Information Sciences Institute; *Internet Protocol, DARPA Internet Program, Protocol Specification*; Sep. 1981; 45 pages; available at <http://www.faqs.org/rfcs/rfc791.html> (visited Feb. 1, 2005).
D. MacEachern; *Apache/Perl Integration Project*; ReadMe; 2 pages; available at <http://apache.perl.org>, <http://outside.organic.com/mail-archives/modperl>, and <http://www.ping.de/~fdc/mod_perl>.
Gisle Aas et al.; *Apache.pm*; 18 pages; available at <http://www.apache.org/docs>.
*Mod_perl.c*; Copyright;1995-1997 The Apache Group; 20 pages.
Plaintiff IP3 Networks Inc.'s Responses to Defendant Nomadix, Inc.'s First Set of Interrogatories (Nos. 1-5); *IP3 Networks, Inc. vs. Nomadix, Inc.: Nomadix, Inc. vs. IP3 Networks, Inc.*; Case No. 04 CV 1485 BTM (POR); 17 pp.; Feb. 22, 2005; United States District Court, Southern District of CA.
Denning et al.; Location-Based Authentication: Grounding Cyberspace for Better Security, copy right 1996, Elsevier Science Ltd., pp. 1-6.
G. Malkin; Dial-in Virtual Private Networks Using Layer 3 Ttunneling; Proceedings of the Conference on Local Computer Networks, XX, XX; Nov. 2, 1997; pp. 555-561; XP002084438.
Layer 2 Tunneling Protocol; Internet, Online!; XP002175644; Retrieved from the Internet: URL:www.cisco.com (retrieved on Aug. 22, 2001); 1998; Cisco Systems, Inc.
Detailed Scenario for Access VPDN Dial-in Using L2TP; Internet, Online!; XP002175644; URL:www.cisco.com (retrieved on Aug. 22, 2001); 1998; p. 1, figure 4, table 1.
M. Shreedhar et al.; Efficient Fair Queuing Using Deficit Round Robin; *Proceedings of the International Workshop on Community Networking*; XX, XX, Aug. 1, 1995; pp. 231-242; XP000541659.
Cisco Systems, Inc.; *Interface Queue Management* (white paper); "Online!"; Aug. 3, 1995; 12 pages; INET; XP002210177; available at <URL: http://www.cisco.com/warp/public/614/16.html> (retrieved on Aug. 16, 2002).
B. Braden et al.; RFC2309 *Recommendations on Queue Management and Congestion Avoidance in the Internet*; Apr. 1998; 13 pages; "Online!" IETF, INET XP002210176; available at <URL:http://www.faqs.org/rfcs/rfc2309.html> (retrieved on Aug. 16, 2002).
C. Rigney, *Radius Accounting*, Network Working Group, Request for Comments: 2139, Apr. 1997.
PCT International Search Report dated Mar. 14, 2001 relating to PCT/US 00/29172.
P. Srisuresh et al.; *Traditional IP Network Address Translator (Traditional NAT)*; Jan. 2001; 16 pages; The Internet Society; XP-002227044.
M. Smith et al.; *Network Security Using NAT and NAPT*; Aug. 2002; pp. 355-360; 10th IEEE International Conference; XP-002246149.
A. Michard et al.; The Aquarelle resource discovery system; *Computer Networks and ISDN Systems*; 1998; pp. 1185-1200; vol. 30, NR. 13; North Holland Publishing; Amsterdam, NL; XP004147404; ISSN: 0169-7552.
T. Yokoi et al.; Internet Quality & Traffic Management (IIi), The Journal of the Institute of Electronics, Information and Communication Engineers, 2000, Jan. 2005, vol. 83, No. 1, pp. 57-63.
R. J. Edell et al., "Billing Using and Pricing for TCP", IEEE Journal on selected areas in communications, US, IEEE Inc. New York, vol. 13, NR. 7, pp. 1162-1175; XP000525655; ISSN: 0733-8716.
Plaintiff Replay to Counterclaims of Nomadix Inc. to the Amended Complaint, Demand for Jury Trial; *IP3 Networks Inc. vs. Nomadix Inc.*; Case No. 04 CV 1485 DMS (POR); 8 pages; Filed Nov. 15, 2004; US District Court, Shothern District of California.
ATCOM/INFO and Microsoft Plan Large-Scale Deployment of IPORT for Mid-1998, available at http://www.microsoft.com/presspass/press/1998/mar98/ipttrlpr.mspx dated Nov. 14, 2007, 4 pages.
Hotel Online Special Report, Internet Access for the Road Warrior Easier Than Ever IPORT™ Version 2.0 Released, available at http://www.hotel-online.com/News/PressReleases1998_3rd/July98_IPORTAccess.html dated Nov. 14, 2007, 2 pages.
Internet Access: ATCOM/INFO Releases IPORT Central Office Solution. IPORT-CO Makes Plug & Play High-Speed Internet Access Possible to Multiple Properties from a Single Server . . . , available at http://findarticles.com/p/articles/mi_mOUNZ/is_1998_Oct_26/ai_53126579, dated Nov. 14, 2007, 3 pp.
*Make users go thru login*, Available at http://www.microsoft.public.inetserver.iis.activeserverpages.html (visited Oct. 5, 2005 but including items dated Jan. 19, 1998).
U.S. Appl. No. 08/816,174, filed Mar. 12, 1997; In re: J. E. Short; Title: Nomadic Router.
D. Liu, X.Y. Chen, X.P. Zhang, L. Liu; *Automatically Configure a System to Route Internet Traffic to a Proxy*; Apr. 1999; 1 page; IBM Technical Disclosure Bulletin; International Business Machines.
M. Chatel; *Classical versus Transparent IP Proxies (RFC 1919)*; Mar. 1, 1996, Sep. 13, 2000; 29 pages; Internet Society Requests for Comment; Network Working Group.
Vineet Chikarmane, Rick Bunt, Carey Williamson; *Mobile IP-based Multicast as a Service for Mobile Hosts*; Proceedings of the 1995 Workshop on Physics and Computer Modeling; 1995; pp. 11-18; IEEE.
Qiang Gao, Anthony Acampora; *A Virtual Home Agent Based Route Optimization for Mobile IP*; 2000 IEEE Wireless Communications and Networking Conference; Sep. 2000; pp. 592-596; IEEE; Chicago, Illinois.
Stephen Heilbronner; *Requirements for Policy-Based Management of Nomadic Computing Infrastructures*; 1998; 14 pages.
Shoshana Loeb; *Interactive Billing for Broadband and Multimedia Services*; Community Networking 1995; Jun. 1995; pp. 221-223; IEEE.
Christopher Metz; *AAA Protocols: Authentication, Authorization, and Accounting for the Internet*; IEEE Internet Computing; 11, Dec. 1999; pp. 75-79; IEEE.
Charles E. Perkins, Pravin Bhagwat; *A Mobile Networking System based on Internet Protocol*; IEEE Personal Communications; 1994; pp. 32-41; IEEE.
David L. Tennenhouse, Jonathan M. Smith, W. David Sincoskie, David J. Wetherall, Gary J. Minden; *A Survey of Active Network Research*; IEEE Communications Magazine; Jan. 1997; pp. 80-86; IEEE.
Chu-Sing Yang, Jiing-Ching Yang, Kun-Da Wu, Jian-Xing Lee, Yuh-Rong Leu; *An Efficient Multicast Delivery Scheme to Support Mobile IP*; Proceedings of the 10th International Workshop on Database and Expert Systems Applications; 1999; 6 pages; IEEE Computer Society, Washington DC.
B. Aboba, J. Lu, J. Alsop, J. Ding, W. Wang; *Review of Roaming Implementations*; Sep. 1997; 35 Pages; Network Working Group, Request for Comments 2194.
Pravin Bhagwat, Charles Perkins, Satish Tripathi; *Network Layer Mobility: An Architecture and Survey*; IEEE Personal Communications; Jun. 1996; pp. 54-64; IEEE.
Defendant Second Rule LLC, *Initial Disclosure of Prior Art*; *Nomadix, Inc. v. Second Rule LLC*, Civil Action CV-07-1946, USDC, CD CA.; Jan. 2008; 11 pages.
Defendant Second Rule LLC, *Defendant's Response to Plaintiff's Claim Chart, Nomadix, Inc. v. Second Rule LLC*, Civil Action CV-07-1946, USDC, CD CA.; Feb. 2008; 11 pages, Exhibit A—19 pages, Exhibit B—6 pages, Exhibit C—49 pages, Exhibit D—12 pages,

(56) References Cited

OTHER PUBLICATIONS

Exhibit E—26 pages, Exhibit F—16 pages, Exhibit G—18 pages; Exhibit H—7 pages; Exhibit I—34 pages; Exhibit J—20 pages.
M. G. Hluchyj et al., *Queueing Disciplines for Integrated Fast Packet Networks*, IEEE 1992, 7 pages.
Plaintiff Nomadix, Inc.'s Proposed Claim Construction Statement; *Nomadix Inc. vs. Second Rule LLC*; Civil Action CV-07-1946, USDC, CD CA.; May 23, 2008; 183 pages.
Second Rule LLC's Response to Nomadix, Inc.'s Proposed Claim Construction Statement; *Nomadix, Inc. vs. Second Rule LLC.*; Civil Action CV-07-1946, USDC, CD CA. ; Jun. 6, 2008; 74 pages.
[Proposed] Joint Claim Construction Statement, *Nomadix, Inc. vs. Second Rule LLC*; Civil Action CV-07-1946, USDC, CD CA.; Jul. 2, 2008; 105 pages.
Plaintiff Nomadix, Inc.'s Reply Claim Construction Brief; *Nomadix, Inc. vs. Second Rule LLC*; Civil Action CV07-1946 USDC, CDCA WD; Aug. 22, 2008; 277 pages.
Declaration of Don P. Foster Re. Second Rule LLC's Opening claim Construction Brief; *Nomadix, Inc. vs. Second Rule LLC*; Civil Action CV07-1946 USDC, CDCA WD; Aug. 4, 2008; Part I, 227 pages; Part 2, 230 pages.
Defendant's Opening Claim Construction Brief; *Nomadix, Inc. vs. Second Rule LLC*; Civil Action CV07-1946 USDC, CDCA WD; Aug. 4, 2008; 54 pages.
Plaintiff's Opening Claim Construction Brief [Redacted Public Version]; *Nomadix, Inc. vs. Second Rule LLC*; Civil Action CV07-1946 USDC, CDCA WD; Aug. 4, 2008; 237 pages.
Defendant's Reply to Plaintiff's Opening Claim Construction Brief *Nomadix, Inc. vs. Second Rule LLC*; Civil Action CV07-1946 USDC, CDCA WD; Aug. 22, 2008; 44 pages.
Notice of Motion and Motion of Second Rule LLC for Partial Summary Judgment; *Nomadix, Inc. vs. Second Rule LLC*; Civil Action CV 07 1946 DDP (VBKx); Sep. 5, 2008.
Memorandum of Law in Support of Motion of Second Rule LLC for Partial Summary Judgment; *Nomadix, Inc. vs. Second Rule LLC*; Civil Action CV 07 1946 DDP (VBKx); Sep. 5, 2008.
Defendant's Statement of Uncontroverted Facts and Conclusions of Law in Support of Defendant's Motion for Partial Summary Judgment; *Nomadix, Inc. vs. Second Rule LLC*; Civil Action CV 07 1946 DDP (VBKx); Sep. 5, 2008.
Declaration of Don P. Foster Re: Motion of Second Rule LLC for Partial Summary Judgment; *Nomadix, Inc. vs. Second Rule LLC*; Civil Action CV 07 1946 DDP (VBKx); Sep. 5, 2008.
Declaration of Peter Alexander, Ph.D., in Support of Second Rule's Motion for Partial Summary Judgement; *Nomadix, Inc. vs. Second Rule LLC*; Civil Action CV 07 1946 DDP (VBKx); Sep. 5, 2008.
W. Richard Stevens; *TCP/IP Illustrated, vol. 1—The Protocols*; Addison-Wesley Professional Computing Series; pp. 53-62 and 231-235 (Printed Jul. 2001).
Chris Kostick; *Building a Linux Firewall* (Printed Nov. 7, 2008).
Chris Kostick; *IP Masquerading with Linux* (Printed Nov. 7, 2008).
Chris Kostick; *System Administration—IP Masquerading Code Follow-Up* (Printed Nov. 7, 2008).
Peter Elton; *Linux as a Proxy Server* (Printed Nov. 7, 2008).
Expert Report of Peter Alexander, Ph.D.; *Nomadix, Inc. vs. Second Rule LLC*; Civil Action No. CV 07 1946 GPS (VBKx); Oct. 31, 2008.
Ascend Communications Inc., Virtual Private Networks, 1997.
Claim Construction Order; *Nomadix, Inc. vs. Second Rule LLC*; Case No. 07-cv-01946-DDP-VBK; Filed Oct. 3, 2008.
W. Richard Stevens, "TCP/IP Illustrated vol. 1: The Protocols," 1994, 53-62, Addison Wesley.
Andrew S. Tanenbaum, "Computer Nextworks," 1996, 420-42, 3$^{rd}$ ed.
Aceves, Wireless Internet Gateways (Wings), Proc. IEEE MILCOM '97, Monterey, California, Nov. 1997.
Agrawal, Swan: A Mobile Multimedia Wireless Network, IEEE Personal Communications, Apr. 1996.
Alexander, Active Bridging, University of Pennsylvania Technical Report No. MS-CIS-97-02, Jan. 1997.
Alonso, Database system issues in nomadic computing; Proceedings of the 1993 ACM SIGMOD International Conference on Management of Data, May 26, 1993.
Altmann, (Workshop '99) Assisting Users in Complex Purchasing Decisions, Jan. 12, 1999.
Altmann, Index Project: User support for buying QoS with regard to user's preferences, Sixth International Workshop on Quality of Service, May 18, 1998.
Amadio, Modelling IP Mobility, Nov. 1997.
Aoyama, The Cost of Adaptivity and Virtual Lanes in a Wormhole Router, 1995.
Babbage, Internet phone—changing the telephony paradigm?, BT Technology Journal, vol. 15, Iss. 2, Apr. 1997.
Badrinath, To Send or not to Send: Implementing Deferred Transmissions in a Mobile Host, Proceedings of 16th International Conference on Distributed Computing Systems, May 27, 1996.
Bagrodia, Vision, Issues, and Architecture for Nomadic Computing, IEEE Personal Communications, Dec. 1995.
Baker, Local Control Over Filtered WWW Access, Fourth International World Wide Web Conference, Dec. 13, 1995.
Baker, RFC 1812; Requirements for IP Version 4 Routers, Jun. 1995.
Baker, Supporting Mobility in MosquitoNet, Proceedings of the 1996 USENIX Technical Conference, San Diego, CA., Jan. 22, 1996.
Beigl, System Support for Mobile Computing, Computers & Graphics, vol. 20, Iss. 5, Sep. 1996.
Bieszczad, Towards plug-and-play networks with mobile code, Proceedings of the International Conference for Computer Communications ICCC'97, Mar. 1997.
Bjorn, The Case for Quality of Service on Demand Empirical Evidence from the INDEX Project, ISQE'99, Workshop on Internet Service Quality Economics, Cambridge, MA, USA, Dec. 1999.
Blackwell, Secure Short-Cut Routing for Mobile IP, Proceedings of the USENIX Summer 1994 Technical Conference on USENIX Summer 1994 Technical Conference, Jun. 10, 1994.
Boutell, CGI Programming in C & Perl, 1996.
Braden, RFC 1122 Requirements for Internet Hosts—Communication Layers, Oct. 1989.
Brattli, The Software Network, Providing Continuous Network Connectivity for Multihoming Mobile Computers, Dec. 16, 1996.
Broman, Implementation and Analyses of the Mobile-IP Protocol, Jan. 25, 1996.
Brown, A Strategic Plan for Ubiquitous Laptop computing, vol. 41, No. 1, Communications of the ACM, Jan. 1998.
Brown, M-TCP: TCP for Mobile Cellular Networks, Jul. 29, 1997.
Bush, Mobile ATM Orderwire and Network Configuration, 1996.
Caceres, Fast & Scalable Handoffs for Wireless Internetworks, Proceedings of the 2nd annual international conference on Mobile computing and networking, Nov. 1996.
Casey, Realizing Mobile Computing Personae, Ph.D. Thesis, Oct. 1995.
Chapman, Building Internet Firewalls, IP3 002885-002944, Sep. 1995.
Chapman, Network (In)Security Through IP Packet Filtering, Proceedings of the Third USENIX UNIX Security Symposium, Sep. 1992.
Check Point Ad, Sep. 14, 1998.
Check Point FireWall-I White Paper, v.3, Jun. 1997.
Check Point Software Delivers Breakthrough Security Advancements with Firewall-1 3.0, Oct. 7, 1996.
Check Point SoftwareCheck Point Firewall-I 4.0 Gains Int'l Recognized ITSEC Security Cert., Nov. 9, 1998.
Cheshire, Internet Mobility 4x4, Mobility: Processes, Computers, and Agents, SIGCOMM '96, Aug. 30, 1996.
Cheswick, The Design of a Secure Internet Gateway, Apr. 20, 1990.
Chikarmane, Multicast Support for Mobile Hosts Using Mobile IP, May 16, 1997.
Chikarmane, Network Support for Mobile Hosts in a TCP/IP internetwork, Aug. 1995.
Cho, An Efficient Location and Routing Scheme for Mobile Computing Environments, IEEE Journal on Selected Areas in Communications, 1995.
Cisco Systems, Inc., LocalDirector Quick Start Guide and User Reference Manual, Version 1.0, Jul. 1996.

(56) References Cited

OTHER PUBLICATIONS

Cisco's High-Performance Stateful Firewall Delivers Unparalleled Security, PIX Firewall Data Sheet, 1996.
Cisco; Single-User Network Access Security TACACS+; 9 pages; Cisco White Paper; XP002124521, Mar. 30, 1995.
Cobb, Universal Mobile Addressing, IEEE Workshop on Mobile Computing Systems and Applications, 1994.
Collier, Netlets: The Future of Networking, Apr. 4, 1998.
Comer, An Architecture for a Campus-Scale Wireless Mobile Internet, Purdue University Department of Computer Science Technical Report No. CSD-TR 95-058, Sep. 1995.
Connection Methods and Concepts for IPORT v2.x, Nov. 1998.
Copper Mountain Introduces CopperPowered Hotel Initiative to Deliver Cost-effective Always-on or Usage-based Broadband Access to Hotel Guests (Business Wire), Dec. 6, 1999.
Damani, One-IP: techniques for Hosting a Service on a Cluster of Machines, Jun. 29, 2004.
Desrosiers, Transparent Access of Remote Resources, IBM Technical Disclosure Bulletin, vol. 27, No. 7B, p. 4230, Dec. 1984.
Devivo, Internet Security Attacks at the Basic Levels, ACP SIGOPS Operating Systems Review, vol. 32, Iss. 2, Apr. 1998.
Droms, RFC 1541, Dynamic Host Configuration Protocol, Oct. 1993.
Droms, RFC 2131, Dynamic Host Configuration Protocol, Mar. 1997.
Duda, Mobile Agent Architecture for Nomadic Computing, International Conference on Computer Communications, Cannes, 1997.
Edell, Demand for Internet Access: What we learn from the INDEX trial, Mar. 13, 1999.
Edell, Internet Demand Experiment: Technology and Market Trial, Ph.D. Thesis, Spring, 2001.
Elton, Linux as a Proxy Server, Linux Journal archive, vol. 1997, Issue 44, Article 3, ISSN: 1075-3583 See http://portal.acm.org/citation cfm?id=327077 .327080, Dec. 1997.
Estrin, Inter-organization networks: implications of access control: requirements for interconnection protocol, ACM SIGCOMM Computer Communication Review, vol. 16, Iss. 3, Aug. 1986.
Felten, Web Spoofing: An Internet Con Game, Princeton University Technical Report No. 540-96, Feb. 1997.
Fielding, RFC 2068 Hypertext Transfer Protocol HTTP 1.1, Jan. 1997.
Ford, Securing a Mobile Internet, Oct. 7, 1999.
Google Groups: "home network" laptop; IP3 002769-70; Newsgroups: comp.sys.sun.admin.Newsgroups: comp.sys.sun. admin., Aug. 3, 2004.
Google Groups: netswitcher; IP3 002516; Newsgroups: comp.os.ms windows, Aug. 2, 2004.
Google Groups: network configuration laptop packets; IP3 002765-66; Newsgroups: comp.protocols.tcp-ip, Aug. 2, 2004.
Google Groups: network laptop settings; IP3 002767-68; Laptop on Dual Networks; Newsgroups: comp.os.ms windows, Jul. 30, 2004.
Google Groups: network settings DHCP mobile; IP3 002511-15; Newsgroups: comp.sys.mac.comm, Aug. 3, 2004.
Google Groups: redirect "login page"; IP 3 002873-74; Newsgroup: microsoft.public,inetserver.iis.activeserverpages, Jul. 28, 2004.
Google Groups: View Thread; IP3 002505-06; Newsgroups:microsoft,public.win95.networking, Aug. 2, 2004.
Google Groups: View Thread; IP3 002507-10; Newsgroups: comp.os.os2.networking.tcp-ip, Aug. 2, 2004.
Grant, TACACS+ Protocol Version 1.75 Internet Draft (TACACS+)/ RFC1492, Oct. 1996.
Gray, Mobile Agents for Mobile Computing, May 2, 1996.
Guerin, RadioNet Driver Implementation for the Mobile Internet Router, Jun. 1994.
Gupta, A Client Oriented IP Level Redirection, M.S. Thesis, Aug. 1998.
Gupta, Firewall Traversal for Mobile IP, Mar. 17, 1997.
Gupta, Secure and mobile networking, Mobile Networks and Applications, vol. 3, Iss. 4, 1998.
Gupta, Solaris Mobile IP: Design and Implementation, Feb. 17, 1998.

Haas, Mobile-TCP: An Asymmetric Transport, Proceedings of ICC'97—International Conference on Communications, Jun. 1997.
Hance, Product Information—Netswitcher, the ultimate windows network setup utility; IP 3 002517; Netswitcher.TM., Developed and Marketed by: J.W. Hance, 1950-18 E. Greyhound Pass, Suite 305, Carmel, Indiana 46033 USA, Aug. 2, 2004.
Harrison, Mobile Multicaset (MoM) Protocol, Proceedings of the 3rd annual ACM/IEEE international conference on Mobile computing and networking, Sep. 26, 1997.
Heilbronner, Nomadic Computing Systems on the Internet—Infrastructure and Management Requirements, Mar. 31, 1997.
Hills, Wireless Data Network Infrastructure at Carnegie Mellon University, Feb. 1996.
Hodes, Composable Ad-hoc Mobile Services for Universal Interaction, Aug. 2, 1997.
Housel, WebExpress: A Client/intercept based system for optimizing Web browsing in a wireless environment, Mobile Networks & Applications, vol. 3, No. 4, Jan. 1999.
Hubbard, Firewalling the Net, BT Technology Journal, vol. 15, Iss. 2, Apr. 1997.
Industry-Leading Internet Access System Now Makes Plug and Play—High-Speed Internet Access for the Road Warrior Easier Than Ever, Jul. 20, 1998.
Inouye, Dynamic Network Reconfiguration Support for Mobile Computers, Proceedings of the 3rd annual ACM/IEEE international conference on Mobile computing and networking, Sep. 26, 1997.
Inouye, Physical Media Independence: System Support for Dynamically Available Network Interfaces, Jan. 20, 1997.
Internet Access: ATCOM/INFO Releases IPORT Central Office Solution. IPORT-CO Makes Plug & Play High-Speed Internet Access Possible too Multiple Properties from a Single Server-Product Announcement, ATCOM-IPORT Press Release, Oct. 26, 1998.
Ioannidis, IP-based Protocols for Mobile Internetworking, Proceedings of the Conference on Communications Architecture & Protocols, Sep. 3, 1991.
Ioannidis, Protocols for Supporting Mobile IP Hosts, Jul. 1992.
ipfwadm-2.3.0, source code module ipfwadm.c, Jul. 30, 1996.
IPORT Central Office Solution, Nov. 1998.
Jain, PC-notebook based mobile networking: Algorithms, architectures and implementations; ICC95 vol. 2, Jun. 1995.
Johnson, Mobile Host Internetworking Using IP Loose Source Routing, Carnegie Mellon University Technical Report No. CS-93-128, Feb. 1993.
Johnson, Protocols for Adaptive Wireless and Mobile Networking, Feb. 1996.
Johnson, Scalable and robust internetwork routing for mobile hosts, Proceedings of the 14th International Conference on Distributed Computing Systems, Jun. 21, 1994.
Johnson, Scalable Support for Transparent Mobile Host Internetworking, Wireless Networks, vol. 1, Iss. 3, 1995.
Katz, The Bay Area Research Wireless Access Network (BARWAN), Proceedings of the 41st IEEE International Computer Conference, Feb. 25-28, 1996.
Kleinrock, Nomadic Computing (Keynote address) Intl Conf. on Mobile Computing and Networking Berkley, California, ACM., Nov. 1995.
Kleinrock, Nomadic Computing—An Opportunity; Computer Science Department, UCLA, Los Angeles, CA (ACM SIGCOMM, Computer Communications Review, vol. 25, Issue: 1)., Jan. 1995.
Kleinrock, Nomadic Computing; Computer Science Department, UCLA, Los Angeles, CA; (Information Network and Data Communication IFIP/ICCC International Conference on Information Network and Data Communication)., Jun. 1996.
Kleinrock, Nomadicity in the NII; Computer Science Department, UCLA, Los Angeles, CA; (Cross-Industry Working Team Papers & Reports), Jun. 1995.
Kleinrock, Nomadicity: Anytime, Anywhere in a Disconnected World; Computer Science Department, UCLA, Los Angeles, CA; (Mobile Network and Applications, Special Issue on Mobile Computing and System Services, vol. 1, Issue: 4)., Dec. 1996.
Koblas, Socks, Proceedings of the Third USENIX UNIX Security Symposium (Baltimore, MD: USENIX Association), Sep. 1992.
Kostick, Building a Linux Firewall (Linux Journal 24), Apr. 1, 1996.

(56) References Cited

OTHER PUBLICATIONS

Kostick, IP Masquerading Code Follow-up, System Administration, vol. 1997, Iss. 43, Nov. 1997.
Kostick, System Administration: IP Masquerading Code Follow-Up (Linux Journal archive, vol. 1997, Issue 43, ISSN:1075-3583)., Nov. 1997.
Kunzinger, Network Layer Mobility: Comparison of CDPD and Mobile-IP, IBM Technical Report 29.2003, 1995.
La Porta, Challenges for nomadic computing: Mobility management and wireless communications, Mobile Networks and Applications, vol. 1, Iss. 1, Aug. 1996.
Lain Langdon, Education for Changing Times—An Online Learning Framework, Oct. 15, 1996.
Lee, Adaptive Network Support for Mobile Multimedia, Proceedings of the 1st annual international conference on Mobile computing and networking, Nov. 13, 1995.
Leech, RFC 1928; Socks Protocol Version 5, Mar. 1996.
Leu, Implementation considerations for Mobile IP, Proceedings of the 21st International Computer Software and Applications Conference, Nov. 11, 1997.
Li and Leung, Supporting Personal Mobility for Nomadic Computing Over the Internet, ACM SIGMOBILE Mobile Computing and Communications Review, Apr. 1997.
Lin, An Architecture for a Campus-Sized Wireless Mobile Network, Ph.D. Thesis, Dec. 1996.
Lioy, Providing TCP-Level Services to Mobile Computers, M.S. Thesis, 1997.
Loon, Alleviating the Latency and Bandwidth Problems in WWW Browsing, Proceedings of the USENIX Symposium on Internet Technologies and Systems on USENIX Symposium on Internet Technologies and Systems, Dec. 8, 1997.
Maciel, Dynamic Gateways: a novel approach to improve networking performance and availability on parallel servers, Apr. 21, 1998.
Macker, Mobile Ad Hoc Networking and the IETF, ACM SIGMOBILE Mobile Computing and Communications Review, vol. 3, Iss. 1, Jan. 1999.
Major telecom Company Launches Education Internet Service for Schools, Sep. 20, 1995.
Moby Dick, The Mobile Digital Companion, LTR 20422, Jul. 1997.
Mogul, RFC 950; Internet Standard Subnetting Procedure, Aug. 1985.
Moore, Campus World, 1998.
Myles, Comparison of Mobile Host Protocols for IP, Apr. 14, 1993.
Mysore, A New Multicasting-based Architecture for Internet Host Mobility, Sep. 26, 1997.
Nelson, Context-Aware and Location Systems, Jan. 1998.
Neves, Adaptive Recovery for Mobile Enviroments, Communications of the ACM, vol. 40, Iss. 1, Jan. 1997.
Newman, Flow Labelled IP: A Connectionless Approach to ATM, Proceedings of the Conference on Computer Communications (IEEE Infocom), Mar. 24, 1996.
Nomadicity in the National Information Infrastructure, a white paper published by the Cross-Industry Working Team (XIWT) at http://www.xiwt.org/documents/Nomadicity.html.
*Nomadix, Inc. v Second Rule LLC*, Civil Action No. 07-1946 DDP (VBKx), Declaration of Peter Alexander, Ph. D. in Support of Second Rule's Motion for Partial Summary Judgment., Sep. 4, 2008.
Office Action mailed Oct. 5, 2005, for U.S. Appl. No. 09/684,937, Oct. 5, 2005.
Official Communication mailed Nov. 22, 2005 for EP Patent Application No. EP 98 909 121.0, Nov. 22, 2005.
PCT Application and its English translation for Chinese Patent Application No. 98805023.4., Jan. 12, 2005.
Peine, An Introduction to Mobile Agent Programming and the Ara System, University of Kaiserslautern Technical Report ZRI-Report 1/97, 1997.
Perkins, "Providing Continuous Network Access to Mobile Hosts Using TCP/IP." Computer Networks and ISDN Systems, Nov. 1993.
Perkins, A Mobile Networking System Based on Internet Protocol (IP) in USENIX Symposium on Mobile and Location-Independent Computing, Aug. 2, 1993.
Perkins, DHCP for mobile networking with TCP/IP; Proceedings IEEE International Symposium on Computers and Communications, XP002132695, Jun. 27, 1995.
Perkins, Highly Dynamic Destination-Sequenced Distance-Vector Routing (DSDV) for Mobile Computers, ACM SIGCOMM Computer Communication Review, vol. 24, Iss. 4, Oct. 1994.
Perkins, Internet Mobile Host Protocol (IMHP), Jun. 13, 1994.
Perkins, Mobile IP; Communications Magazine, IEEE vol. 35, Issue 5, May 1997.
Perkins, Mobile networking through Mobile IP, IEEE Internet Computing, Jan. 1998.
Perkins, Mobile-IP, Ad-Hoc Networking, and Nomadicity; Proceedings of the 20th Annual International Computer Software and Applications Conference (COMPSAC), Seoul, Aug. 21, 1996.
Perkins, Mobility Support in IPv6, Proceedings of the 2nd annual international conference on Mobile computing and networking, Nov. 10, 1996.
Perkins, Resource discovery protocol for mobile computing, Mobile Networks and Applications, vol. 1, Iss. 4, Dec. 1996.
Pissinou, A middleware-based architecture to support transparent data access by mobile users in heterogeneous environments, Research Issues in Data Engineering, Feb. 28, 2000.
Pitoura, Building Information Systems for Mobile Environments, Proceedings of the third international conference on Information and knowledge management, Nov. 29, 1994.
Pitoura, Dealing with Mobility: Issues and Research Challenges; Purdue University Computer Science Department Technical Report CSD-TR-93-070, Nov. 1993.
PIX, Network Translation Inc., Private Internet Exchange (PIX) Brochure, 1994.
Plummer, RFC 826, Ethernet Address Resolution Protocol, Nov. 1982.
Poger, Secure Public Internet Access Handler (SPINACH), Proceedings of the USENIX SYmposium on Internet Technologies and Systems, Dec. 8, 1997.
Polydorou, Performance Analysis and Comparison of Two Wireless Wide Area Networks, Dec. 1996.
Poslad, Software Agents for Future Comunnication Systems—Chapter 9: Agent-Oriented Middleware for Integrating Customer Network Services, 1999.
Postel, RFC 793, Transmission Control Protocol, Sep. 1981.
Rajagopalan, An Adaptive Location Management Strategy for Mobile IP, Proceedings of the 1st annual international conference on Mobile computing and networking, Nov. 13, 1995.
Redi, Mobile IP: A Solution for Transparent, Seamless Mobile Computer Communications, Upcoming Trends in Mobile Computing and Communications, Jul. 1998.
Request for Reexamination for U.S. Patent No. 6,130,892, Feb. 15, 2005.
Rigney, RFC 2138, Remote Authentication Dial in User Service (RADIUS), Apr. 1997.
Rizzo, A Dynamic Pricing Framework to Support a Scalable, Usage-based Charging Model for Packet-switched Networks, May 7, 1999.
Robinet, An implementation of a gateway for hierarchically encoded video across ATM and IP networks, Proceedings of the IFIP TC-6 Eigth International Conference on High Performance Networking, Sep. 21, 1998.
Rowe, Reliability of WWW Name Servers, Computer Networks and ISDN Systems, Apr. 1995.
Sato, Details of Functions of Multi-purpose Proxy Server DeleGate-Access/Route Control and Protocol Conversion; Interface vol. 21, No. 9, Sep. 1995.
Schilit, A System Architecture for Context-Aware Mobile Computing, Ph.D. Thesis, May 1995.
Shamsuddin, Positioning of Wireless Broadband, Jun. 1996.
Short, Auto-Porting and Rapid Protyping with Application to Wireless and Nomadic Network Algorithms, A dissertation submitted in partial satisfaction of the requirements for the degree of Doctor of Philosophy in Computer Science, Oct. 26, 1996.

(56) References Cited

OTHER PUBLICATIONS

Short, Mobile Wireless Network System Simulation, Wireless Networks, vol. 1, Iss. 4, Nov. 1995.
Stevens, ARP: Address Resolution Protocol; TCP Illustrated, 1994.
Stevens, R, TCP Connection Handshake, 1994.
Sudan, Gateway Based Approach for Conducting Multiparty Multimedia Sessions over Heterogeneous Signaling Domains, Proceedings of the INFOCOM '97 Sixteenth Annual Joint Conference of the IEEE Computer and Communications Societies Apr. 9, 1997.
Taylor, Internetwork Mobility The CDPD Approach, Jun. 11, 1996.
Teraoka, A Network Architecture Providing Host Migration Transparency, ACM SIGCOMM Computer Communication Review, Sep. 1991.
Teraoka, Host Migration Transparency in IP Networks: The VIP Approach; ACM SIGCOMM Computer Communication Review, vol. 23, Iss. 1, Jan. 1993.
Teraoka, VIP: A Protocol Providing Host Mobility, Communications of the ACM, Aug. 1994.
The Independent, Hardware hustle hits the classroom, May 20, 1996.
Thomsen, Mobile Agents—The new paradigm in computing, ICL Systems Journal, vol. 12, Issue 1, pp. 14-40, May 1997.
TIS Firewall Toolkit Overview, Jun. 30, 1994.
Tut Systems Launches Hotel Internet Management System, PublicPort(TM) Latest Addition to Multi-Tenant Unit Product Line Allows Hotel Owners to Use Existing Copper Infrastructure to Provide 'Plug and Play' Internet Services, Jun. 23, 1999.
Varaiya, INDEX Project Proposal—Executive Summary,INDEX Project Report #98-005P, Aug. 6, 1996.
Venema, TCP Wrapper; Network monitoring, access control, and booby traps, Proc. of the Third Usenix UNIX Security Symposium, USENIX Association, Sep. 1992.
Xylomenos, IP Multicast for Mobile Hosts, IEEE Communications Magazine, vol. 35, Iss. 1, Jan. 1997.
Yeom, IP Multiplexing by Transparent Port-Address Translator, USENIX Tenth System Administration Conference, Sep. 29, 1996.
Zhao, Flexible Connectivity Management for Mobile Hosts, Stanford University Technical Report No. CSL-TR-97-735, Sep. 1997.
U.S. Appl. No. 60/111,497 by Kleinrock, filed Dec. 8, 1998.
ATCOM/INFO to Display High-Speed Plug- And-Play Internet Access Software with Microsoft at HITEC, Jul. 22, 1999.
ATCOM/INFO's IPORT Brings High Speed Internet Access to Hotels in Japan and Mexico; ATCOM and Tut Systems Partner to Expand International Presence of 'Plug and Play' Internet Access, May 11, 1999.
Atkins, Internet Security Professional Reference; IP Spoofing and Sniffing, Ch. 6, 1996.
Barnes, Defense Data Network Usage Accounting Enhancement Approaches, Apr. 1989.
Borella et al., IETF Internet-Draft—Distributed Network Address Translation, Internet Engineering Task Force, Oct. 1998.
C. Perkins, RFC 2002—IP Mobility Support, Network Working Group, Oct. 1996.
Caronni et al., Efficient Security for Large and Dynamic Multicast Groups, Jun. 1998.
Dahm, Redirecting your visitors, May 1999.
Deering et al., Network Working Group RFC 966—Host Groups: A Multicast Extension to the Internet Protocol, Dec. 1985.
Edell, Billing Users and Pricing for TCP (IEEE Journal on Selected Areas in Communications vol. 13 Sep. 1995 No. 7), Apr. 15, 1995.
Elastic Networks Unveils YesWare; Mobility Software Solution Target Visitor-Based Networking; PRNewswire, Apr. 12, 1999.
Furnell et al., A Security Framework for Online Distance Learning and Training, 1998.
Giovanardi, Transparent Mobile IP: an Approach and Implementation, Global Telecommunications Conference, 1997, Nov. 3, 1997.
Heberlein, Attack Class: Address Spoofing, Proceedings of the Nineteenth National Information Systems Security Conference, Oct. 1996.
Hotelier, ATCOM/INFO Makes High-Speed Internet Access to Corporate Networks Secure for Business Travelers, Jul. 17, 1999.
Kaashoek et al., Efficient Reliable Group Communication for Distributed Systems, Jul. 1992.
Kent et al., RFC 2401—Security Architecture for the Internet Protocol, Network Working Group, Nov. 1998.
Kostick, IP Masquerading with Linux; Linux Journal Issue 27. See http://portal.acm.org/citation.cfm?id=328288.328289, Jul. 1996.
Kruus, Peter S., A Survey of Multicast Security Issues and Architectures, 1998.
Kuri, Jurgen, Gruppenreise Ins Internet Gemeinsamer Internet—Zugang durch das LAN, 1998.
Lear, RFC 1627, Network 10 Considered Harmful, Jul. 1994.
Leveridge, Campus World and BT's On-Line Education Services, BT Technology Journal, Apr. 1997.
Lo et al., IETF Internet-Draft—Realm Specific IP: A Framework, Internet Engineering Task Force, Feb. 1999.
Making the Most of Home Pages, E-mail, The Internet and Presentation Graphics, The Journal, Aug. 1, 1998.
Manuel Gunter, Virtual Private Networks over the Internet, Aug. 3, 1998.
Messmer, "Gateway Handles Thorny Problems with Addressing IP Networks", Network World, p. No. 8, Nov. 28, 1994.
Messmer, New room-service fare: High-speed Internet access, Dec. 7, 1998.
Mogul et el., RFC 950—Internet Standard Subnetting Procedure, Network Working Group, Aug. 1985.
PIX, Network Translation Inc., Private Internet Exchange (PIX) Technical White Paper (Network Address Translation and the Private Internet Exchange, 1994.
PIX, Network Translation Inc., Private Internet Exchange (PIX) Technical White Paper, May 16, 1995.
PIX, Network Translation Inc., Private Internet Exchange Reference Manual, Oct. 5, 1995.
R. Droms, RFC 2131—Dynamic Host Configuration Protocol, Network Working Group, Mar. 1997.
Rao, A Proxy-Based Personal Portal, Proceedings of the WebNet99 Conference, Hawaii, Oct. 1999.
Rao, iProxy: A Programmable Proxy Server, Poster Proceedings of the WebNet99 Conference, Oct. 1999.
Rekhter, RFC 1597, Address Allocation for Private Internets, Mar. 1994.
Rekhter, RFC 1918, Address Allocation for Private Internets, Feb. 1996.
Rigney, RFC 2058, Remote Authentication Dial in User Service (RADIUS), Jan. 1997.
Rigney, RFC 2059, RADIUS Accounting, Jan. 1997.
Rupp, INDEX: A Platform for Determining how People Value the Quality of their Internet Access, INDEX Project Report #98-010P, May 1998.
Sandhu et al., Decentralized Group Hierarchies in UNIX: An Experiment and Lessons Learned, Oct. 1998.
Scale, How to Cost-Effectively Scale Web Servers, Packet Magazine, Third Quarter, 1996.
Schooler, A Distributed Architecture for Multimedia Conference Control, Nov. 1991.
Srisuresh et al., RFC 2663—IP Network Address Translator (NAT) Terminology and Considerations, Network Working Group, Aug. 1999.
Team Internet Technical Specifications, Infomine Network Solutions and Services, Helena, Montana, Sep. 7, 1998.
Troy, Timothy N., "Servicing with Software," Hotel & Motel Management, Sep. 20, 1993, p. 28, vol. 208, No. 16, Advanstar Communications, Inc.
Tsuchiya et al., Extending the IP Internet Through Address Reuse, ACM SIGCOMM Computer Communication Review, 1993.
Valencia, RFC 2341, Cisco Layer Two Forwarding (Protocol) "L2F", May 1998.
Victor Bojorquez, CheckPoint Software Tech. Ltd., How to Configure Firewall-1 With Connect Control, Oct. 10, 1999.
Wahl, RFC 2256, A Summary of the X.500(96) User Schema for use with LDAPv3, Dec. 1997.
Webb, Automatic Redirection, Jun. 8, 1997.

(56) References Cited

OTHER PUBLICATIONS

Defendants' Joint Invalidity Contentions, *Nomadix, Inc. v. Hewlett-Packard Company et al.*, No. CV09-08441 DDP (VBKx), Jul. 1, 2010.
Defendants' Supplemental Joint Invalidity Contentions, *Nomadix, Inc. v. Hewlett-Packard Company et al.*, No. CV09-08441 DDP (VBKx), Jul. 15, 2010.
Nomadix, Inc.'s Disclosure of Asserted Claims and Infringement Contentions, *Nomadix, Inc. v. Hewlett-Packard Company et al.*, No. CV09-08441 DDP (VBKx), May 24, 2010.
Plaintiffs Preliminary Invalidity Contentions and Accompanying Document Production Regarding U.S. Patent Nos. 6,996,073 and 7,580,316, *Nomadix, Inc. v. Hewlett-Packard Company et al.*, No. CV09-08441 DDP (VBKx), Jul. 15, 2010.
Plaintiffs Preliminary Invalidity Contentions and Accompanying Document Production, *Nomadix, Inc. v. Hewlett-Packard Company et al.*, No. CV09-08441 DDP (VBKx), Jul. 1, 2010.
U.S. Appl. No. 09/295,966, filed Apr. 21, 1999.
U.S. Appl. No. 10/919,214, filed Aug. 16, 2004—file history of U.S. Publication No. 2005-0021943, published Jan. 27, 2005.
U.S. Appl. No. 11/375,740, filed Mar. 14, 2006—file history of U.S. Publication No. 2006-0174019, published Aug. 3, 2006.
U.S. Appl. No. 11/645,924, filed Dec. 26, 2006—file history of U.S. Publication No. 2007-0294417, published Dec. 20, 2007.
U.S. Appl. No. 60/072,175 by Brothers, filed Jan. 22, 1998.
Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011.
Appenzeller, et al., "User-Friendly Access Control for Public Network Ports," Department of Computer Science, Stanford University, dated Aug. 31, 1998 in 16 pages.
Anderson, et al., The Magicrouter, an Application of Fast Packet Interposing, dated May 17, 1996 in 12 pages.
Exhibit A, Asserted Claims, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 2 pages.
Exhibit B, Supplemental Prior Art List filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 2 pages.
Exhibit C1, Claim Comparison for U.S. Patent No. 6,130,892 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 4 pages.
Exhibit C2, Claim Comparison for U.S. Patent No. 7,088,727 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 7 pages.
Exhibit C3, Claim Comparison for U.S. Patent No. 7,554,995 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 25 pages.
Exhibit C4, Claim Comparison for U.S. Patent No. 6,636,894, filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011, in 18 pages.
Exhibit C5, Claim Comparison for U.S. Patent No. 7,194,554 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 18 pages.
Exhibit C6, Claim Comparison for U.S. Patent No. 6,868,399 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 22 pages.
Exhibit C7, U.S. Patent No. 7,689,716 filed in Defendants' Supplemental Joint Invalidity Contentions, *Nomadix, Inc. v. Hewlett-Packard Company, et al.*, Case No. 09-CV-8441 DDP (VBKx) and *Nomadix, Inc. v. Solutionic Technologies Limited*, Case No. 2:10-CV-00381 DDP (VBKx), (Central District of California, Western Division, and dated Jul. 22, 2011 in 11 pages.
Case No. 09-CV-8441 DDP (VBKx), *Nomadix, Inc. v. Hewlett-Packard Co. et al.*, Defendants' Supplemental Invalidity Contentions Regarding the Prior Art Work of Mr. Ko Ikudome, dated Nov. 4, 2011, 21 pages including Exhibits I1-I3.
Case No. 09-CV-8441 DDP (VBKx), *Nomadix, Inc. v. Hewlett-Packard Co. et al.*, Defendants' Supplemental Invalidity Contentions Regarding the SPINACH Prior Art and the Vos Publication, dated Nov. 21, 2011, 64 pages including Exhibits I4, S1-S3, and V1-V3.
Request for Reexamination of U.S. Pat. No. 6,636,894, filed Nov. 18, 2011, Control No. 95/001,831, 191 pages including Exhibits CC-A through CC-I.
Vos, Jos and Willy Konijnenberg, Linux Firewall Facilities for Kernel-level Packet Screening, Nov. 18, 1996, 19 pages.
Defendants Supplemental Invalidity Contentions.
Arar, Y., Prepaid Internet Access Cards: Instant ISP, http://www.pcworld.com/articie/5045/prepaid_Internet_access_cards_instant_isp.html, PC World, Jul. 14, 1997, 2 pages.
"Auric Web Systems Unveils Software to Reduce Theoperating Costs of Internet Service Providers", http://www.allbusiness.com/technology/software-services-applications-internet/6971623-1.html, AllBusiness, Mar. 25, 1997, 2 pages.
Auric Web Systems, WebGate Card: FAQ, http://web.archive.org/web/19980520083043/http:/www.auricweb.com/faq.html, May 20, 1998, 5 pages.
Eventou, A., Anywhere Online Access, Auric Web Systems find many applications for its WEBGate card that's a prepaid key to Internet, Dec. 22, 1997, 1 page.
Auric Web Systems, InterACS: Internet Access Control System: Solutions for the Internet Service Provider, http://web.archive.org/web/19970708234615/http:/www.auricweb.com/InterACS.html, Jul. 8, 1997, 5 pages.
McKinley, R., Prepaid Internet Access Cards, http://www.cardtrak.com/news/1997/07/14/prepaid_internet_access_cards, CardTrak.com, Jul. 14, 1997, 1 page.
Auric Web Systems, The Intercard System Prepaid Internet Access Cards, http://web.archive.org/web/19970708234054/http:/www.auricweb.com/Accesscard.html, Auric Web Systems, Jul. 8, 1997, 4 pages.
First Claim Construction Order, *Nomadix, Inc. v. Hewlett-Packard Company et al.*, No. CV-09-08441 DDP (VBKx), filed Aug. 31, 2011 in 17 pages.
Second Claim Construction Order, *Nomadix, Inc. v. Hewlett-Packard Company, et al.*, No. CV-09-08441 DDP (VBKx), filed Oct. 24, 2011 in 19 pages.
Chen, et al. : "Popeye—Using Fine-grained Network Access Control to Support Mobile Users and Protect Intranet Hosts", Dec. 11, 2000.
Poger, et al.: "Secure Public Internet Access Handler (SPINACH)", Dec. 1997.
Appenzeller, et al: "User-Friendly Access Control for Public Network Ports", Mar. 1999.

(56) References Cited

OTHER PUBLICATIONS

Maruyama et al, "*A secure LAN sockets system for everyone which need not modity existing DHCP clients*", Study Report of Information Processing Society of Japan, Jul. 16, 1999, vol. 99, No. 56, pp. 131-136.

Best Western's Supplemental Claim Construction Brief, *Linksmart Wireless Technology, LLC, v. T-Mobile USA, Inc., et al*, Case No. 2:08-cv-00264-DF-CE, filed Apr. 16, 2010.

Claim Construction Brief of Defendants, *Linksmart Wireless Technology, LLC, v. T-Mobile USA, Inc., et al*, Case No. 2:08-cv-00264-DF-CE, filed Apr. 16, 2010.

Comer, Internetworking with TCP/IP, 3rd ed. 1995.

Data Communication Over the Telephone Network: Procedures for Starting Sessions of Data Transmission Over the General Switched Telephone Network, ITU-T Recommendation V.8, approved on Sep. 20, 1994.

Declaration of Kevin Jeffay, Ph.D., *Linksmart Wireless Technology, LLC, v. T-Mobile USA, Inc., et al*, Case No. 2:08-cv-00264-DF-CE, filed Apr. 16, 2010.

Declaration of Noah A. Levine in Support of Claim Construction Brief of Defendants,, *Linksmart Wireless Technology, LLC, v. T-Mobile USA, Inc., et al*, Case No. 2:08-cv-00264-DF-CE, filed Apr. 16, 2010.

Defendant Barnes & Noble Booksellers, Inc.'s First Amended Answer to Plaintiff's Complaint, *Linksmart Wireless Technology, LLC, v. T-Mobile USA, Inc., et al.*, Case No. 2:08-cv-00264-DF-CE (U.S.D.C., E. Dist. Texas), filed Apr. 22, 2010.

Defendant Mail Boxes Etc., Inc.'s First Amended Answer to Plaintiff's Complaint, *Linksmart Wireless Technology, LLC, v. T-Mobile USA, Inc., et al.*, Case No. 2:08-cv-00264-DF-CE (U.S.D.C., E. Dist. Texas), filed Apr. 22, 2010.

Defendant SBC Internet Services, Inc. D/B/A AT&T Internet Services's ("AT&T") First Amended Answer to Plaintiff's Complaint, *Linksmart Wireless Technology, LLC, v. T-Mobile USA, Inc., et al.*, Case No. 2:08-cv-00264-DF-CE (U.S.D.C., E. Dist. Texas), filed Apr. 22, 2010.

Defendants' Patent Local Rule 4-2 Preliminary Constructions and Extrinsic Evidence, *Linksmart Wireless Technology, LLC, v. T-Mobile USA, Inc., et al*, Case No. 2:08-cv-00264-DF-CE, filed Jan. 21, 2010.

Defendants' SBC (AT&T), Wayport, McDonalds, Barnes & Noble and Mail Boxes etc. Joint Unopposed Motion for Leave to Amend Their Respective First Answers and Counterclaims, *Linksmart Wireless Technology, LLC, v. T-Mobile USA, Inc., et al*, Case No. 2:08-cv-00264-DF-CE, filed Apr. 22, 2010 (U.S.D.C., E. Dist., Texas).

How to Determinethe Version of Windows 95/98/Me in Use, http://support.microsoft.com/kb/158238, Jan. 21, 2010.

Internet Technologies Handbook, Chapter 15, Dial-up Technology, Cisco Systems, Indianapolis: Ciscos Press, 1998.

Levene, Mark and Loizou, George, A Guided Tour of Relational Databases and Beyond, Springer-Verlag London Limited, Great Britain, 1999.

McDonald's Corp.'s First Amended Answer, Defenses, and Counterclaims to Complaint, *Linksmart Wireless Technology, LLC, v. T-Mobile USA, Inc., et al.*, Case No. 2:08-cv-00264-DF-CE (U.S.D.C., E. Dist. Texas), filed Apr. 22, 2010.

Microsoft TechNet: Dial-Up Networking and Mobile Computing: The Basics, http://technet.microsoft.com/en-us/library/cc751107, 2010.

Microsoft WindowsNT ResourceKit, Version 4.0, Supplement One, Microsoft Press, 1997.

Microsoft WindowsNT Workstation ResourceKit: Comprehensive Resource Guide and Utilities for Windows NT Workstation Version 4.0, Microsoft Press, 1996.

Microsoft Computer Dictionary, Fourth Edition, Microsoft Press, 1999.

Newton, Harry, Newton's Telecom Dictionary, p. 206, Telecom Books and Flatiron Publishing, Miller Freeman, Inc., New York, NY, 1998.

Person, et al., Using Windows 95, Platinum Edition, pp. 205-209, 812-813, Que Corporation, 1996.

Simpson and Weiner, The Oxford English Dictionary, 2nd Edition, vol. III, pp. 514-515, Oxford University Press, 1989.

Simpson and Weiner, The Oxford English Dictionary, 2nd Edition, vol. VII, p. 881, Oxford University Press, 1989.

Supplementary Information Disclosure Statement submitted on May 13, 2010 in U.S. Patent Reexamination Proceedings: 90/009,301, Filed Dec. 17, 2008.

Wayport, Inc.'s First Amended Answer, Defenses, and Counterclaims to Complaint, *Linksmart Wireless Technology, LLC, v. T-Mobile USA, Inc., et al.*, Case No. 2:08-cv-00264-DF-CE (U.S.D.C., E. Dist. Texas), filed Apr. 22, 2010.

Windows History: Windows Desktop Timeline, Jun. 30, 2003, available at http://www.microsoft.com/windows/WinHistoryProGraphic.mspx on Jan. 21, 2010, Microsoft, pp. 1-2.

Complaint filed Jan. 19, 2010, *Nomadix, Inc. v. SolutionInc Technologies Ltd.*, No. CV10-0381 (C.D. Cal. 2010).

Complaint filed Nov. 17, 2009, *Nomadix, Inc. v. Hewlett-Packard Co..*, No. CV09-8441 (C.D. Cal. 2009).

Apostolopoulos, G., et al.: "IBM Research Report L5: A Self Learning Layer-5 Switch", Computer Science/Mathematics, RC 21461(96867)Apr. 29, 1999, pp. 1-19.

Berkowitz, Howard C.: PIER Working Group, Router Renumbering Guide, Aug. 1996, http://tools.ietf.org/pdf/draft-ietf-pier-rr-02.pdf.

Bestavros, A. and Michael J. Ocean, Chapter 12: "Virtualization and Programming Support for Video Sensor Networks with Application to Wireless and Physical Security," Distributed Video Sensor Networks, 2011, pp. 179-192.

Case No. 07-1946 GPS (VBK) *Nomadix, Inc. v. Second Rule LLC*, Defendant's Response to Plaintiff's Claim Chart, dated Feb. 19, 2008.

Case No. 07-1946 GPS (VBK) *Nomadix, Inc. v. Second Rule LLC*, Defendant's First Supplemental Response to Plaintiff's Claim Chart dated Apr. 18, 2008.

Case No. 07-1946 DDP (VBKx) *Nomadix, Inc. v. Second Rule LLC*, Declaration of Mark Lezama in Support of Nomadix, Inc.'s Opening Claim Construction Brief, dated Aug. 4. 2008.

Case No. 07-1946 DDP (VBKx) *Nomadix, Inc. v. Second Rule LLC*, Amended Claim Construction Order (Motion filed on Aug. 4, 2008).

Case No. 07-1946 DDP (VBKx) *Nomadix, Inc. v. Second Rule LLC*, Declaration of Douglas G. Muehlhauser in Support of Nomadix Inc.'s Claim Construction Brief, dated Aug. 22, 2008.

Case No. 07-1946 DDP (VBKx) *Nomadix, Inc. v. Second Rule LLC*, Declaration of Mark Lezama in Support of Nomadix, Inc.'s Reply Claim Construction Brief, dated Aug. 22, 2008.

Case No. 07-1946 DDP (VBKx) *Nomadix, Inc. v. Second Rule LLC*, Defendant's Supplemental Post-Hearing Claim Construction Brief, dated Sep. 26, 2008.

Case No. 07-1946 DDP (VBKx) *Nomadix, Inc. v. Second Rule LLC*, Nomadix, Inc.'s Supplemental Claim Construction Brief, dated Sep. 26, 2008.

Case No. 07-1946 DDP (VBKx) *Nomadix, Inc. v. Second Rule LLC*, Order Requesting Supplemental Briefing re: Second Rule LLC's Motion for Partial Summary Judgment, dated Oct. 21, 2008.

Case No. CV 09-8441 (C.D. Cal. 2009), *Nomadix, Inc. v. Hewlett-Packard Co.*, Invalidity Expert Report of Kevin Jeffay, Ph.D. (redacted), Jan. 31, 2012.

Case No. CV 09-8441 (C.D. Cal. 2009), *Nomadix, Inc. v. Hewlett-Packard Co.*, Expert Report of Stuart G. Stubblebine, Ph.D. Regarding Validity of Nomadix, Inc.'s Patents (redacted), Mar. 19, 2012.

Case No. CV 09-8441 (C.D. Cal. 2009), *Nomadix, Inc. v. Hewlett-Packard Co.*, Defendant Hewlett-Packard Company's Memorandum of Contentions of Fact and Law, filed May 29, 2012.

Case No. CV 09-8441 (C.D. Cal. 2009), *Nomadix, Inc. v. Hewlett-Packard Co.*, Nomadix, Inc.'s Memorandum of Contentions of Fact and Law, filed May 29, 2012.

Eda, Hiroki, et al., "Mobile Information Device: Navigator on Palm, Second Section, Supporting System: Combining positions and information occurs, and the Internet becomes its core", Nikkei Electronics, Jul. 13, 1998, vol. 721, pp. 117-125.

(56) References Cited

OTHER PUBLICATIONS

Heilbronner, S.: "Requirements for Policy-Based Management of Nomadic Computing Infrastructions," Proc. of the Sixth Workshop of the HP Openview University Association (HPOVUA '99), Bologna, Italy, Jun. 1999.
Johnson, D. B., "Ubiquitous Mobile Host Internetworking", 0-8186-4000-6/93 1993 IEEE, pp. 85-90.
Kalkbrenner, et al., Quality of Service (QoS) in Distributed Hypermedia-Systems, Jul. 1995, IEEE, v 10-8186-7180, pp. 529-534.
Kausar, et al., A Charging Model for Sessions on the Internet, European conference on Multimedia Applications, Services and Techniques, Department of Computer Science, University College London, 1999. pp. 246-261.
Korba, Larry, "Security System for Wireless Local Area Networks," Ninth IEEE International Symposium on Personal, Indoor and Mobile Radio Communications, Sep. 8, 1998, pp. 1550-1554.
Lee, Chooi-Tian and J.W. Harris, "Designing a Virtual Access Control Configuration Protocol for Implementation over ISDN and Shared-Media Networks," Proceedings 21st IEEE Conference on Local Computer Networks, Oct. 13, 1996, pp. 116-125.
Livingston Enterprises, Inc., ChoiceNet Administrator's Guide, Jan. 1997, Pleasanton, CA, available at http://portmasters.com/tech/docs/pdf/choice.pdf.
MacEachern, D.; Apache/Perl Integration Project; ReadMe; 2 pages; <http://svn.apache.org/viewvc/perl/modperl/branches/1.x/README?revision=176423>, Dec. 6, 1997.
Network Working Group Request for Comments: 1009—Requirements for Internet Gateways (Jun. 1987).
Network Working Group Request for Comments: 1027—Using ARP to Implement Transparent Subnet Gateways (Oct. 1987).
Network Working Group Request for Comments: 1034—Domain Names—Concepts and Facilities (Nov. 1987).
Network Working Group Request for Comments: 1531—Dynamic Host Confirmation Protocol (Oct. 1993).
Network Working Group Request for Comments: 1919—Classical Versus Transparent IP Proxies (Mar. 1996).
Network Working Group Request for Comments: 1945—Hypertext Transfer Protocol—HTTP/1.0 (May 1996).
Network Working Group Request for Comments: 826—Ethernet Address Resolution Protocol (Nov. 1982).
Network Working Group Request for Comments: 894—Standards for Transmission of IP Datagrams Over Ethernet Networks (Apr. 1984).
Network Working Group Request for Comments: 925—Multi-LAN Address Resolution (Oct. 1984).
Networking Working Group, Radius Accounting, Request for Comments: 2139, Obsoletes: 2059; Category: Informational, C. Rigney, Livingston, Apr. 1997; IP 3 002991-003013.
PIX, Network Translation Inc., Private Exchange (PIX) Technical White Paper (Network Address Translation and the Private Internet Exchange, 1994.
Rajagopalan, Mobile Internetworking Protocols for Wireless Networks with ATM Backbones, MILCOM '97 Conference Proceedings, Nov. 2, 1997.
Rao, A Proxy-Based Personal Web Archiving Service, ACM SIGOPS Operating Systems Review, Jan. 2001.
Richards, et al., Mapping User Level QOS from a Single Parameter, 1988, pp. 1-15.
Salifu, Abdul-Mumin, "Detection of Man-in-the-Middle Attack in IEEE 802.11 Networks," M.S. Thesis, Kwame Nkrumah University of Science and Technology, May 2011, 79 pages.
Single-User Network Access Security TACACS+ http://www.cisco.com/warp/public/614/7.html IP3 002876-002884; dated Aug. 10, 2005.
Stoll, Frank, "The Need for Decentralization and Privacy in Mobile Communications Networks," Computers & Security vol. 14 iss. 6, 1995, pp. 527-539.
Tantawy, Ahmed N. and Martina Zitterbart, "A Scheme for High-Performance LAN Interconnection Across Public MAN's," IEEE Journal on Selected Areas in Communications, vol. 11, No. 8, Oct. 1993, pp. 1133-1144.
The 'Security Digest' Archives, TCP-IP Distribution List, Aug. 1994, http://securitydigest.org/tcp-ip/archive/1994/08.
Ex Parte Reexamination Certificate for U.S. Pat. No. 6,779,118 C1 (8926th), for User Specific Automatic Data Redirection System, Mar. 27, 2012.
Decision in Request for Reexamination of U.S. Pat. No. 6,636,894, filed Nov. 18, 2011, Control No. 95/001,831, mailed Dec. 20, 2011, 19 pages.
Decision on Petition under 37 C.F.R. § 1.181 and 1.927, Control No. 95/001,831, mailed Feb. 28, 2012, 15 pages.
Comments on the Denial of Petition under 37 C.F.R. §§ 1.181 and 1.927 for Review of the Examiner's Order Denying Inter Partes Reexamination, in Proceeding No. 95/001,831, for U.S. Pat. No. 6,636,894, dated Jun. 26, 2012.
Office Action in U.S. Appl. No. 13/271,099 mailed Apr. 9, 2012.
Office Action in U.S. Appl. No. 13/271,099 mailed May 9, 2012.
Office Action in U.S. Appl. No. 13/271,099 mailed Sep. 10, 2012.
Petition Decision in U.S. Appl. No. 13/271,099 mailed Apr. 16, 2013.
Petition Decision in U.S. Appl. No. 13/271,099 mailed Jun. 12, 2013.
Office Action in U.S. Appl. No. 12/685,585 mailed Nov. 4, 2011.
Decision for Granting Request for Prioritized Examination in U.S. Appl. No. 12/685,585 mailed Jun. 12, 2012.
Office Action in U.S. Appl. No. 12/875,043 mailed Sep. 9, 2011.
Office Action in U.S. Appl. No. 12/875,043 mailed Dec. 21, 2011.
Office Action in U.S. Appl. No. 13/244,866 mailed Nov. 18, 2011.
Office Action in Canadian Application No. 2725720 mailed Apr. 30, 2013.
Decision of Rejection, in JP App. No. 2001-533680, Office Action dated Jan. 26, 2010.
Decision of Rejection, in JP App. No. 2001-533680, dated Dec. 14, 2010.
Decision on Appeal in JP App. No. 2001-533680, dated Aug. 7, 2012.
Office Action dated Feb. 15, 2011, JP Patent Application No. 2010-167190.
Extended Search Report dated Oct. 8, 2009, Application No. EP 09005810.8.
Response to Examination Report filed Jun. 7, 2010, Application No. EP 09005810.8.
Office Action dated Apr. 27, 2009, CA Patent Application No. 2,388,623.
Office Action dated Jun. 15, 2010 in CA Patent Application No. 2698604.
Office Action dated Jul. 18, 2012 in CA Patent Application No. 2698604.
Office Action dated Sep. 25, 2009 in JP Patent Application No. 2001-533719.
Decision of Rejection in JP Patent Application No. 2001-533719 dated Apr. 6, 2010.
Preliminary Report of Inquiry Letter in JP Patent Application No. 2001-533719 dated Dec. 26, 2011.
Notice of Allowance in JP Application No. 2001-533719 entitled "Systems and Methods for Redirecting Users Attempting to Access a Network Site," mailed Jun. 19, 2012.

* cited by examiner

SYSTEMS AND METHODS FOR AUTHORIZING, AUTHENTICATING AND ACCOUNTING USERS HAVING TRANSPARENT COMPUTER ACCESS TO A NETWORK USING A GATEWAY DEVICE

CROSS-REFERENCE TO RELATED APPLICATIONS

The present application claims priority from U.S. Provisional Patent Application Ser. No. 60/111,497 filed Dec. 8, 1998, the contents of which are incorporated by reference.

FIELD OF THE INVENTION

The present invention relates generally to a gateway device and, more particularly, to a universal network gateway for enabling a computer to transparently access and communicate with a service provider network.

BACKGROUND OF THE INVENTION

In order for a computer to function properly in a network environment, the computer must be appropriately configured. Among other things, this configuration process establishes the protocol and other parameters by which the computer transmits and receives data. In one common example, a plurality of computers are networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time that the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy. Accordingly, special software must also typically be loaded onto the user's computer to support reconfiguration.

In addition, user digital communications addresses such as internet or IP addresses are conventionally associated with a fixed physical location, such as a user's business telephone line. However, portable communications devices such as laptop computers are becoming increasingly popular, and it is common for a user to access the internet from locations as diverse as hotel rooms and airplanes.

Digital communications networks are set up to route communications addressed to a communication address to the associated physical location. Thus, if a laptop computer is connected to a remote location, communications to and from the computer will not be associated with the user's communications address.

In order for a computer (host) to communicate across a network (e.g., the internet), software protocols (e.g., Transport Control Protocol/Internet Protocol (TCP/IP)) must be loaded into the host. A host computer sends information (i.e., packets of data) to devices on the network (routers) which receive the packets and send the packets back to the destination host.

The destination host will route replies back using a similar process. Each host computer and router must be configured so it will know who to send the packets of data to. A router will receive the packets only if the host computers specifically send (address) the packets to that router. If a host is configured incorrectly (bad address), then the host computer and router will be unable to communicate.

With the advent of mobile computers (laptops) and the desire to plug them into various networks to gain access to the resources on the network and internet, a mobile computer must be configured for each network it plugs into. Traditionally this new configuration can be done either (i) manually in software on the mobile computer (usually causing the mobile computer to be restarted to load in the new configuration), or (ii) with a new set of protocols which must be utilized on the mobile computer to obtain the configuration information from a device on the network to which the computer is being connected. When new services (protocols) are created to add functionality to the host computers, these new protocols must be updated in the host computers or routers, depending upon the type of new functionality being added.

As described by U.S. patent application Ser. No. 08/816,174 now abandoned and U.S. Provisional Patent Application Nos. 60/111,497, 60/160,973, 60/161,189, 60/161,139, 60/160,890 and 60/161,182, a universal subscriber gateway device has been developed by Nomadix, Inc. of Westlake Village, Calif. The contents of these applications are incorporated herein by reference. The gateway device serves as an interface connecting the user to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the Internet.

The portable computer user, and more specifically the remote or laptop user, benefits from being able to access a myriad of computer networks without having to undergo the time-consuming and all-too-often daunting task of reconfiguring their host computer in accordance with network specific configurations. In addition, no additional software need be loaded onto the computer prior to connection to the other network. From another perspective, the network service provider benefits from avoiding "on-site" visits and/or technical support calls from the user who is unable to properly reconfigure the portable computer. In this fashion, the gateway device is capable of providing more efficient network access and network maintenance to the user and the network operator.

Gateway devices are typically used to provide network access to the remote portable computer user, such as users in hotels, airports and other locations where the remote portable computer user may reside. Additionally, gateway devices have found wide-spread use in multi-resident dwellings as a means of providing the residents an intranet that networks the residents, broadband Internet access and the capability to adapt to the variances of the resident's individual enterprise networks. With the advent of even smaller portable computing devices, such as handhelds, PDAs, and the like, the locations where these users may reside becomes almost limitless.

User access to computer networks has been traditionally based upon the identity of the computer or computer user rather than the location of the accessing computer. For example, in conventional dial up modem access to computer networks, such as the Internet, a user must typically enter identification information such as the user's name and password. This user input information is then compared to a database of user profiles to determine if the user should be granted access. The database may also indicate the type of access and other related information, such as fees due. For example, where a subscriber to an Internet Service Provider (ISP) has purchased Internet access, a user profile database may contain information which not only enables the user to be authenticated, but tracks the user success for accounting purposes, such as maintaining a history of the user's access time on the network.

However, where the location-based access is established, access to the network cannot be based upon an individual user or computer, as multiple persons can obtain access from a given location, possibly utilizing different computers. Moreover, requiring each user to enter identification information for access overrides any convenience offered by simple, transparent location-based access to computer networks. Transparent network access is also impeded where access is not based upon location-based identification, but rather based upon user input identification information, where the gateway device enables a user to access networks based upon the user's computer settings. For instance, if a user's computer is configured to access a home network, identifying the computer may require the computer to be reconfigured.

Typical network access servers typically allow access to a server based upon a user's information, such as a user name. Authentication was typically done via a user name and password, which is an all or nothing approach. In other words, a user is either allowed access or denied access to a network. Therefore, user's can not be dynamically authorized access to a network such that the user's access and authorization to particular networks or sites can be determined and varied based upon attributes associated with the user, user's location, or packets received from the user's computer.

What is needed is an AAA method and system that allows users dynamic access based upon any number of variables, such as a user's location, a user name or password, a user's location. It would be advantageous for a user to be authorized access based on these variables. Furthermore, it would be advantageous for users to have flexible access to particular sites or services based upon these attributes. Therefore, an ISP or enterprise network can selectively permit access to users, and permit the user.

Therefore, an Authentication, Authorization and Accounting method and system would be desirable which enables a user transparent access to a computer network employing a gateway device, where the computer network can dynamically and selectively authorize a network access. Furthermore, authentication and access rights can be transparently based upon the location from which access is requested, or based upon another attribute associated with the user's computer so that the user is not required to be queried for information and no additional configuration software need be loaded on the user's computer. Moreover, if the user is queried for access information, the user's data should be stored such that subsequent attempts to access the network do not require the user to establish authorization.

SUMMARY OF THE INVENTION

The present invention comprises a method and system for selectively implementing and enforcing Authentication, Authorization and Accounting (AAA). The authentication capability can be based upon multiple methods. First, AAA can be done based upon where the traffic is originating, such as a location, computer, circuit, or user. Secondly, the authentication and authorization capability can be based upon the type of services the user is attempting to access, such as a destination address. This can be a destination port or Internet address, a TCP port, a network. Third, AAA can be based upon the content type or protocol being transmitted. For example, each packet can be filtered through the selective AAA process, so that a user can be authorized access to a particular location. Each time the user attempts to access a different location, the user is subject to the AAA, so the user may be prevented access from a particular site the AAA method deems inaccessible to the user based upon the user's authorization. Alternatively, the AAA method according to the present invention allows users to connect directly to a specific site, such as credit card or billing servers which collect billing information, which can indicate that the user has paid, so that the user is thereafter authorized access to networks. Additionally, a user's authorization can depend upon a specific time, so that the user can be kicked off a network at a specific time, after a specific time has elapsed, or according to other dynamic information determined by the network provider.

According to one embodiment of the invention, a method for transparently authorizing, authenticating and accounting users having access to a destination network is disclosed, wherein the users otherwise have access to a home network through home network settings resident on the users' computers, and wherein the users can access the destination network without altering the home network settings. The method includes receiving at a gateway device a request from a user for access to the destination network and identifying an attribute associated with the user based upon a packet received by the gateway device, wherein the packet is transmitted from the user's computer, wherein the user computer remains configured for accessing the home network, and wherein no additional configuration software need be installed on the user computer. The method also includes accessing a user profile corresponding to the user and stored in a user profile database, where the user profile is accessed based upon the attribute associated with the user, and determining if the user is entitled to access the destination network based upon the user profile.

According to one aspect of the invention, a location identifier is assigned to the location from which the request for access to the destination network is transmitted, where the location identifier is the attribute associated with the user. Thus, the packets received by the gateway device indicate the locations from which the requests were transmitted. The location identifier may be a virtual local area network (VLAN) ID assigned to the location from which the request for access was transmitted.

Furthermore, according to one aspect of the method of the present invention, the user profile database can be updated when new users access the destination network such that the user can be quickly authorized access once identified by a user name or password. Additionally, a historical log of user access to the destination network may be maintained in respective user profiles so that the system can accurately bill users for access to the destination network.

According to the method of the present invention, determining if the user is entitled to access the destination network can include denying the user access where the user's profile indicates that the user is denied access. However, the user may be directed to a login page in instances which the user's profile is not located within the user profile database.

According to another embodiment of the invention, a system for authorizing, authenticating and accounting users having transparent access to a destination network is disclosed, where the users otherwise have access to a home network through home network settings resident on the users' computers, and wherein the users can access the destination network without altering the home network settings. The system includes a gateway device for receiving a request from a user for access to the destination network, and means for identifying an attribute associated with the user based upon a packet received by the gateway device, wherein the packet is transmitted from the user's computer, wherein the user's computer is configured for accessing the home network, and wherein no additional configuration software need be installed on the user computer. The system also includes a user profile database comprising stored access information that is in communication with the gateway device, wherein access information corresponding to the user is identified by the attribute associated with the user, and an Authentication, Authorization and Accounting (AAA) server in communication with the gateway device and user profile database, where the AAA server determines if user is entitled to access the destination network based upon the access information stored within the user profile database.

According to one aspect of the invention, the means for identifying can be provided by an access concentrator in communication with the gateway device. Furthermore, the packet transmitted to the gateway device can include a VLAN ID, a circuit ID, or a media access control (MAC) address for identifying the location from which the request for access was transmitted.

The user profile database includes a plurality of user profiles, wherein each respective user profile of the plurality of user profiles contains access information, and where each respective user profile contains historical data relating to the duration of destination network access for use in determining the charges due for the destination network access. Additionally, the user profile database can be located within the AAA server. The AAA server, can, in turn, be located within the gateway device.

The Authentication, Authorization and Accounting method and system according to the present invention enables users transparent access to a computer network employing a gateway device, where the computer network can authenticate and authorize access rights based upon the location from which access is requested, or based upon another attribute associated with the user in a manner transparent to the user. In this regard, the method and system of the present invention permit Authentication, Authorization and Accounting without requiring the user to reconfigure their computer and without requiring additional configuration software to be loaded upon the user's computer.

According to another embodiment, a portable "Nomadic" router or translator is provided. The nomadic router enables a laptop computer or other portable terminal which is configured to be connected to a local home network to be connected to any location on the internet or other digital data communication system. The nomadic router automatically and transparently re-configures the terminal to its new location and processes outgoing and incoming data:

The nomadic router includes a processor which appears as the home network to the terminal, and appears as the terminal to the communication system. The terminal has a permanent address, the nomadic router has a router address, and the terminal transmits outgoing data to the system including the permanent address as a source address. The processor translates the outgoing data by replacing the permanent address with the router address as the source address. The terminal receives incoming data from the system including the router address as a destination address, and the processor translates the incoming data by replacing the router address with the permanent address as the destination address.

The terminal can be directly connected to a point on a local network, and the nomadic router connected to another point in the network. The nomadic router can be employed to implement numerous applications including nomadic e-mail, network file synchronizer, database synchronizer, instant network, nomadic internet, mobile virtual private network and trade show router, and can also be utilized as a fixed nomadic router.

The nomadic router can be implemented as software and/or hardware. The nomadic router establishes location and device transparency for a digital communication terminal such as a laptop computer. The terminal can be connected to any of a variety of networks and locations which can employ a variety of communication interface devices.

The nomadic router automatically converts the actual location address to a unique communication address for the user such as an internet address, such that the terminal performs communications originating from the communication address regardless of the physical location of the terminal.

The nomadic router also automatically configures the terminal to utilize a selected one of the interface devices, and switches from one to another if the first device malfunctions or becomes otherwise unavailable.

The nomadic router includes software and services which can be packaged in a personal portable device to support a rich set of computing and communications capabilities and services to accommodate the mobility of nomads (users) in a transparent, integrated, and convenient form. This is accomplished by providing device transparency and location transparency to the user.

There is a vast array of communication device alternatives such as Ethernet, Wireless LAN, and dialup modem among which the users switches when in the office, moving around the office, or on the road (such as at a hotel, airport, or home). The device transparency in the nomadic router provides seamless switching among these devices (easily, transparently, intelligently, and without session loss. The location transparency support in the nomadic router prevents users from having to reconfigure (e.g., IP and gateway address) their network device (laptop) each time they move to a new network or subnetwork.

The present nomadic router provides a separation of location and identity by providing a permanent IP address to the network device (host). The nomadic router provides independence between the location, communication device, and the host operating system. There are no new standards need to be adopted by the networking community. All specialized processing is stored internally to the nomadic router with standard interfaces to the host device and various communication devices.

The nomadic router supports the migration to Network Computers by providing identity and security services for the user. The nomadic router also supports multiple parallel communication paths across the communications network for soft handoff, increased throughput, and fault tolerance by supporting multiple communication substrates.

A portable router for enabling a data communication terminal to be location and device transparent according to the present invention, comprises: a first module for storing a digital communication address of a user; a second module for detecting a data communication network location to which the terminal is connected; a third module for detecting communication devices that are connected to the terminal; a fourth module for establishing data communication between the terminal and the network such that the communication address of the location from the second module is automatically converted to the communication address of the user from the first module; and a fifth module for automatically selecting a communication device which was detected by the third module for use by the fourth module.

The present nomadic router utilizes a unique process embodied in a self-contained apparatus which manipulates the packets of data being sent between the host computers and routers. This process provides an intelligent active universal translation of the content of the packets being transmitted between the host computer and nomadic router. The translation allows the host computer to communicate with the nomadic router even when the host computer is not configured to communicate with the nomadic router.

This is achieved by the nomadic router pretending to be the router which the host is configured for, and by the nomadic router pretending to be the host which the router expects to communicate with. Therefore, the nomadic router supports the mobility of computers in that it enables these computers to plug into the network at different locations (location independence) without having to install, configure, or utilize any new protocols on the mobile computer.

The mobile computer continues to operate without being aware of the change in location or new configuration, and the nomadic router translates the data allowing the host to think that it is communicating with the router. By putting this process in a self-contained apparatus, the deployment of new protocols can be performed independently of the host computer and its operating system (host independent).

All specialized processing and translation is stored internally in the nomadic router with standard interfaces to the host device and various communication devices. Thus, no new standards need be adopted. By removing the complexity of supporting different network environments out of the mobile computer and into this self-contained apparatus, the nomadic router allows the host computer to maintain a very minimal set of software protocols and functionality (e.g., the minimum functionality typically installed in network computers) to communicate-across the network.

The nomadic router translation ability also enables the use of alternate communication paths (device independence) without the host computer being aware of any new communication device that utilizes an alternate communication path. The translation of the packets is done not just at the physical, link, or network layer of the protocol stack but at the transport and application layers as well. This allows the network card, protocol stack, and application running on the host computer to be independent of the network environment and configuration.

As an example of the communication device independence, the translation allows soft handoff, increased throughput, and fault tolerance by supporting multiple communication substrates. In addition, the nomadic router translation ability provides a flexible process for deploying enhanced nomadic and mobile computing software and services such as filtering of packets and determining which packets should be allowed to be transmitted between the mobile computer and the nomadic router or local area network (Internal Firewall).

The router apparatus can be: (i) carried with the mobile user (e.g., using an external box); (ii) attached to the mobile computer (e.g., PCMCIA card); (iii) installed inside the mobile computer (e.g., a chip in the laptop); (iv) or installed into the network infrastructure so it will already be there when the mobile computer user arrives (e.g., a box which plugs into the local area network translating packets being sent between the host and nomadic router, or a chip which is installed in routers on the network). The nomadic router can also be provided in the form of software which is loaded into and run in the mobile computer or another computer or router on a network.

These and other features and advantages of the present invention will be apparent to those skilled in the art from the following detailed description, taken together with the accompanying drawings, in which like reference numerals refer to like parts.

DETAILED DESCRIPTION OF ONE EMBODIMENT OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
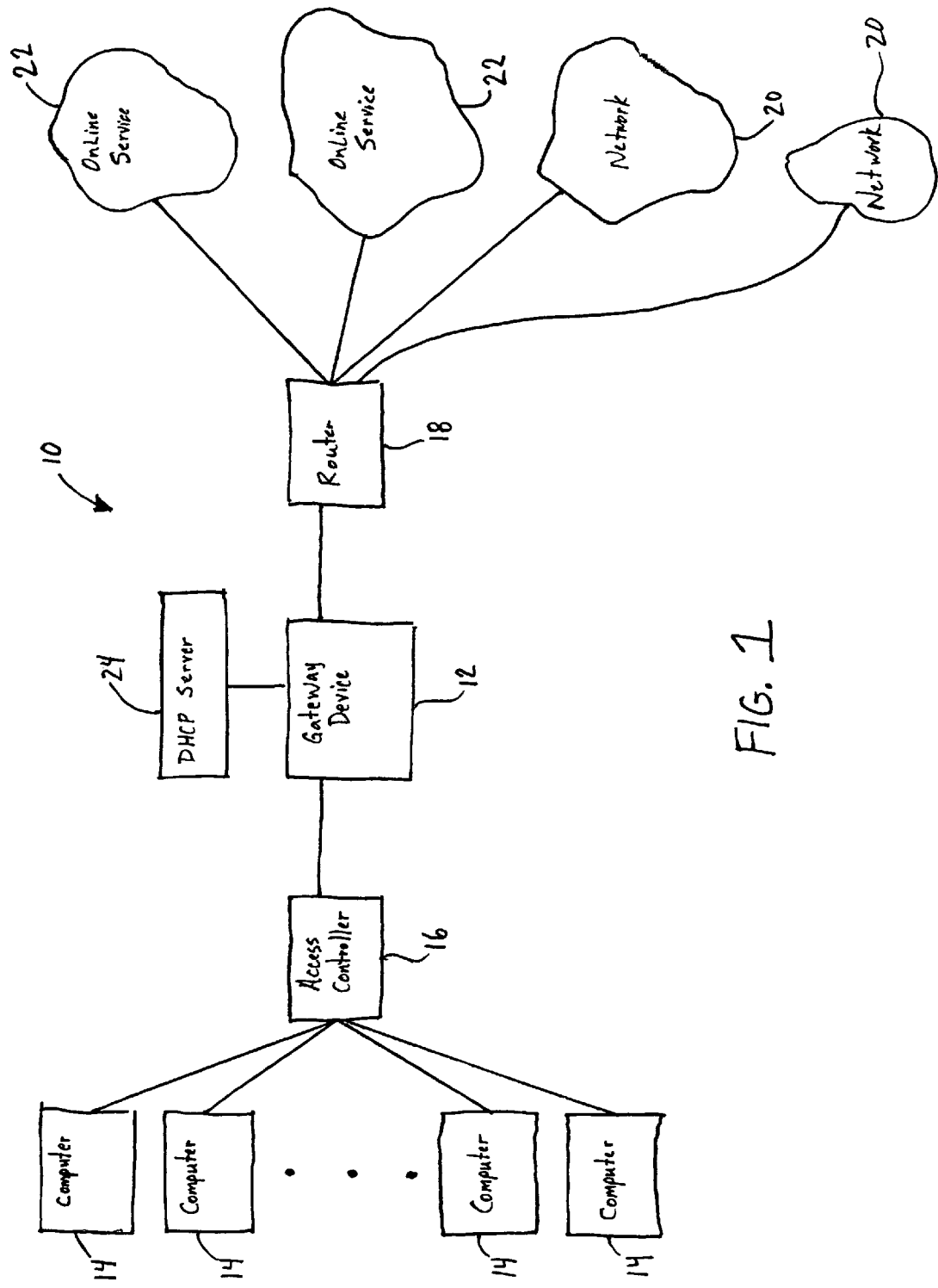
FIG. 1 is a block diagram of a computer system that includes a gateway device for automatically configuring one or more computers to communicate via the gateway device with other networks or other online services, according to one embodiment of the present invention.

Referring now to FIG. 1, a computer system 10 including a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel, business, or a multi-dwelling unit. Alternatively, the computers 14 can be plugged into ports in an airport, an arena, or the like. The gateway device 12 provides an interface between the plurality of computers 14 and the various networks 20 or other online services 22. One embodiment of a gateway device has been described by the aforementioned U.S. patent application Ser. No. 08/816,174.

Most commonly, the gateway device 12 is located near the computers 14 at a relatively low position in the overall network (i.e., the gateway device 12 will be located within the hotel, multi-unit residence, airport, etc.). However, the gateway device 12 can be located at a higher position in the system by being located closer to the various networks 20 or other online services 22, if so desired. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access concentrator 16 or a router 18. For ample, the gateway device 12 could be located at a network operating center or could be located before or after a router 18 in the computer network. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end for signals transmitted via coaxial cables, a wireless access point (WAP) for signals transmitted via a wireless network, a cable modem termination shelf (CMTS), a switch or the like. As also shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately route traffic to and from the various networks 20 or online services 22. In this regard, the gateway device 12 typically establishes a link with one or more routers. The routers, in turn, establish links with the servers of other networks or other online service providers, such as internet service providers, based upon the user's selection. It will be appreciated by one of ordinary skill in the art that one or more devices illustrated in FIG. 1 may be combinable. For example, although not shown, the router 18 may be located entirely within the gateway device 12.

Figure 2:
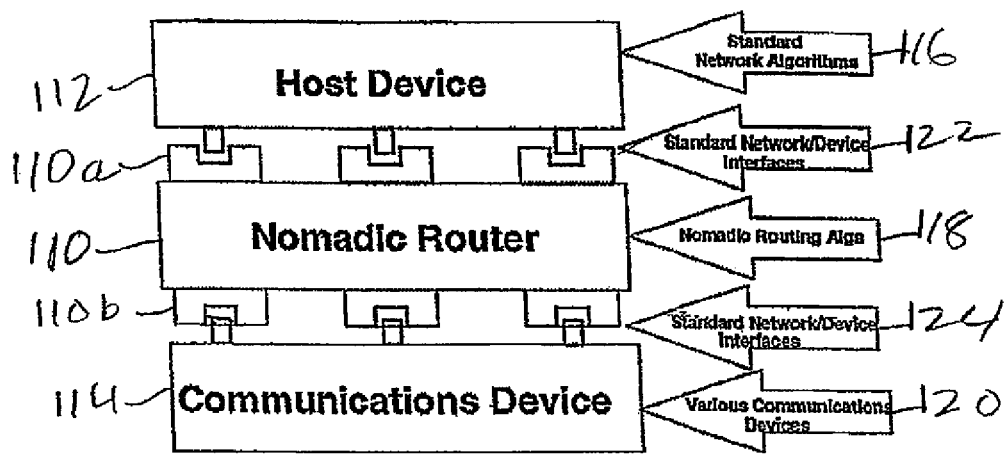
FIG. 2 is a diagram illustrating the implementation of the present nomadic router between the host computing device and various communication devices through standard interfaces.

FIG. 2 illustrates a "Nomadic" translator or router 110 embodying the present invention as being connected between a host device or computer 112 and a communications device 114. The host device 112 is a laptop computer or other fixed or mobile digital data communication terminal which is sufficiently portable or mobile that it can be carried from one location or another. A laptop computer, for example, can be used in any convenient location such as an airplane, customer's office, home, etc.

The communications device 114 can be part of any type of communication system to which the host computer 112 can be connected. Such communication systems include, but are not limited to, local networks, wide area networks, dial-up and direct internet connections, etc. In a typical application the communications device will connect the host computer to a local network which itself is connected to the internet. Thus, the host device 112 is able to communicate with an unlimited number of networks and nodes which are themselves interconnected with routers, switches, bridges, etc. in any known manner.

The present router 110 includes a terminal interface 110a which normally is used to connect the router 110 to the host device 112, and a system interface 110b which connects the router 110 to the communications device 114. As will be further described below, the router 110 generally includes a processor consisting of hardware and/or software which implements the required functionality. The router 110 is further configured to operate in an alternate mode in which the host device 112 is connected directly to a network, and the router 110 is also connected to a point in the network via the system interface 110b. In this case, the terminal interface 110 as is unused.

Although the device 110 is described herein as being a router, it will be understood that the router 110 is not a conventional router in that it includes the capability for providing interconnectability between networks. Instead, the present router 110 is essentially a translator which enables the host device 112 to be automatically and transparently connected to any communications device 114, and process incoming and outgoing data for the device 122.

The host device 112 is provided with a permanent internet address which is conveniently not changed in accordance with the present invention. The device 122 is also initially configured to communicate with a particular gateway or other home device at its base location. The gateway has a home address which the device 122 attempts to locate when it is connected to any communication system. Without the functionality of the present nomadic router 110, the host device 122 would not be able to operate at a remote location because it would not find its gateway.

It will be understood that the term "home" does not relate to a residence, but is the network, gateway or other communication device or system to which the terminal is normally connected and which corresponds to the home interne or IP address.

FIG. 2 further illustrates a top protocol layer 116 representing the host computing device 112 which generates and consumes data that is transferred through the communications device 114. This interface 116 is done just below the IP layer, and above the link layer in the typical OSI/ISO model. In the middle is a layer 118 which represents the router 110 and whose function it is to adaptively configure and utilize the underlying communications device and provide the router support described herein. A lower layer 120 is a physical communication which carries out the communication (potentially wire-lined Internet based, ad-hoc or wireless) as made available and determined for use by the nomadic router or user. Between the router layer 118 and the layers 116 and 120 are interfaces 122 and 124 which the router 110 identifies and configures dynamically.

Figure 8:
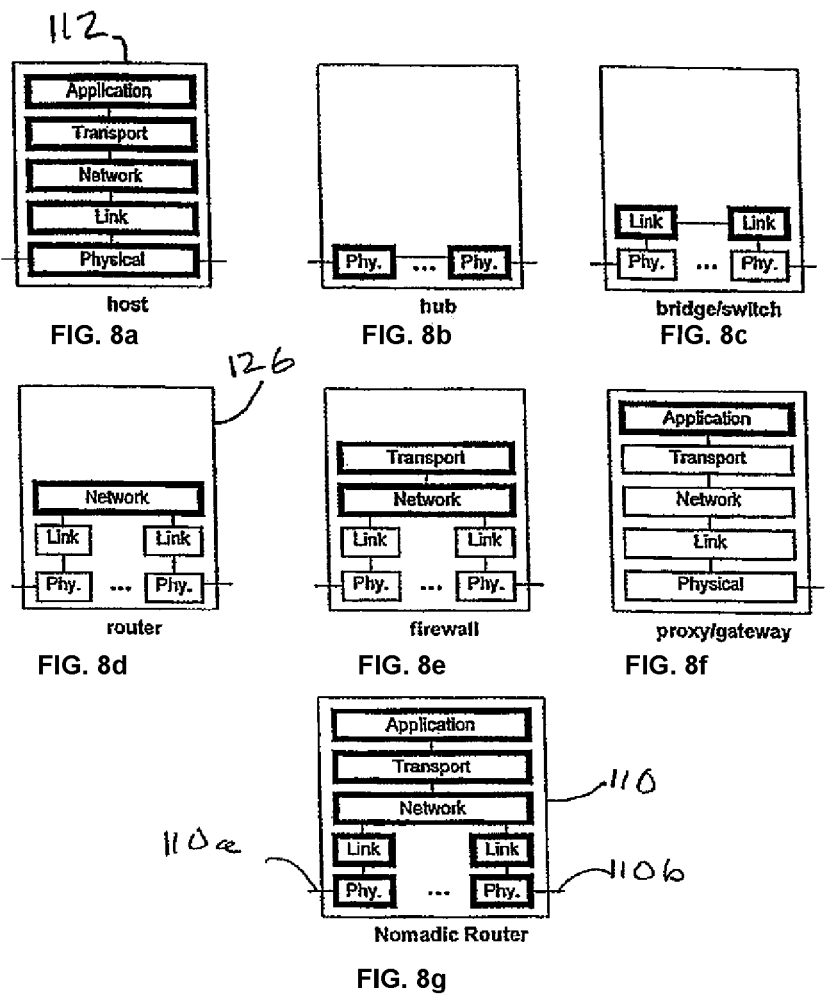
FIGS. 8a to 8g are diagrams illustrating protocol stack implementations for various network devices, and the translation function happening at all layers of the protocol stack in the nomadic router.

The present router operates with host computers, routers, and other network devices through well-defined standard interfaces such as specified by the IETF (Internet Engineering Task Force) and IEEE standardization committees. These standards specify the packet format, content, and physical communication characteristics. As shown in FIG. 8a, host computers have to be configured at various layers of the protocol stack depending on the communication capabilities and configuration of the current network being attached to.

Hubs, as shown in FIG. 8b, provide a well-defined interface to connect host computers and network devices by transmitting packets across multiple physical connections. Hubs do not provide any manipulate or translation of the content of the packets being transmitted.

Bridges or switches, as shown in FIG. 8c, provide an intelligent filtering mechanism by which they only transmit packets across multiple physical connection based upon which physical connection the device is connected to, according to the link layer addressing (Media Access Control Address). Bridges and switches do not manipulate the content of the packet and do not provide any higher layer protocol functionality.

Routers, as shown in FIG. 8d, accept packets based upon the destination address at the network layer in the packet. The host computer must explicitly address the packet at the link layer to the router. The router will then retransmit the packet across the correct physical connection based upon how it is configured. No modification or translation of the packet is performed at any layer of the protocol stack other than the network layer.

Firewalls, as shown in FIG. 8e, filter packets at the network and transport layers to only allow certain packets to be retransmitted on to the other physical connection. Firewalls do not manipulate the content of the packet, only forward it on to the next hop in the network if it passes the transport (port) or network (IP address) filter.

Proxys and gateways, as show in FIG. 8f, only receive packets explicitly addressed to them by host computers. They only manipulate packets at the application level. The present nomadic outer 110, as shown in FIG. 8g, manipulates the content of the jackets at the link, network, transport, and application layers of the protocol stack to provide a translation between how the host computer is configured and the configuration of the network the host computer is currently attached to.

Unlike all other devices shown in FIGS. 7a to 7f, the router 110 will automatically intercept and translate packets without the other devices being aware of the router 110 or have to be configured to use it. The translation algorithms in the router 110 which provide this location independence are provided completely internal to the router 110. Thus no new standards need to be developed, accepted, or implemented in host computers 112 or routers 126 to deploy new network services when using the nomadic router.

Whenever a new or different communication device (which includes the link and physical layers) is utilized in a host computer 112, the host computer's network layer must be aware of this new communication device. Since the router 110 has it's own network interface to the communication device, alternate communication devices can be utilized in the router 110 which the host computer 112 can utilize but does not have to be configured to use.

Permanent Addressing not Location Based

Today we communicate with individuals in terms of the location of their communications instruments (for instance, their computer's IP address or their fax machine's phone number). In order to support mobility and changing communication environments and devices, it is necessary to create an environment where people communicate with other people, and not specifically with the devices they use. To transparently support mobility and adaptivity in a wireless, potentially ad-hoc, communication internetwork, a common virtual network must be provided by an intelligent device or agent which supports the various computing hosts and communication devices.

Figure 3:
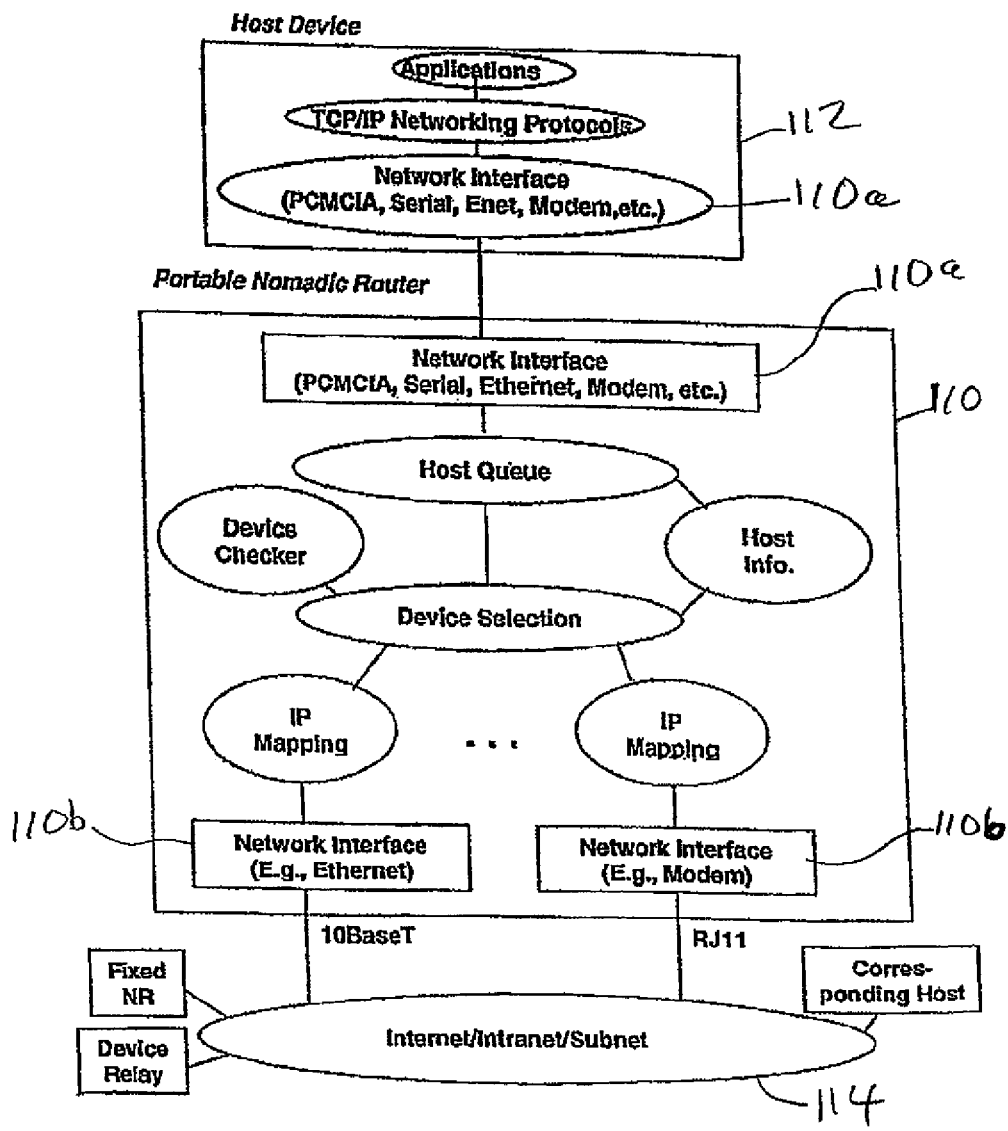
FIG. 3 is a diagram illustrating the basic nomadic router architecture, which is referred to as the hardware implementation architecture.

The present nomadic router 110 provides the mapping between the location based IP address used in the Internet today and the permanent user based address housed in the host CPU in the device 112. This is illustrated in FIG. 3 as "IP Mapping". This mapping is done without support or knowledge of such mapping by the host CPU or user.

Figure 4:
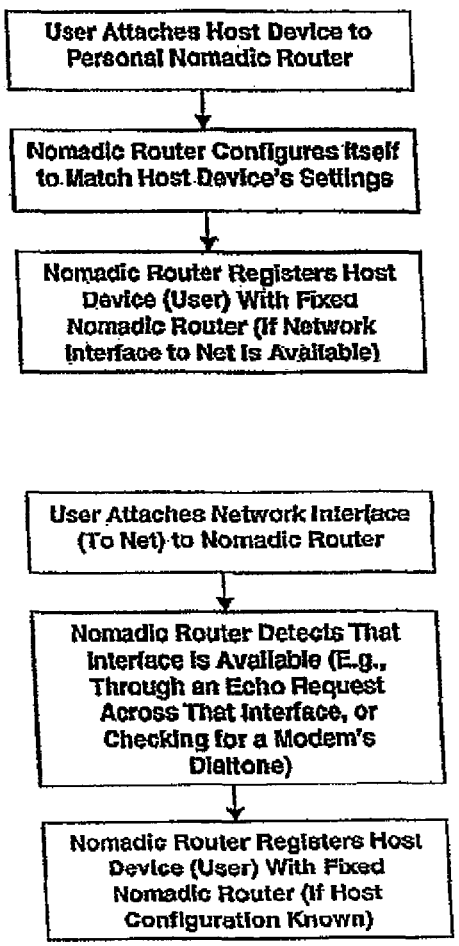
FIG. 4 is a flowchart illustrating a configuration overview of the basic steps performed when a host device is attached to the present nomadic router and when a network interface is attached to the router.
Figure 5:
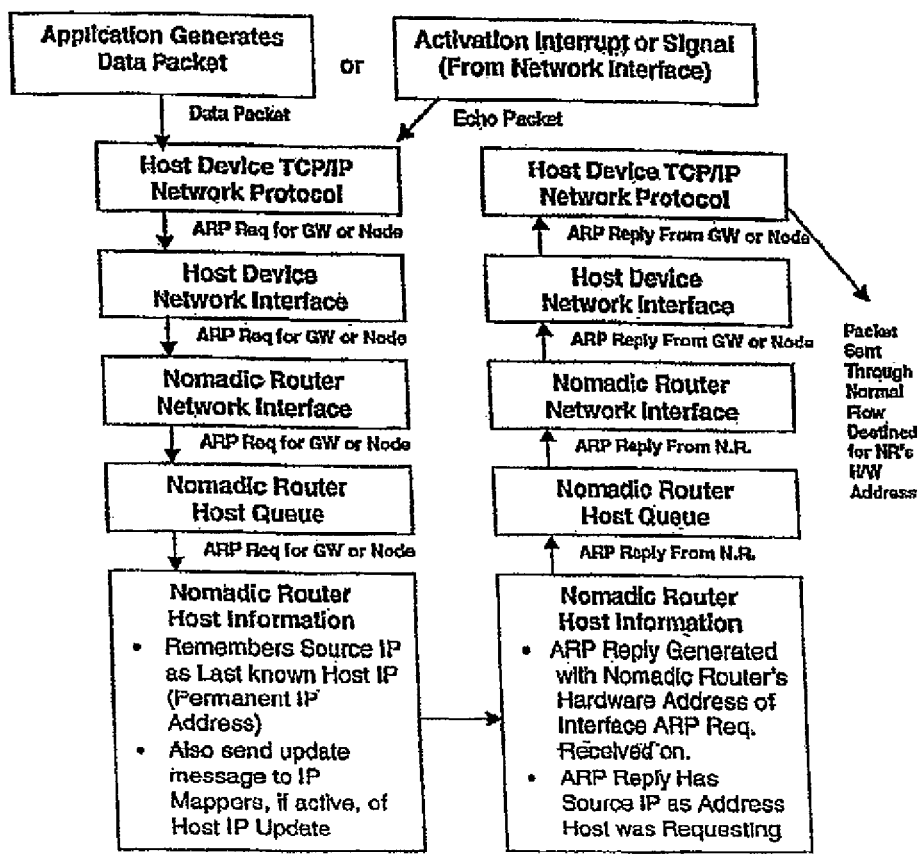
FIG. 5 is a flowchart illustrating the router's automatic adaptation to the host device when the first data packet from the host is sent to the attached router or when an activation interrupt or signal is received.

The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router. The host configuration information such as its IP number are discovered or determined as illustrated—in FIG. 5 and stored in the nomadic router 110 as illustrated in FIG. 3 as "Host Info." This configuration process is overviewed in FIG. 4.

Optional Off-Loaded Processing

As illustrated in FIG. 3, the nomadic router 110 can provide off-load communication processing for the host CPU by being physically separate from the host device 112. The adaptation, selection, and transportation of information across the network is performed by the nomadic router 110. This allows the host terminal or device 112 to utilize the network without having to directly support the network protocols. By having the nomadic router be responsible for adapting to the current network substrate, the host CPU can maintain a higher performance by not having to run the routing, adaptation, packetization, etc. algorithms or packet processing.

The nomadic router can also queue, transmit, and receive data independent of whether or not the host device 112 is available or even attached. The CPU 11 built into the nomadic router 110 provides all necessary computing routines to be a fully functional network co-processor independent of the host CPU. This will allow increased battery for the user since the nomadic router does not have numerous user I/O devices as does the host device 112.

Location Independence

The instant network nomadic router provides the ability to provide ubiquitous and reliable support in a location independent fashion. This removes any burden on the user for device reconfiguration (e.g., IP address configuration, gateway or next hop router address, netmask, link level parameters, and security permissions) or data transmission.

The problem with existing protocol stacks is that communicating devices have to be reconfigured every time the communication environment changes. TCP/IP requires a new network, node and gateway number. Appletalk will automatically choose an unused node number and discover the network number, but all open communications are lost and services have to be restarted to begin using the new information.

This occurs, for example, when a PowerBook is plugged into a network, put to sleep, and then powered up in a different network. All network services, are restarted upon wakeup, and network applications get confused if they, are not restarted. The nomadic router solves this problem by providing temporary as well as permanent network and node numbers similar, to that provided by Mobile IP. However, the nomadic router will also work with other protocol stacks (e.g., AppleTalk).

Figure 6:
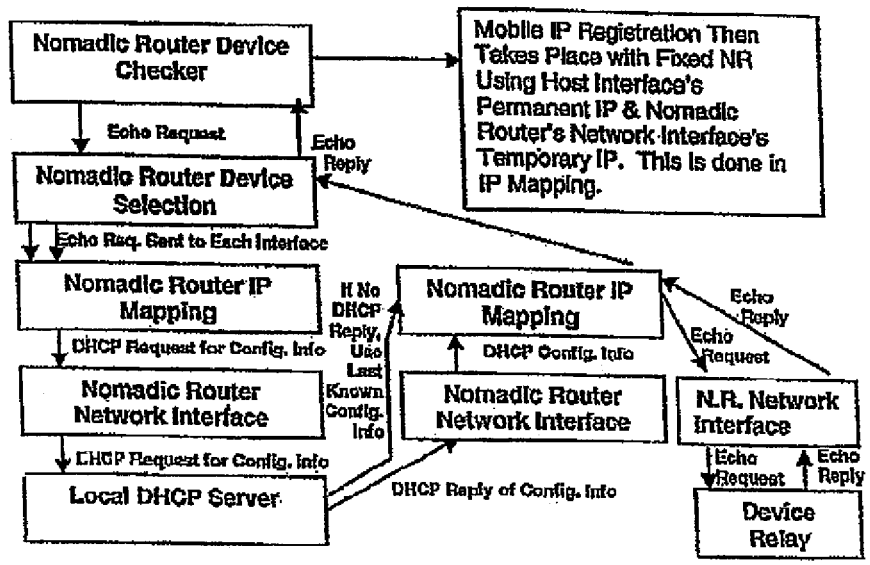
FIG. 6 is a flowchart illustrating the process by which the router initializes and checks the various communication device interfaces for initialization, activation, etc.
Figure 7:
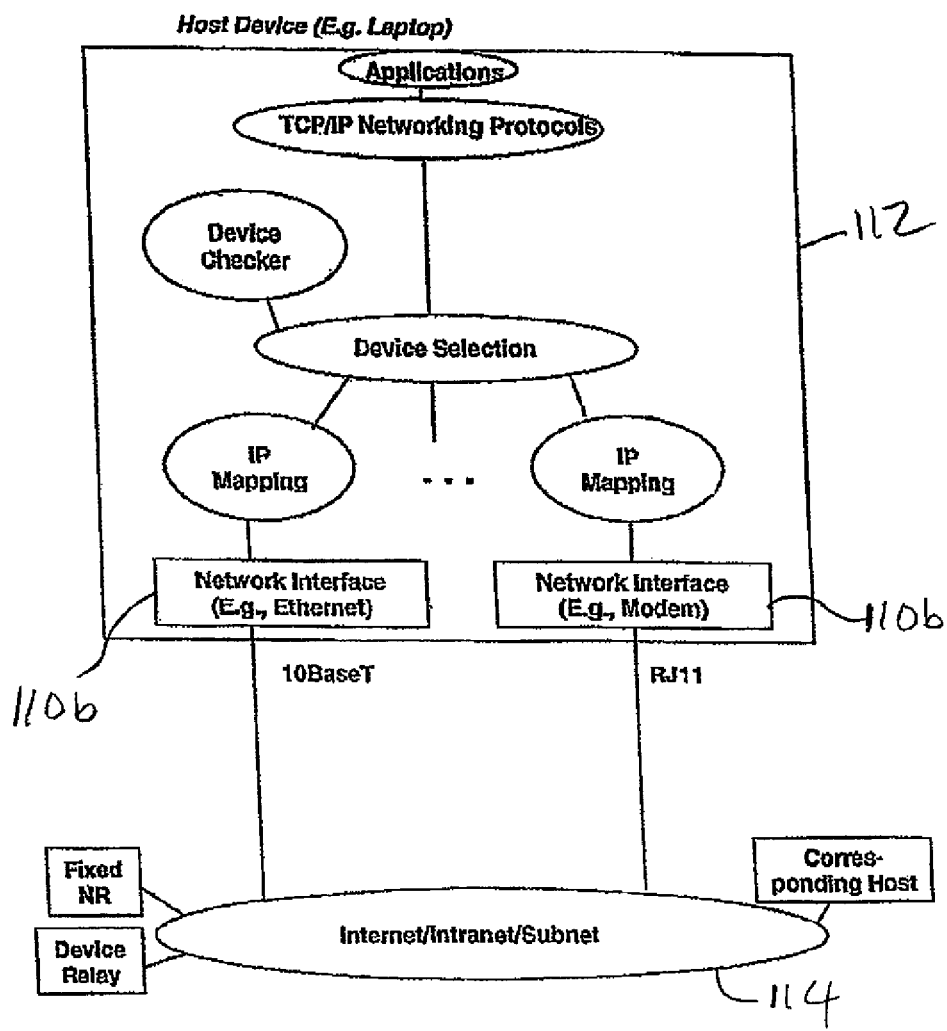
FIG. 7 is a diagram illustrating the basic nomadic router architecture when implemented as software in the host device.

Mobile IP provides location independence at the network level and not at the link level. All link level parameters, which are device specific, will be automatically configured as illustrated in FIG. 6 when a new communications (network interface) device is attached to the nomadic router. The nomadic router completely eliminates the need for manual configuration by adaptively supporting device independence.

A problem with existing routers today is that they require manual configuration and exist external to the node. To overcome this, the nomadic router can support automatic configuration and full router functionality internally. This allows a mobile or nomadic node to adapt to various communication and network devices dynamically, such as when the user plugs in a PCMCIA card or attaches a communications device to the serial port.

Once the nomadic router becomes aware of the available communication devices and activates them, the transport of data across the multiple communication substrates can take place. The unique algorithm and protocol in the nomadic router which chooses the most appropriate device to use, is shown in FIG. 3 and FIG. 6 as part of the nomadic router Device Checker through the "nomadic router Device Selection" across each interface.

There are numerous factors that can affect the selection of utilizing one or more devices. Such factors typically include available bandwidth, cost to initiate and maintain connection, power requirements and availability, and user's preference.

Another feature of the nomadic router is the support for alternate or simultaneous use of various communication substrates. This is performed as part of step 5 in FIG. 7 when the source address is that of the communication substrate that the nomadic router is going to send the packet out on. Host computers will now indirectly be able to utilize two or more communication substrates, either to increase throughput or to provide soft-, handoff capability.

This functionality is not supported in today's typical protocol stacks (e.g., TCP/IP or AppleTalk). Once the nomadic router becomes aware of the available communication devices and activates them, the transport of data across the multiple communication substrates can take place. The unique algorithm and protocol in the nomadic router which chooses the most appropriate device to use is part of the "nomadic router Device Checker" through the "nomadic router Device Selection" across each interface.

There are numerous factors that can affect the selection of utilizing one or more devices. Such factors typically include available bandwidth, cost to initiate and maintain connection, power requirements and availability, and user's preference.

Apparatus Packaging

As described above, the nomadic router can be packaged in several different hardware configurations. The nomadic router can be embedded in the host computer, or network device such as a switch or router. It can also be implemented as a PCMCIA card which plugs into the host computer or as self-contained external box.

Figure 11A:
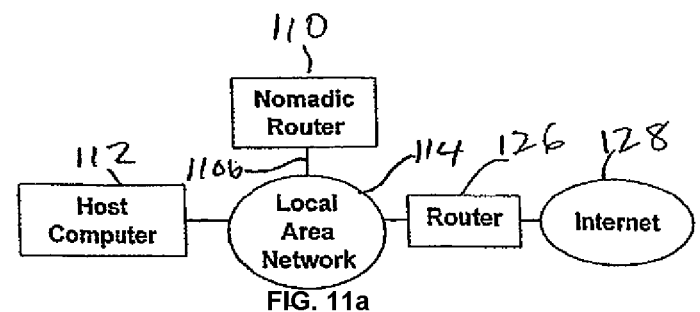
FIGS. 11a to 11d are diagrams illustrating host and network interface modes in which the nomadic router is able to operate.

Each nomadic router can have from one to many interfaces. If the router 110 is put into the network infrastructure, it doesn't have to be carried around with the mobile user. As shown in FIG. 11a, the nomadic router 110 is attached to a Local Area Network (LAN) of the network infrastructure which constitutes the communications device 114 through the system interface 110b. The LAN 114 is connected through a conventional router 126 to the interne 128. In this case, the host computer interface 110a of the nomadic router 110 is not needed since packets from the host computer 112 are received through the LAN 114.

Figure 11B:
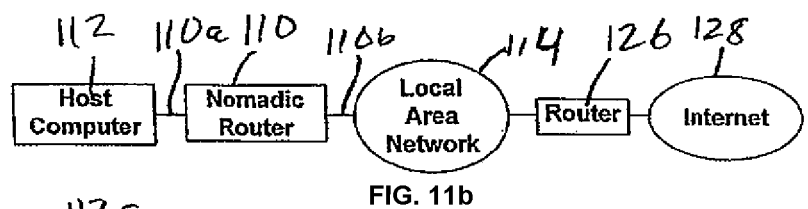

To provide a secure interface between the host computer 112 and network 114 to prevent host computers from being able to watch (sniff) packets on the network 114, the nomadic router 110 can have one interface to the host computer 112 (terminal interface 110a) and a second interface (110b) to the network 114 as shown in FIG. 11b, and provide filtering to which packets and retransmitted between the various interfaces thus providing a firewall type of security device but which operates internally on the network.

Figure 11C:
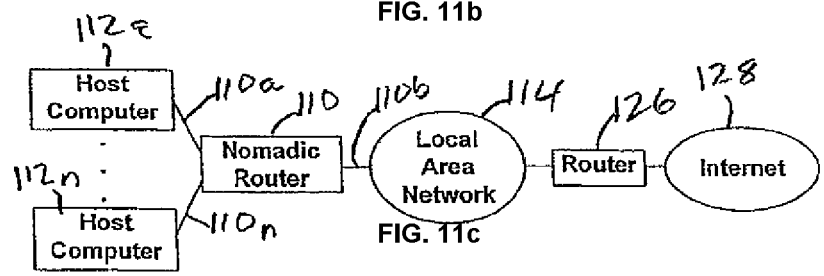
Figure 12:
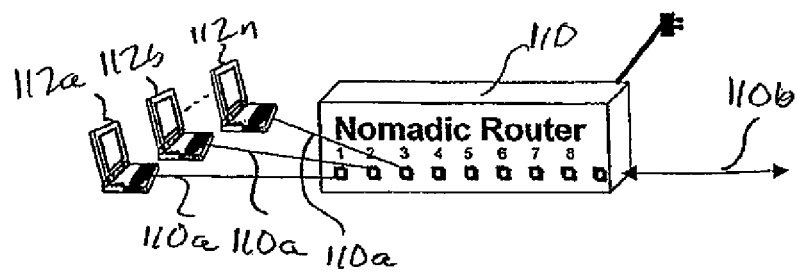
FIG. 12 is a simplified perspective view illustrating the nomadic router as implemented in a self-contained box which connects onto a local area network via a network interface port and has multiple ports to connect to host computers.

In order to support multiple host computers 112a, 112n with a single nomadic router 110, the nomadic router 110 may have multiple host interfaces $110a_1, \ldots 110a_n$, as shown in FIG. 11c and in FIG. 12 and a network or system interface 110b.

Figure 11D:
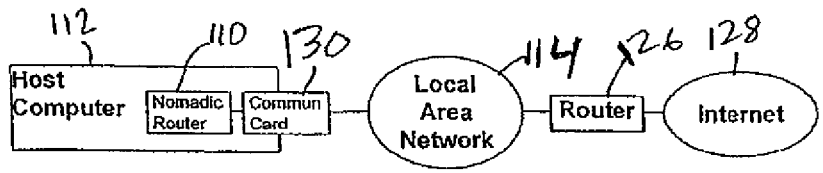

If the nomadic router is carried around by the mobile user, it can take the form of a PCMCIA card. In FIG. 11d, the nomadic router 110 is implemented as a PCMCIA card. The processing and translation capability is stored inside the card and the interface to the host computer 112 is through a PCMCIA BUS interface or communication card 130.

Figure 13:
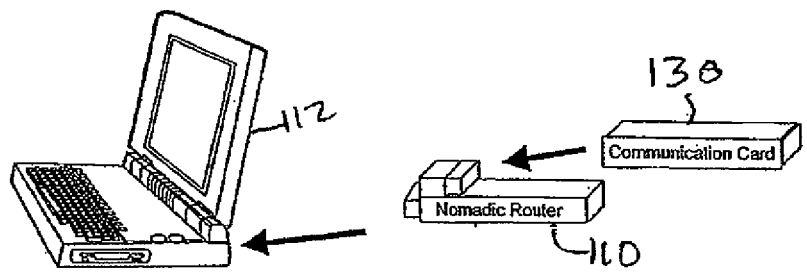
FIG. 13 is a simplified perspective view illustrating the nomadic router apparatus as implemented on a PCMCIA Type III card where the nomadic router plugs into the host computer's type II slot and the communication card device, of Type II, plugs directly into the nomadic router so both may be powered and stored in the portable host computer.

As shown in FIG. 13, the PCMCIA card can fit in a type III slot where there is a connector on the nomadic router 110 which accepts the communication card 130 (a type II PCMCIA card.) In this mode, the nomadic router doesn't not have to have the communication device specific components inside the PCMCIA card.

Figure 14:
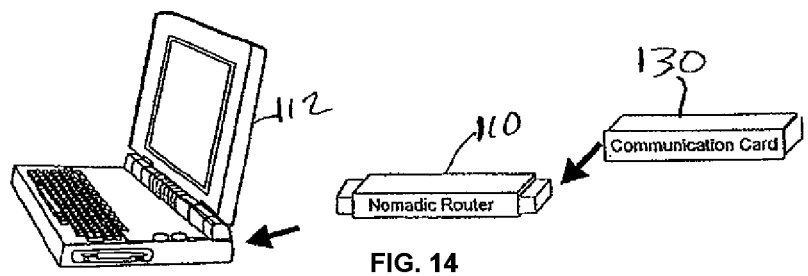
FIG. 14 is a simplified perspective view illustrating the nomadic router as implemented on a PCMCIA Type II card where the nomadic router plugs into the host computer via a type II interface slot and where the communication card device, Type II, plugs into the nomadic router type II card.

The nomadic router 110 can also take the form of a type II PCMCIA card. In this form, the communication device or card 130 plugs into the opposite end of the nomadic router card 110 as illustrated in FIG. 14.

Translation Operation of the Nomadic Router
Initialization and Self Configuration The nomadic router initialization and self configuration process provides the means by which the nomadic router is able to learn about the host computer and network so it knows what translation is necessary.

Host Learning

The nomadic router 110 is able to learn about how the host computer 112 is configured by looking at the content of the packets being sent from the host computer 112. Rather than the host computer 112 sending packets directly to the router 126 or other network device, which is what it is initially configured to do, the nomadic router 110 is able redirect all outbound packets from the host computer 112 to itself. This redirection can be accomplished in several ways as described below.

1. Proxy ARP Packet Interception and Host Reconfiguration

Figure 9:
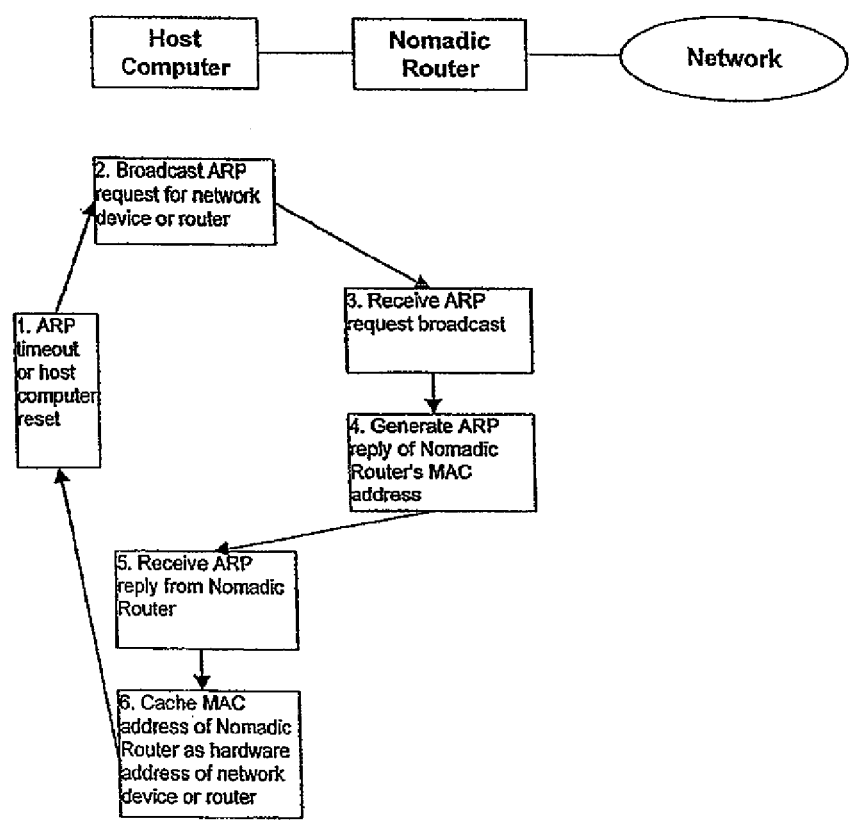
FIG. 9 is a flowchart illustrating the nomadic router's proxy ARP packet interception and host reconfiguration process.

Whenever a host computer 112 has an IP packet which it needs to send to a router 126 or other network device, it uses the Address Resolution Protocol (ARP) to obtain the link layer Media Access Control address (MAC address). As illustrated in FIG. 9, when the host computer 112 broadcasts and ARP request for the MAC address of a destination node, the nomadic router 110 receives this ARP request broadcast and responds with its MAC address (not that of the destination node).

When the host computer 112 receives this ARP reply from the nomadic router 110, which contains the MAC address of the nomadic router 110, the host computer 112 will cache this MAC address in the host computer 112 and send all packets destined for the configured router or network device to the nomadic router 110. The host computer 112 will think that the MAC address is that of the configured IP network device, but in reality, the nomadic router 110 is pretending (proxying) to be the device (its home gateway) that the host computer 112 expects to find.

The nomadic router 110 is also able to reconfigure and intercept return packets from a router or other network device using the same process.

2. Promiscuous Mode Packet Interception

Since the MAC address is cached in the host computer 112 for a short period of time, the host computer 112 will not send out a new ARP request to obtain the MAC address again unless a timeout period occurs or the cache is cleared such as when the computer 112 is restarted.

When a conventional network device receives or hears a packet with a MAC address which does not match its own, it will ignore or drop the packet. Since it is possible to rapidly switch from one network environment to another using a portable computer, the nomadic router 110 must be able to intercept packets even when the MAC address is not that of the nomadic router's home gateway or device.

This is accomplished by placing the nomadic router's network connection in promiscuous mode. In this mode, the network connection on the nomadic router accepts all packets being transmitted on the communication link, not just ones being broadcasted or addressed specifically to it.

3. Dynamic Host Configuration Protocol (DHCP) Service

A host computer is able to utilize the DHCP service to obtain the configuration information rather than being manually configured. The host computer utilizing the DHCP service requires that a DHCP server be installed on the network segment to which it is currently attached. If the host computer 112 is utilizing this service and requests configuration information using DHCP, the nomadic router 110 will intercept these requests and respond with configuration information for the host computer 112 to use.

Network Learning

The nomadic router is able to learn about the network environment it is currently attached using several different methods as described below.

1. Dynamic Host Configuration Protocol (DHCP)

Whenever a different network connection is connected on the nomadic router, it will broadcast a DHCP request to obtain configuration information for the current network. If no DHCP service is available on the network, it will switch to another method to learn about the network configuration.

2. Router Information Packets

Routers on the network will periodically broadcast router information packets which are used to build routing tables and allow routers to adapt to changes in the network. The nomadic router 110 will listen on the network for these router information packets. When one is received, it will extract out the configuration information from these packets.

3. Passive Listening

By placing the nomadic router's network connection in promiscuous mode, where is receives all packets not just ones destined for it, it is able to examine all packets on the network to discover how the network is configured. It is also able to determine the IP addresses used on the local area network and which machines are routers by the final destination address not being the next hop address.

Using this method, the nomadic router 110 is passively able to learn how the network is configured and will elect to use an unused IP address. If that IP address does become used by another network device, it will switch over to another unused IP address.

4. Manual Configuration

The network configuration information can be manually configured in the nomadic router 110. This information can be set using an embedded web server, Simple Network Management Protocol (SNMP) tools, an application running on one of the computers in the network, or other suitable means. When manual configuration is used to set the network information, the nomadic router 110 will still learn about the host information automatically and provide all the translation capabilities so the host computers do not have to be aware of the correct network information of the LAN to which they are currently connected.

Packet Translation

The nomadic router's packet translation function provides a mapping between location and service dependent configurations used by the host computer 112 and that used by the network 114 to which it is currently attached. For outbound traffic from the host; computer 112 to the network 114, the translation function changes the content of the packet such as the source address, checksum, and application specific parameters, causing all packets sent out to the network 114 be directed back to the nomadic router 110 rather than to the host computer 112.

The inbound traffic from the network 114 arriving at the nomadic router 110, which is really for the host computer 112, is passed through the translation function so the host computer 112 thinks that the replies were sent directly to it. The host computer 112 will be completely unaware of all the translation being performed by the nomadic router 110.

Figure 10A:
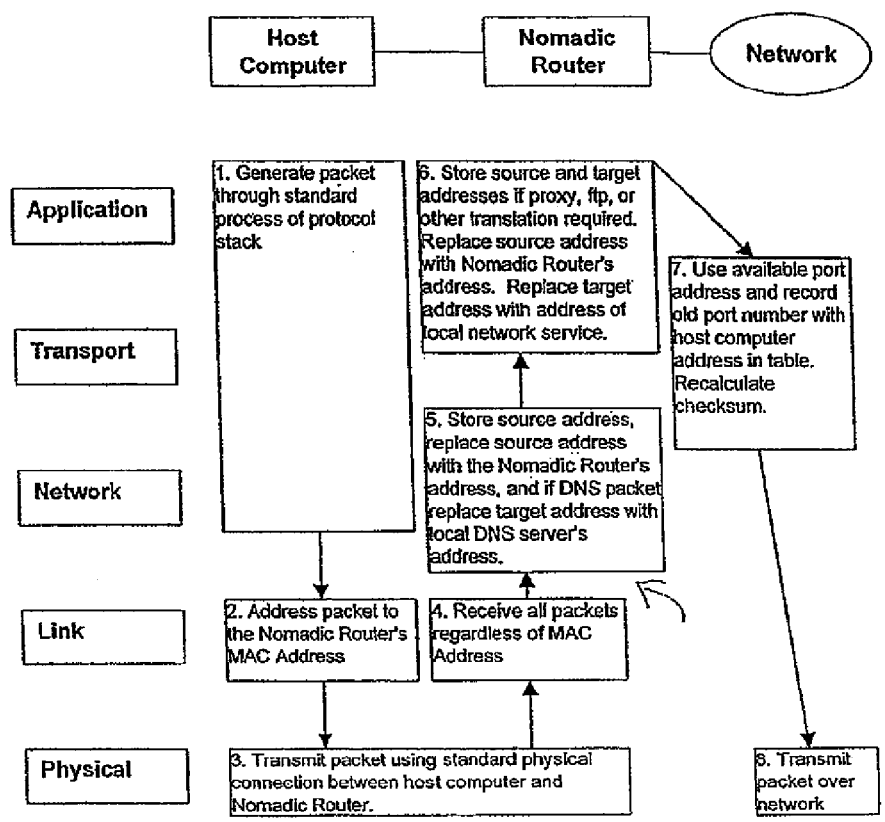
FIGS. 10a and 10b in combination constitute a flowchart illustrating the nomadic router's translation process which takes place in the host computer and nomadic router at various levels in the protocol stack.
Figure 10B:
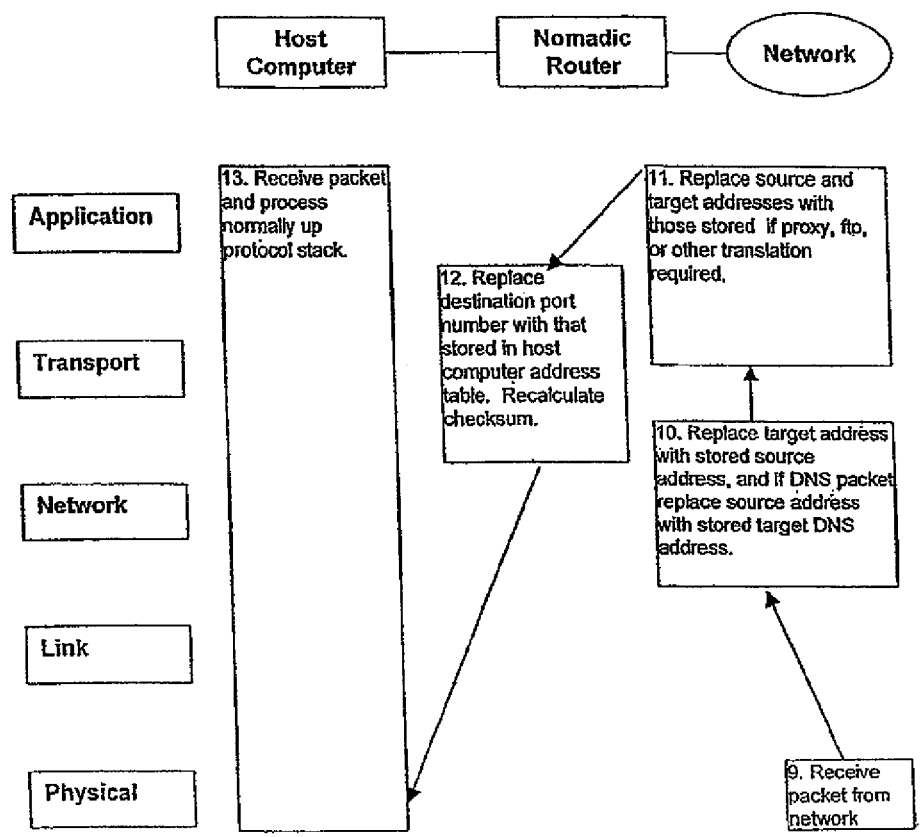

The translation functions works as illustrated in FIGS. 10a and 10b. In these figures, the operations performed in the OSI/ISO model application, transport, network, link and physical layers are illustrated in rows opposite the layer designations. The operations performed by the host computer 112, nomadic router 110 and network 114 are illustrated in columns below the device designations.

The host computer 112 will generate network packets using the current configuration stored in the host computer 112 using the standard protocol stack as shown in step 1. This configuration information is either manually configured in the host computer 112 or obtained using DHCP.

As shown in step 2, when the host computer 112 addresses the link level destination address, the address automatically obtained using the Proxy ARP packet interception routine described earlier, this will cause the host computer 112 to send the packet to the network address of its standard router or home gateway device, but using the link level address of the nomadic router 110.

In step 3, the packet is transmitted across the standard physical connection between the host computer 112 and nomadic router 110. As shown in step 4, the nomadic router 110 will receive the packet at the link level either due to the Proxy ARP function which reconfigured the host computer's MAC address, or the nomadic router 110 will have the link level in promiscuous mode which it will cause it to receive the packet even if destined to a different MAC address.

Once the packet is passed to the network layer, shown in step 5, the nomadic router translation function will modify the content of the packet to change the source address to that match of the nomadic router's address instead of the host computer's address. It will also translate other location dependent information such as the name of the local Domain Name Service (DNS) server. When translating the DNS packet, it will change the source address to that of the nomadic router's address and the destination address to that of a local DNS server.

Once the network layer translation is complete, the packet can be translated at the application and transport layers. The application layer is translated next, as shown in step 6, since the transport layer requires a pseudo network layer header which includes the source and destination addresses and the content from the application layer.

At the application layer translation, any addresses which describe the source address of the host computer, such as with FTP, are translated to be that of the nomadic router's address. Any application layer destination addresses, such as a local proxy server, are translated to match that of the server running on the current network.

Once this application translation is complete, the transport layer, as shown in step 7, can complete the checksum and any port number manipulation. The port number is manipulated if more than one host computer 112 is attached to the nomadic router 110. Each host computer 112 when it sends out a request using a specific port is translated to match an available inbound port on the nomadic router 110.

The port number assigned for use with each host computer 112 is stored in a table in the nomadic router 110 and is utilized with the reply packet described later. Finally the packet is sent out over the network 114 in step 8.

When a reply packet comes in from the network 114, as shown in step 9, the nomadic router 110 will receive the packet. In step 110, the nomadic router 110 will perform the reverse network layer translation to set the destination address to that of the host computer rather 112 than the nomadic router's address, and any source address to that replaced by the nomadic router 110 in step 5.

Once this network translation is complete, the packet is translated at the application layer, as shown in step 11, to change the destination address to that of the host computer 112 and the source address to the original destination address stored from step 6. In step 112, any port manipulation performed in step 7 is changed to the original setting and a new checksum is computed. Finally, as shown in step 13, the packet is sent to the host computer 112 which then processes the packet normally.

Options of the Nomadic Router

By way of motivation, many communication infrastructures are varied and fragmented, and this problem is likely to be exacerbated as more technologies are introduced. For example, high performance LANs, wireless services, cellular telephony, satellite, ubiquitous paging networks, all provide varying degrees of coverage, cost and bandwidth/delay acteristics.

Nomadic Intranet

The Nomadic Intranet provides all network, server type, services for users who which to dynamically create an ad hoc network. This is similar to the instant network nomadic router except the nomadic intranet is a single device with multiple ports into which laptop/devices can be plugged. The instant network nomadic router is distributed to (one per) each host device. The nomadic intranet not only provides ad hoc networking but can also provide services such as temporary file storage, protocol conversion, act as a print server, and provide other services described as part of the Basic nomadic router.

Fixed Nomadic Router

The Fixed nomadic router provides the same basic functionality and architecture as the portable nomadic router but is stored in one location. The fixed nomadic router acts as a surrogate or "Home Agent" for the user when he/she is away on travel. When the user wishes to register or utilize their host device elsewhere in the network, the portable nomadic router will register with the fixed nomadic router where it is temporarily attached to the network so information can be forwarded to the user's new location. The fixed nomadic router can also be used to house the master copy of the user's E-mail for the nomadic E-mail service, or files for the nomadic file synchronizer.

Mobile Virtual Private Network

The nomadic router provides the mapping between the location based IP address used in the internet today and the permanent user based address housed in the host CPU. This mapping is done without support or knowledge of such mapping by the host CPU or user. The Internet RFC 2002 Mobile IP protocol specifies the mapping between permanent and temporary IP addresses. The unique aspect of the nomadic router is that the Mobile IP protocols are not necessarily running in, or supported by, the host CPU but rather are internal to the nomadic router.

By implementing this protocol as part of the translation function in the nomadic router, the nomadic router can encapsulate packets from the host computer and transmit them back to the fixed nomadic router which are sent out (un-encapsulated) on the native (home) network. Replies from the home network are received by the fixed nomadic router and are encapsulated and sent back to the nomadic router. When packets are transmitted between the nomadic router and fixed nomadic router, the packets are encrypted and sent using the Internet Tunneling Protocol.

Since the nomadic router provides location independence and the fixed nomadic router forwards all packets from a corresponding host to the host computer via the nomadic router, any changes in the location, failure of a network link, or attachment point of the mobile host computer does not cause any open session to be lost. This session loss prevention is possible since the fixed nomadic router pretends to be the mobile host computer, and the nomadic router pretends to be the home network. The fixed nomadic router and nomadic router translation functions hide the link and network loss from the transport and application session.

Communication between users and networks or online services may be effectuated through ports, for example, located within hotel rooms or multi-dwelling units, or through conventional dial-up communications, such as through the use of telephone or cable modems. According to one aspect of the invention, users can be are redirected to a portal page, as described below. After being redirected to the portal page, the user is subjected to a AAA process. Based upon the AAA process, the user may be permitted transparent access to the destination network or may be redirected to a login page in order to gather additional information to identify the user.

In order to allow a user of the computer to communicate transparently with computer networks 20 or online services 22, the gateway device must be able to communicate with the user computer, as well as the various online services 22 or networks 20. In order to support this communication, the gateway device 12 generally performs a packet translation function that is transparent to both the user and the network. In this regard, for outbound traffic from a computer to a network or on-line service, the gateway device 12 changes attributes within the packet coming from the user, such as the source address, checksum, and application specific parameters, to meet the criteria of the network to which the user has accessed. In addition, the outgoing packet includes an attribute that will direct all incoming packets from the accessed network to be routed through the gateway device. In contrast, the inbound traffic from the computer network or other online service that is routed through the gateway device undergoes a translation function at the gateway device so that the packets are properly formatted for the user's host computer. In this manner, the packet translation process that takes place at the gateway device 12 is transparent to the host, which appears to send and receive data directly from the accessed computer network. By implementing the gateway device as an interface between the user and the computer network or other online service, however, the user will eliminate the need to re-configure their computer 12 upon accessing subsequent networks as well as the need to load special configuration software on their computer to support the reconfiguration.

Identifying the user is crucial in authorizing access to networks or online services, as such services are typically provided for a fee and may be customized based upon the user, user's location, or user's computer. As such, the system of the present invention includes means for identifying a user based upon an attribute associated with the user that is contained within the packet transmitted from the user's computer. Attributes can include information such as the source, destination and type of traffic. In general, identifying a user's computer that accesses the network can be done by a MAC address associated with the user's computer. Identifying the a user accessing a network based upon a MAC address is well known to those of skill in the art, and will not be discussed in detail herein. Additionally, the attribute can be based upon a user name and ID, or according to one advantageous embodiment, a particular location, such as from a communications port in a hotel room. Such location-based identification in computer systems employing VLAN tagging and those not employing VLAN tagging according to the present invention will first be described. However, it should be appreciated that location based authorization is just one method of identifying a user which may be authenticated, authorized and accounted according to the present invention. As stated above, a user's computer can be identified based on a MAC address associated with the computer. A user can also be identified based upon a username and password. Additionally, a user can be identified according to a combination of these attributes.

The authentication capability can be based upon multiple methods. First, AAA can be done based upon where the traffic is originating, such as a location, computer, circuit, or user. Secondly, the authentication and authorization capability can be based upon the type of services the user is attempting to access, such as a destination address. This can be a destination port or Internet address, a TCP port, a network. Third, AAA can be based upon the content type or protocol being transmitted. For example, each packet can be filtered through the selective AAA process, so that a user can be authorized access to a particular location. Each time the user attempts to access a different location, the user is subject to the AAA, so the user may be prevented access from a particular site the AAA method deems inaccessible to the user based upon the user's authorization. Alternatively, the AAA method according to the present invention allows users to connect directly to a specific site, such as credit card or billing servers which collect billing information, which can indicate that the user has paid, so that the user is thereafter authorized access to networks. Additionally, a user's authorization can depend upon a specific time, so that the user can be kicked off a network at a specific time, after a specific time has elapsed, or according to other dynamic information determined by the network provider.

Therefore, AAA can be based upon the source, destination, and type of traffic. Upon receiving a packet, the AAA module will look at various parameters such as the link layer information, such as the circuit, source MAC address, VLAN tag, circuit ID, along with network information such as source IP addresses, source port. This source information is stored into a AAA subscriber table. Secondly, information is gathered about the destination, such as the destination IP addresses, destination port, to determine what type of authentication is needed to access particular services. Third, the packet is interrogated to receive information such as the protocol type, port or the packet type to determine what type of authentication is required for a packet to be authorized for network access. Once this information is gathered, a matching of the authentication requirements versus the authorization is applied. If there is a match, the packet is forwarded and allowed access. If this match fails, the subscriber information for that packet is set as pending for authorization. Pending for authorization packets require further authentication and authorization before being allowed to access the system. Authorization can be determined based upon the attributes determined by the packet, or if not matched, the user will have to provide authentication, which can be done as described in the HPR patent, U.S. Pat. No. 6,636,894, issued Oct. 21, 2003, filed Dec. 8, 1999, entitled "Systems and Methods For Redirecting Users Having Transparent Computer Access To A Network Using A Gateway Device Having Redirection Capability", in the name of inventor Short et al. The '894 Short patent is herein incorporated by reference.

For example, once the gateway device identifies the location from which access is requested, such as from a specific port of a hotel room, the gateway device can then determine the access rights of the user at that specific location. It should be appreciated that as an alternative to location-based identification the gateway device may identify a user or a user's computer based upon attributes other than location. For example, the gateway device may receive a MAC address identifying a particular user's computer (for example, a user in communication with the gateway device through a conventional modem), as is well known in the art, although the embodiments described herein will refer primarily to location-based identification as described above. Additionally, a user can be identified by the gateway device based upon a user ID and password which the user can input in response to a query for such information. This is discussed below and in U.S. Pat. No. 6,636,894, issued Oct. 21, 2003, in the name inventor Short et al., entitled "Systems and Methods For Redirecting Users Having Transparent Computer Access To A Network Using A Gateway Device Having Redirection Capability", filed concurrently with this application and incorporated herein by reference. In addition, a user staying in a particular hotel room may be authorized access based upon the user's location. Alternatively, the user can be authorized access to the network and online services based upon the user's identification, or the user's computer, regardless where the user is obtaining access. Furthermore, access may be associated with a combination of attributes. For example, a user may be authorized access to a network where the user has input the user's identification and has accessed the network from a particular room. Such a requirement could prevent unauthorized users also staying in a particular room from obtaining network access.

Regardless of the means in which access is obtained and an attribute associated with the user is identified, access rights of users are determined according to an AAA method implemented by a AAA server. According to one embodiment of the present invention, the AAA server is located entirely within the gateway device. Alternatively, the AAA server can also be located external to the gateway device.

One function of the AAA server is to identify the user in communication with the gateway device in a manner that is transparent to the user. That is, the user will not be required to reconfigure the computer or otherwise change the home network settings, and no additional configuration software will have to be added to the computer. After a packet is received by the gateway device, as described in detail above, information contained within the packet is stored within a subscription table. The subscription table is a database of user information. In particular, the subscription table can maintain any information or attribute known about a user, including a circuit ID or MAC address, such that a particular user or user location can be identified upon accessing the computer system. After a packet is received, and attributes associated with a user are obtained, information corresponding to the packet is received from the subscription table. It will be appreciated by those of skill in the art that the packet may identify the location of the port from which access is obtained based upon location-based authorization, as described above, or a specific computer based upon a MAC address, as is well known in the art. Regardless of connection means however, any attribute or anything known about the user or location of the traffic, can be stored in the subscriber table. The subscription table and information stored therein may be stored in a computer readable storage medium, as well known in the art, that is either disposed within the gateway device or external.

After receiving a request for access from a user and identifying the user or location through the use of the subscription table, the AAA server then determines the access rights of the particular user. What is done with the user depends upon information contained in the user's profile. Profiles of all users (i.e., identified by MAC address or by location or by some other attribute) are stored in a user profile database, which may be located internal to or external to the gateway device. It will be appreciated by those of skill in the art that although the user profile database is discussed herein as being separate and distinct from the subscription table, the two databases may be combined into one database containing both user subscription data as well as user profile data.

The user's profile can contain information that is based upon the user or the user's location (as established by location-based identification), and generally includes information concerning the access rights of a user or location. For example, the user profile database may establish that a user with a given MAC address has purchased access, or that a given circuit ID has free access or unlimited access. Guests in a particular room or rooms of a hotel, for example, suites and penthouses, may receive free unlimited internet access. Therefore, access rights can be available contingent upon the user's location (e.g. room) or location status (e.g. suite). In this event, no further identification is required, as the location from which the users are requesting access is known to the gateway device and stored in the subscription table.

In addition to storing whether users have valid access rights, the user profile database can also include specialized access information particular to a specific location or user, such as the bandwidth of the user's access, or a homepage to which a user should be directed. For example, a user accessing the network from a penthouse may receive a higher access band rate than someone accessing the destination network from a typical hotel room. Additionally, a user profile can include historical data relating to a user's access to the network, including the amount of time a user has accessed the network. Such historical information can be used to determine any fees which may be charged to the user, or due from the user, for access. Specialized access information contained within the user profile may be established by the system administrator, or by the user who has purchased or otherwise established access to the network. For example, where a user is transparently accessing the gateway device from a hotel room, the hotel network administrator may enter user access information into the profile database based upon access rights associated with a room in the hotel. This can also be done automatically by the gateway device or a local management system, such as a hotel property management system, when the user checks into his or her room. Additionally, the user may establish the information to be contained within the profile database upon first accessing the gateway device, as will be described in detail below. For instance, a new user may be directed to enter their credit card number to obtain access to the system. Whereas the subscription table initially identifies the user and maintains location information, the user profile database includes information concerning the details of the user's access privileges, as well as any specialized information for each user.

As noted above, user profile database can be maintained within the gateway device, or it can be located external to the gateway device. For example, where a hotel wishes to establish transparent network access for customers from hotel rooms, the hotel may maintain the profile database locally within the gateway device. Alternatively, if external to the gateway device, the profile database will can contain the same information and be accessed by the gateway device to ascertain user's access rights. According to one embodiment of the invention, the profile database can be maintained outside of the gateway device by an internet service provider.

Upon receiving the location of a port or identity of a user transparently communicating with the gateway device, the AAA server compares the identification information contained within the packet to user profile information stored within the user profile database. This comparison may be accomplished using a computer having an operating system and software therein for comparing identification information in the received packet to records stored within the user profile database. Where users are not identified automatically based upon their location, the users may be required to identify themselves using a login and ID, so that their identification can be compared to user profiles stored within the user profile database. In an alternative embodiment of the present invention, the AAA server could query the user's computer, and more specifically, the user's browser, to obtain identification information stored therein so that the AAA server does not have to query a user for user information, thereby further making the AAA process of the present invention transparent to the user.

The user profile database may comprise programmable storage means located on a conventional personal computer, mainframe computer, or another suitable storage device known in the art. Additionally, the means for comparing the received data to the data within the database can comprise any software, such as an executable software program, which can compare data. For example, the AAA server may store user profiles on a hard drive of a personal computer, and the means for comparing the received user data to the user profiles resident on the computer can include computer software, such as Microsoft Excel (Microsoft Excel is a trademark of Microsoft Corporation, Redmond, Wash.). According to another embodiment of the invention, the AAA server can comprise a remote authentication dial-in user service (RADIUS), which is a well known authentication and accounting system used by a number of network service providers (NSPs).

Once a user's profile has been determined by access to the user's profile in the user database, three possible actions can result. Specifically, once a user's profile has been retrieved the AAA server may determine a user to have access, to be pending or in progress, or to not have access.

First, a user is deemed valid (i.e., to have access) where the user's profile in the user profile database states so. If a user is determined to be valid, the user's traffic can be allowed to proceed out of the gateway device from the portal page to the networks or online services the user wishes to access, or the user may be redirected to a portal page, typically, a more user-specific portal page, as described in U.S. Pat. No. 6,636,894, issued Oct. 21, 2003, in the name inventor Short et al., entitled "Systems and Methods For Redirecting Users Having Transparent Computer Access To A Network Using A Gateway Device Having Redirection Capability, (hereinafter "Redirecting Application") filed concurrently herewith, prior to being allowed access to the destination network. For example, a user may be automatically forwarded to a user-input destination address, such as an Internet address, for example, where a user has free access associated with the user's hotel room. Alternatively, this may occur where the user has already purchased access and the user has not exhausted available access time.

If the second scenario occurs, in which the user is deemed pending or 'in progress', the user may take steps to become authenticated so that the user's information may be recorded in the user profile database and the user is deemed valid. For example, a user may have to enter into a purchase agreement, requiring the user to enter a credit card number. If the user needs to purchase access, or if the system needs additional information about the user, the user can be redirected from the portal page via Home Page Redirect (HPR) and Stack Address Translation (SAT) to a location, such as a login page, established to validate new users. SAT and HPR can intervene to direct the user to a webserver (external or internal) where the user has to login and identify themselves. This process is described in detail below and in more detail in the Redirecting Application.

According to one illustrative example, a user profile database is maintained by an ISP which may be associated with the computer network for providing Internet service to those users on the network. Although unlimited access could be granted to users based on their location or MAC address, access may also be limited based on the access for which a user has paid. For example, the user profile database may route a user to a login page, where the user must enter user data, such as a user id and password. In this embodiment, a network access server (NAS) 28, located within the gateway device 12, can receive user data. Upon receiving user data representing the identity of a user attempting to access the network, a primary function of the NAS 28 is to grant or deny the user access to the network.

Although the NAS 28 grants and denies access to users, the NAS 28 does not determine whether each user is allowed to connect to the network and, if so, what type of connection should be established. Rather, these determinations are made by the AAA server 30, described in detail above. Upon receiving user data the NAS 28 can, if necessary, reconfigure the data such that the data will be in the proper format to be received by the AAA server 30. In addition to reconfiguring the user data, the NAS 28 can also encrypt the user data such that the user identity and password will be protected during transmission to the AAA server 30. After reconfiguration, and optionally, encryption, the NAS 28 transmits the data to the AAA server 30 with a query to request that the AAA server 30 authenticate the user The AAA server 30 stores user profiles corresponding to users authorized to access the network. The user profiles typically include user identifications, passwords, access authorization, billing, and other pertinent user information. The AAA server 30 compares stored user profiles with the user data received from the gateway device 12 to determine if the user should be granted access to the network. As such, the AAA server 30 generally comprises a database and data storage means. According to one embodiment of the invention, the AAA server 30 is maintained by an ISP. In this embodiment, the user profiles stored by the AAA server 30 establish those users that can obtain Internet access via the ISP network. The ISP edits user profiles within the AAA server 30 to reflect those users who may become authorized or unauthorized to access the network.

Continuing with the illustrative example, the ISP may only register user profiles in the authentication database after users have been identified by the ISP and necessary billing information, such as addresses and credit card numbers, have been submitted. If the ISP has not posted a user profile in the AAA server 30 at the time of authentication, the user will not be permitted access to the network. If this occurs, the user may be asked to submit profile information to the ISP so that the ISP can add the user's profile to the AAA server 30. Furthermore, this may also be done the first time a user attempts to access the gateway device 12. The information may be entered by the user with the aid of webpage, a pop-up control panel or user interface, which can open when the user initially connects to the gateway device 12, as effectuated by HPR and SAT. As will be discussed below, the gateway device can request user information and forward it to the ISP such that the user does not know an ISP is receiving the information.

In an embodiment, the AAA server 30 is located outside of the gateway device, although it may alternatively be located within the gateway device. For example, the location of the AAA server 30 may be such that the NAS 28 communicates with the AAA server 30 via internet protocol. Therefore, it will be appreciated that the AAA server 30 may be located at any internet address and stored on any computer accessible via internet protocol. Locating the AAA server 30 outside the network can provide a number of advantages. First, the administrative burden on the network is alleviated because the network does not have to set up and maintain separate authentication databases on each network or gateway device. This is especially important because each gateway device 12 allows a finite number of users to access the network, so that multiple gateway devices may be required. Secondly, administering and maintaining one consolidated database of authentication data is easier than multiple smaller databases.

Referring again to the illustrative AAA example, after any requisite reconfiguration, the NAS 28 can transmit user data to the AAA server 30 with a query to request that the AAA server 30 authenticate the user. The AAA server 30 receives the user data and then compares the received user data to user profiles stored within its database. Where a customer is not identified by location, establishing access to the gateway device will typically involve a process in which a user must enter their identity and a password, and in some instances a desired billing scheme and service level as offered by the gateway administrator or network operator (information hereinafter collectively referred to as user data). Additionally, the user data can include information such as a user's social security number and a credit card number. As described briefly above and in more detail below, the gateway device can direct the user to a webpage that requests desired data. However, where the customer is identified by location, the customer may only have to choose connection options, such as fixed fee or pay-per-use access, or a particular baud rate where the user can pay a premium for a higher speed connection, as the identity of the user may be known based upon location, and the user's payment information may already be known, such as where access is obtained via a port in a hotel room.

Assuming that a user has been deemed pending or 'in progress', the gateway device typically presents users with a login page that enables new users to subscribe to the computer network so that they may subsequently obtain transparent access to networks or online services transparently through the gateway device. To direct the users to a login page the AAA server calls upon a HPR function. The HPR directs the user to the login page, and after the user has entered requisite information into the login page, the AAA server adds the new information to the customer profile database and can direct the user to the user's desired destination, such as an Internet address, or a portal page created by the network provider or users. Thus, new users can gain access to networks or online services without being predefined in the user profile database.

Because the gateway device is transparent to the user, the user communicates with the gateway device without the user's knowledge. This transparent communication results in a plug and play capability which enables a user to plug a computer into a port and directly access the internet or another online service without reconfiguring his or her computer from the home network settings resident on the computer and without requiring additional software to be loaded on the user computer. Therefore, the functions of the AAA server, and of HPR can be completely transparent to the user.

For example, utilizing the system and method of the present invention, a user who has not purchased network access, and does not receive free network access, can plug into a port of the computer network and request connection to an Internet address through the user's Internet browser. After being directed to a portal page, the AAA server, unbeknownst to the user, identifies this user as pending (i.e., no information for that user has been identified in the user profile database), and calls upon the HPR function to send the user from the portal page to a login page which is different from the destination address initially entered by the user. Specifically, the HPR function as well as the SAT, discussed below, are performed by the AAA server and/or gateway device.

In an embodiment, the redirection is accomplished by a Home Page Redirect (HPR) performed by the gateway device, a AAA server, or by a portal page redirect unit located internal to or external to the gateway device. To achieve this redirection, HPR utilizes a SAT operation to direct the user from a portal page to a new destination at which a login page is presented, which is preferably local to the gateway device so that the redirection will be efficient and fast. This is accomplished by redirecting the user to a protocol stack using network and port address translation to the portal server that can be internal to the computer network or gateway device. More specifically, the AAA server receives the user's Hyper Text Transfer Protocol (HTTP) request for a web page and sends back the HTTP response reversing the network and port address translation the portal server, essentially acting as a transparent 'go-between' to the user and new webserver. It will be appreciated, however, that to receive the HTTP request the AAA server must initially open a Transmission Control Protocol (TCP) connection to the another server in line with the user-requested internet address.

According to one aspect of the present invention, when a user initially attempts to access a destination location, the gateway device, AAA server or portal page redirect unit receives this request and routes the traffic to a protocol stack on a temporary server, which can be local to the gateway device. This can occur where a user initially opens a web browser resident on the user's computer and attempts to access a destination address, such as an Internet site. The destination address can also include any address accessible via the network or an online service, and can include the portal page. The protocol stack can pretend to be the user-entered destination location long enough to complete a connection or 'handshake'. Thereafter, this protocol stack directs the user to the portal server, which can be local to the gateway device to facilitate higher speed communication. The redirection to the portal server can be accomplished by redirecting web pages only, rather than all traffic, including E-mails, FTPs, or any other traffic. Therefore, once authorized, if a user does not attempt to access a webpage through the user's interne browser, the gateway device can forward the communication transparently to the user's requested destination without requiring the user to access the portal page. Furthermore, according to one aspect of the invention specific user-input destination addresses may be authorized to pass through the gateway device without being redirected.

Furthermore, redirecting the user to a portal page can comprise redirecting the user to a portal page created by an administrator associated with the portal page, or redirecting the user to a portal page customized by the user.

The portal page can also be specialized based on the user, user's location, user's computer, or any combination thereof. For example, assuming that the user has been authenticated and has authorization, the gateway device can present users with a portal page that identifies, among other things, the online services or other computer networks that are accessible via the gateway device. In addition, the portal page presented by the gateway device can provide information regarding the current parameters or settings that will govern the access provided to the particular user. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the user a higher rate for their service. For example, a user may elect to increase the transfer rate at which signals are transmitted across the computer network and pay a correspondingly higher price for the expedited service.

After receiving the user's login information, the AAA server will create a user profile utilizing this information so that the user will be able to obtain immediate access to the network next time the user logs in without being required to enter login information again. The AAA server can create a profile for the user in a locally stored user profile database, as described above, or can update the user profile in a database external to the gateway device. Regardless of the location of the user profile, the next time the user attempts to login the user's profile will be located in the user profile database, the user's access rights determined, and the user allowed transparent access to networks or services.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation. Systems and Methods for Redirecting Users Having Transparent Computer Access to a Network Using a Gateway Device Having Redirection Capability Systems and methods for dynamically creating new users having transparent computer access to a destination network, wherein the users otherwise have access to a home network through home network settings resident on the users' computers, and wherein the users can access the destination network without altering the home network settings. The system includes a gateway device for receiving a request from a user for access to the destination network, a user profile database comprising stored access information and in communication with the gateway device, and an Authentication, Authorization and Accounting (AAA) server in communication with the gateway device and user profile database. The AAA server determines if user is entitled to access the destination network based upon the access information stored within the user profile database, and wherein the AAA server redirects the user to a login page where the access information does not indicate the user's right to access the destination network. The systems and methods of the present invention can also redirect users having transparent computer access to a destination network, wherein the users otherwise have access to a home network through home network settings resident on the users' computers, and wherein the users can access the destination network without altering the home network settings.

In order for a computer to function properly in a network environment, the computer must be appropriately configured. Among other things, this configuration process establishes the protocol and other parameters by which the computer transmits and receives data. In one common example, a plurality of computers are networked to create a local area network (LAN). In the LAN, each computer must be appropriately configured in order to exchange data over the network. Since most networks are customized to meet a unique set of requirements, computers that are part of different networks are generally configured in different manners in order to appropriately communicate with their respective networks.

While desktop computers generally remain a part of the same network for a substantial period of time, laptops, handhelds, personal digital assistants (PDAs), cellphones or other portable computers (collectively "portable computers") are specifically designed to be transportable. As such, portable computers are connected to different networks at different times depending upon the location of the computer. In a common example in which the portable computer serves as an employee's desktop computer, the portable computer is configured to communicate with their employer's network, i.e., the enterprise network. When the employee travels, however, the portable computer may be connected to different networks that communicate in different manners. In this regard, the employee may connect the portable computer to the network maintained by an airport, a hotel, a cellular telephone network operator or any other locale in order to access the enterprise network, the Internet or some other on-line service. The portable computer is also commonly brought to the employee's residence where it is used to access various networks, such as, the enterprise network, a home network, the Internet and the like. Since these other networks are configured somewhat differently, however, the portable computer must also be reconfigured in order to properly communicate with these other networks. Typically, this configuration is performed by the user each time the portable computer is connected to a different network. As will be apparent, this repeated reconfiguration of the portable computer is not only quite time consuming, but is also prone to errors. The reconfiguration procedure may even be beyond the capabilities of many users or in violation of their employer's IT policy. Importantly, special software must also typically be loaded onto the user's computer to support reconfiguration.

As described by U.S. patent application Ser. No. 08/816, 174 and U.S. Provisional Patent Application Nos. 60/111, 497, 60/160,973, 60/161,189, 60/161,139, 60/160,890 and 60/161,182, a universal subscriber gateway device has been developed by Nomadix, Inc. of Westlake Village, Calif. The contents of these applications are incorporated herein by reference. The gateway device serves as an interface connecting the user to a number of networks or other online services. For example, the gateway device can serve as a gateway to the Internet, the enterprise network, or other networks and/or on-line services. In addition to serving as a gateway, the gateway device automatically adapts to a computer, in order that it may communicate with the new network in a manner that is transparent both to the user and the new network. Once the gateway device has appropriately adapted to the user's computer, the computer can appropriately communicate via the new network, such as the network at a hotel, at home, at an airport, or any other location, in order to access other networks, such as the enterprise network, or other online services, such as the Internet.

The portable computer user, and more specifically the remote or laptop user, benefits from being able to access a myriad of computer networks without having to undergo the time-consuming and all-too-often daunting task of reconfiguring their host computer in accordance with network specific configurations. In addition, no additional software need be loaded onto the computer prior to connection to the other network. From another perspective, the network service provider benefits from avoiding "on-site" visits and/or technical support calls from the user who is unable to properly reconfigure the portable computer. In this fashion, the gateway device is capable of providing more efficient network access and network maintenance to the user and the network operator.

Gateway devices are typically used to provide network access to the remote portable computer user, such as users in hotels, airports and other location where the remote portable computer user may reside. Additionally, gateway devices have found wide-spread use in multi-resident dwellings as a means of providing the residents an intranet that networks the residents, broadband Internet access and the capability to adapt to the variances of the resident's individual enterprise network needs. With the advent of even smaller portable computing devices, such as handhelds, PDAs, and the like, the locations where these users may reside become almost limitless.

Through gateway devices Internet Service Providers (ISPs) or enterprise network (such as a LAN established by an entity such as a hotel) providers can permit a wide variety of users simple and transparent access to their networks and to other online services. To take advantage of transparent user access to their computer networks and online services enterprise networks or ISPs should be able to redirect users to portal pages that the enterprise or internet service providers wish the user to access or view. For instance, where users are located at an airport, the enterprise network administrator may wish to direct users to a portal page containing arrival and departure information, or to a portal page having the user's itinerary thereon to provide the user an incentive to access the network. ISPs, for example, may wish users to access the ISPs portal page for up to the date news and weather, information regarding the user's Internet service, and paid advertisements.

Homepage redirection has been accomplished in the prior art. For example, America Online (AOL) users, upon accessing the internet, are directed to an AOL homepage from which the users can select a variety of AOL services, and which includes advertising from various companies. Typically, direction of users to such a page benefits the ISP because advertisers pay money to the ISP each time a user accesses the Internet, as subscribers are a captive audience to advertising. Advertisers pay for such advertising not only because of the captive audience, but because advertisers can tailor advertisements based upon the typical audience accessing the internet. Furthermore, AOL may market its services through its homepage, and its homepage may be attractive to potential subscribers. Directing users to a particular page may serve an additional function. Users may be directed to a particular page, such as a login page, so that the user may enter login information to be authenticated and authorized access on the network. Furthermore, users may wish to establish their own specialized portal page, such as a page including favorite links, a page linking the user to the user's business, or a page including any other items relevant to the user.

However, such redirection of users to homepages has been traditionally based upon software installed on a user's computer and/or configurations of user computers in communication with a home network. For example, where a user's computer is appropriately configured for access to a home network, the user's computer can be configured to access a particular homepage on that network. This can be the case, for example, in businesses where users computers are configured to access an intranet homepage or an internet page specific to that company and located on the internet.

Therefore, a method and system would be desirable which enables a user transparent access to a computer network employing a gateway device where the computer network can provide access to users and direct the users to portal pages established by the user, network administrator or another entity, where the direction is preferably based upon attributes associated with a user, such as the user's location, identity, computer, or a combination thereof. Furthermore, such redirection should be able to redirect users to a login page when the user does not otherwise have access to online services or networks so that the user may login to be authenticated and authorized access on the network.

The present invention comprises a method and system for redirecting users to a portal page where users have transparent access to a computer network utilizing a gateway device. The method and system advantageously operates in a manner transparent to the user since the user need not reconfigure their computer and no additional software need be added to the computer for reconfiguration purposes.

According to the invention, users accessing the gateway device are redirected to a portal page. Where stored user profiles permit the users access to the destination network, the users can be forwarded to the destination network or a portal page established by the network, user, or another entity. Otherwise, users are directed to a login page in which the users must input user information so that the users can obtain access to networks and online services. The redirection function according to the present invention can be utilized to direct new or existing users to customized homepages established by the gateway device or individual users.

A method for dynamically creating new users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination network, determining if the user is entitled access to the destination network based upon a user profile corresponding to the user and stored within a user profile database in communication with the gateway device, and redirecting the user to a login page when the user profile does not include rights to access the destination network. Furthermore, the method of the present invention can include the step of forwarding the user to the destination network when the user profile includes rights to access the destination network. The method can also include the step of automatically redirecting the user to a portal page following receipt of a request for access to the destination network prior to determining if the user is entitled access to the destination network According to one aspect of the invention, the method can include the step of establishing a login page on a webserver local to the gateway device prior to redirecting the user to the login page. The method can also include accepting user information at the login page which is thereafter utilized by the gateway device to authorize the user access to the destination network. The user profile database can be updated with the user information.

According to another aspect of the invention, the user may be forwarded from the login page and returned to a portal page or directed to a destination address which can be an Internet destination address. Redirecting the user to a login page can include redirecting a browser located on the user's computer to the login page. Furthermore, redirecting the browser located on the user's computer can include receiving a Hyper-Text Transfer Protocol (HTTP) request for the destination address and responding with an HTTP response corresponding to the login page.

According to another embodiment of the invention, a system for dynamically creating new users having transparent computer access to a destination network is disclosed, wherein the users otherwise have access to a home network through home network settings resident on the users' computers, and wherein the users can access the destination network without altering the home network settings. The system includes a gateway device for receiving a request from a user for access to the destination network, and a user profile database comprising stored access information and in communication with the gateway device. The system further includes an Authentication, Authorization and Accounting (AAA) server in communication with the gateway device and user profile database, where the AAA server determines if a user is entitled to access the destination network based upon the access information stored within the user profile database, and wherein the AAA server redirects the user to a login page where the access information does not indicate the user's right to access the destination network. The system can also direct the user to a portal page upon the user's access to the network, prior to determining the access rights of the user.

According to one aspect of the invention, the login page is maintained local to the gateway device. The user profile database and AAA server can also be located within the gateway device. Furthermore, the user profile database can be located within the AAA server.

According to another embodiment of the invention, the user profile database includes a plurality of user profiles, wherein each respective user profile of the plurality of user profiles contains access information. In addition, each respective user profile may contain historical data relating to the duration of destination network access for use in determining the charges due for the destination network access.

According to another embodiment of the invention, a method for redirecting users having transparent computer access to a destination network is disclosed, wherein the users otherwise have access to a home network through home network settings resident on the users' computers, and wherein the users can access the destination network without altering the home network settings. The method includes receiving at a gateway device a request from a user for access to a destination address, such as an Internet address, and redirecting the user to a portal page, wherein the user computer remains configured for accessing the home network, and wherein no additional configuration software need be installed on the user's computer. Furthermore, redirecting the user to a portal page can comprise redirecting the user to a portal page created by an administrator associated with the portal page, or redirecting the user to a portal page customized by the user.

According to another embodiment of the invention, a system for redirecting users having transparent computer access to a destination network is disclosed, where the users otherwise have access to a home network through home network settings resident on the users' computers, and wherein the users can access the destination network without altering the home network settings. The system includes a gateway device for receiving a request from a user for access to the destination network, and an AAA server in communication with the gateway device, where the AAA server intercepts the request from the user for access to the destination network and redirects the user to a portal page, wherein the user's computer remains configured for accessing the home network, and wherein no additional configuration software need be installed on the user's computer. According to one aspect of the invention, the AAA server is located entirely within the gateway device. The portal page of the system can also be maintained on a server local to the gateway device.

A unique advantage of the transparent redirection of users to a portal page, and, in certain circumstances from the portal page, to a login page where users subscribe for network access is that a user can obtain access to networks or online services without installing any software onto the user's computer. On the contrary, the entire process is completely transparent to the user. As such, the method and apparatus of the present invention facilitates transparent access to destination networks without requiring a user to reconfigure the home network settings resident on the user computer and without having to install reconfiguration software.

The method and system of the various embodiments facilitate transparent access to a destination network. According to one embodiment, the method and system facilitate the addition of new subscribers to the network. According to another embodiment, all users can be redirected to a portal page, which can include advertising, without requiring reconfiguration of the users' computers, or new software to be added on the users' computers.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIG. 1, a computer system 10 including a gateway device 12 is depicted in block diagram form. The computer system 10 typically includes a plurality of computers 14 that access a computer network in order to gain access to networks 20 or other online services 22. For example, the computers 14 can be plugged into ports that are located in different rooms of a hotel, business, or a multi-dwelling unit. Alternatively, the computers 14 can be plugged into ports in an airport, an arena, or the like. The gateway device 12 provides an interface between the plurality of computers 14 and the various networks 20 or other online services 22. One embodiment of a gateway device has been described by the aforementioned U.S. patent application Ser. No. 08/816,174.

Most commonly, the gateway device 12 is located near the computers 14 at a relatively low position in the overall network (i.e., the gateway device 12 will be located within the hotel, multi-unit residence, airport, etc.). However, the gateway device 12 can be located at a higher position in the system by being located closer to the various networks 20 or other online services 22, if so desired. For example, the gateway device 12 could be located at a network operating center or could be located before or after a router 18 in the computer network. Although the gateway device 12 can be physically embodied in many different fashions, the gateway device 12 typically includes a controller and a memory device in which software is stored that defines the operational characteristics of the gateway device 12. Alternatively, the gateway device 12 can be embedded within another network device, such as an access concentrator 16 or a router 18. Moreover, the software that defines the functioning of the gateway device 12 can be stored on a PCMCIA card that can be inserted into a computer of the plurality of computers 14 in order to automatically reconfigure the computer to communicate with a different computer system, such as the networks 20 and online services 22.

The computer system 10 typically includes an access concentrator 16 positioned between the computers 14 and the gateway device 12 for multiplexing the signals received from the plurality of computers onto a link to the gateway device 12. Depending upon the medium by which the computers 14 are connected to the access concentrator, the access concentrator 16 can be configured in different manners. For example, the access concentrator can be a digital subscriber line access multiplexer (DSLAM) for signals transmitted via regular telephone lines, a cable head end for signals transmitted via coaxial cables, a wireless access point (WAP) for signals transmitted via a wireless network, a cable modem termination shelf (CMTS), a switch or the like. As also shown in FIG. 1, the computer system 10 typically includes one or more routers 18 and/or servers (not shown in FIG. 1) to control or direct traffic to and from a plurality of computer networks 20 or other online services 22. While the computer system 10 is depicted to have a single router, the computer system 10 can have a plurality of routers, switches, bridges, or the like that are arranged in some hierarchical fashion in order to appropriately traffic to and from the various networks 20 or online services 22. In this regard, the gateway device 12 typically establishes a link with one or more routers. The routers, in turn, establish links with the servers of other networks or other online service providers, such as internet service providers, based upon the user's selection. It will be appreciated by one of ordinary skill in the art that one or more devices illustrated in FIG. 1 may be combinable. For example, although not shown, the router 18 may be located entirely within the gateway device 12.

The gateway device 12 of the present invention is specifically designed to adapt to the configuration of each of the computers 14 that log onto the computer system 10 in a manner that is transparent to the user and the computer networks 20 or online services 22. In the embodiment shown in FIG. 1, the computer system 10 employs dynamic host configuration protocol (DHCP) service, which is a protocol well known to those of skill in the art and currently implemented in many computer networks. In DHCP networks an IP address is assigned to an individual computer of the plurality of computers 14 when the computer logs onto the computer network through communication with the gateway device 12. The DHCP service can be provided by an external DHCP server 24 or it can be provided by an internal DHCP server located within the gateway device.

In order to allow a user of the computer to communicate transparently with computer networks 20 or online services 22, the gateway device must be able to communicate with the user computer, as well as the various online services 22 or networks 20. In order to support this communication, the gateway device 12 generally performs a packet translation function that is transparent to both the user and the network. In this regard, for outbound traffic from a computer to a network or on-line service, the gateway device 12 changes attributes within the packet coming from the user, such as the source address, checksum, and application specific parameters, to meet the criteria of the network to which the user has accessed. In addition, the outgoing packet includes an attribute that will direct all incoming packets from the accessed network to be routed through the gateway device. In contrast, the inbound traffic from the computer network or other online service that is routed through the gateway device undergoes a translation function at the gateway device so that the packets are properly formatted for the user's host computer. In this manner, the packet translation process that takes place at the gateway device 12 is transparent to the host, which appears to send and receive data directly from the accessed computer network. By implementing the gateway device as an interface between the user and the computer network or other online service, however, the user will eliminate the need to re-configure their computer 12 upon accessing subsequent networks as well as the need to load special configuration software on their computer to support the reconfiguration.

Communication between users and networks or online services may be effectuated through ports, for example, located within hotel rooms or multi-dwelling units, or through conventional dial-up communications, such as through the use of telephone or cable modems. According to one aspect of the invention, users can be are redirected to a portal page, as described below. After being redirected to the portal page, the user is subjected to a AAA process. Based upon the AAA process, the user may be permitted transparent access to the destination network or may be redirected to a login page in order to gather additional information to identify the user.

Identifying the user is crucial in authorizing access to networks or online services, as such services are typically provided for a fee and may be customized based upon the user, user's location, or user's computer. As discussed below, the user's identification may be used to direct the user to a specific portal page, which can be a particular webpage. As such, the system of the present invention includes means for identifying a user based upon an attribute associated with the user that is contained within the packet transmitted from the user's computer. Attributes can include any data well known in the art for identifying the user, the user's location, and/or the user's computer. In general, identifying a user's computer that accesses a network can be done by a media access control (MAC) associated with the computer. Identifying a computer based upon a MAC address is well known to those of skill in the art, and will not be discussed in detail herein. Additionally, the attribute can be based upon a user name, ID, or according to one advantageous embodiment described below, a particular location, such as from a communications port in a hotel room. As such, the location of the user can be the identifiable attribute.

According to one embodiment of the present invention, after a user accesses the computer network using a computer in communication with the gateway device 12, as described above, the user is directed to a portal page. The portal page may be maintained by an ISP or an enterprise network, or by any entry maintaining a webpage on the Internet. According to one aspect of the invention, the portal page can be a webpage containing any information whatsoever, and can be created by the ISP, enterprise network administrator or user. The portal page can contain information specific to the user accessing the network, as discussed in detail below.

Regardless of whether a user accessing the computer network is authorized access to the network, the user is redirected to a portal page. After being redirected to a portal page, the gateway device of the present invention determines the authorization and access rights of the user based upon an Authentication, Authorization and Accounting method, as described in U.S. patent application Ser. No. 09/458,602 entitled "Systems And Methods For Authorizing, Authenticating And Accounting Users Having Transparent Computer Access To A Network Using A Gateway Device" filed concurrently with this application and incorporated by reference.

According to one aspect of the invention, a user may be identified and authorized access to the network or online services based upon attributes associated with the user, such as the user's location or the user's computer. When this occurs, the user can be forwarded to a portal page unique to that user. As described below, and in the U.S. patent application incorporated by reference immediately above, the user may be identified without being queried to input any identification information so that upon accessing the computer network the user is automatically directed to a generic portal page or a portal page established specifically for and unique to that user. According to another aspect of the invention, a user may be identified and authorized access based upon the user's identity after being redirected to the portal page. The user may have to enter a login name and password while at the portal page or after being directed to a login page so that the ISP or other entity maintaining the gateway device can identify the user. After entering identifying data, the user may be directed to a particular portal page, as in the first aspect described above. According to a third aspect of the invention, the user is not authorized access to the network. Where this occurs the user will be directed from the portal page to a login page where the user will have to input identification information, such as the user's name, address, credit card number, and other relevant data so that the user may be authorized to access the network. After the user enters sufficient login data to establish authorization, the user may be redirected to a portal page.

The redirection is accomplished by a Home Page Redirect (HPR) performed by the gateway device, a AAA server, or by a portal page redirect unit located internal to or external to the gateway device. To accomplish the redirection of a user to a portal page, HPR utilizes a Stack Address Translation (SAT) operation to direct the user to the portal page, which is preferably local to the gateway device so that the redirection will be efficient and fast. This is accomplished by redirecting the user to a protocol stack using network and port address translation to the portal server that can be internal to the computer network or gateway device. More specifically, the gateway device, AAA server or portal page redirect unit receives the user's HTTP request for a web page and sends back the HTTP response reversing the network and port address translation the portal server, essentially acting as a transparent 'go-between' to the user and portal server. It will be appreciated, however, that to receive the HTTP request the gateway device, AAA server or portal page redirect unit must initially open a Transmission Control Protocol (TCP) connection to a server in line with the user-requested internet address.

According to one aspect of the present invention, when a user initially attempts to access a destination location, the gateway device, AAA server or portal page redirect unit receives this request and routes the traffic to a protocol stack on a temporary server, which can be local to the gateway device. This can occur where a user initially opens a web browser resident on the user's computer and attempts to access a destination address, such as an Internet site. The destination address can also include any address accessible via the network or an online service, and can include the portal page. The protocol stack can pretend to be the user-entered destination location long enough to complete a connection or 'handshake'. Thereafter, this protocol stack directs the user to the portal server, which can be local to the gateway device to facilitate higher speed communication. The redirection to the portal server can be accomplished by redirecting web pages only, rather than all traffic, including E-mails, FTPs, or any other traffic. Therefore, once authorized, if a user does not attempt to access a webpage through the user's internet browser, the gateway device can forward the communication transparently to the user's requested destination without requiring the user to access the portal page. Furthermore, according to one aspect of the invention specific user-input destination addresses may be authorized to pass through the gateway device without being redirected.

The portal page can also be specialized based on the user, user's location, user's computer, or any combination thereof. For example, assuming that the user has been authenticated and has authorization, the gateway device can present users with a portal page that identifies, among other things, the online services or other computer networks that are accessible via the gateway device. In addition, the portal page presented by the gateway device can provide information regarding the current parameters or settings that will govern the access provided to the particular user. As such, the gateway administrator can readily alter the parameters or other settings in order to tailor the service according to their particular application. Typically, changes in the parameters or other settings that will potentially utilize additional resources of the computer system will come at a cost, such that the gateway administrator will charge the user a higher rate for their service. For example, a user may elect to increase the transfer rate at which signals are transmitted across the computer network and pay a correspondingly higher price for the expedited service.

The portal page may include advertising tailored to the specific needs of the user. The gateway device would be capable of tailoring the material based upon user profiles in the network. The portal page may also incorporate surveys or links to surveys to provide the network provider with beneficial statistical data. As an ancillary benefit, the user who responds to the surveys may be rewarded with network access credit or upgraded quality. Additionally, the service provided could offer additional services to the user by way of the portal page or links to these services may be offered on the portal page. These services offered by the network service provider are not limited to the services related to the network connection. For example, a hotel may desire to offer the user in-room food service or a multi-unit dwelling may want to offer house cleaning service.

The portal page may also comprise information related to the status of the current network session. By way of example this information may include, current billing structure data, the category/level of service that the user has chosen, the bandwidth being provided to the user, the bytes of information currently sent or received, the current status of network connection(s) and the duration of the existing network connection(s). It is to be understood, by those skilled in the art to which this invention relates that all conceivable useful information relating to the current network session could be displayed to the user in a multitude of combinations as defined by the user and/or the gateway administrator. The gateway administrator will have the capability to dynamically change the information supplied in the portal page based on many factors, including the location of the user, the profile of the user and the chosen billing scheme and service level. The information provided in the portal page may prompt the user to adjust any number of specific parameters, such as the billing scheme, the routing, the level of service and/or other user-related parameters.

The portal page may be implemented with an object-oriented programming language such as Java developed by Sun Microsystems, Incorporated of Mountain View, Calif. The code that defines the portal page can be embodied within the gateway device, while the display monitor and the driver are located with the host computers that are in communication with the gateway device. The object oriented programming language that is used should be capable of creating executable content (i.e. self-running applications) that can be easily distributed through networking environments. The object oriented programming language should be capable of creating special programs, typically referred to as applets that can be incorporated in portal pages to make them interactive. In this invention the applets take the form of the portal pages. It should be noted that the chosen object-oriented programming language would require that a compatible web browser be implemented to interpret and run the portal page. It is also possible to implement the portal page using other programming languages, such as HTML, SGML and XML; however, these languages may not be able to provide all the dynamic capabilities that languages, such as Java provide.

By re-directing the user to the portal page the gateway administrator or network operator is provided the opportunity to present the user with updated information pertaining to the remote location (i.e. the hotel, the airport etc.). By way of example the portal page may provide for links to the corporate home page, a travel site on the Internet, an Internet search engine and a network provider home page. Additionally, the buttons or any other field within the portal page may include other types of information options, such as advertising fields or user-specific links or fields based upon data found in the user's profile or inputted by the user.

It will be appreciated that the portal page is not limited to supplying information related to the user's billing and service plans. It is also possible to configure the portal page to include information that is customized to the user or the location/site from which the user is remotely located. For example, the user may be located at a hotel for the purpose of attending a specific convention or conference either in the hotel or within the immediate vicinity of the hotel. The gateway device may have "learned" this information about the user through an initial log-on profile inquiry or the gateway administer may have inputted this information into a database.

The gateway device can store user profile information within a user-specific AAA database, as described below, or it can store and retrieve data from external databases. The gateway device can be configured to recognize these profiles and to customize the portal page accordingly. In the hotel scenario, the portal page may include a link for convention or conference services offered by the hotel.

In another example of location specific portal page data, the user may be remotely accessing the gateway device while located in a specific airport terminal. The gateway device will be configured so that it is capable of providing ready access to information related to that specific airport terminal, i.e. information pertaining to the current flights scheduled to depart and arrive that terminal, the retail services offered in that specific terminal, etc. In this manner, the portal page may include a link for terminal specific flight information and/or terminal specific retail services available to the user.

It will also be appreciated that the HPR may be configured so a user is redirected to a portal page upon specific default occurrences, such as a time out, or according to preset time. For example, the portal page may act as a screen-saver, where the user is redirected to a portal page after a given period of inactivity. These functions may be established by the ISP or enterprise network administrator.

Customization of the information comprising the portal page is not limited to the gateway administrator or the network operator. The user may also be able to customize the information that is provided in the portal page. The user customization may be accomplished either directly by the user configuring the portal page manually or indirectly from the gateway device configuring the portal page in response to data found in the user-specific profile. In the manual embodiment the user may be asked to choose which information or type of information they would like supplied in the portal page for that specific network session. For instance, the user may require an alarm clock counter to insure an appointment is met or the user may require periodical updates of a specific stock quote. The information that a user customizes for the portal page may be network session specific, may be associated with the duration of a gateway subscription or may be stored in a user profile for an indefinite period of time. The gateway device's ability to communicate with numerous user databases provides the basis for storing user specific profiles for extended periods of time.

As explained above, the portal page presented to the user can be dependent upon an attribute associated with the user, such as the user's identification, the user's location, an address associated with the user's computer, or a combination thereof. The means in which a user is identified and access rights are determined is based upon an Authentication, Authorization and Accounting (AAA) method implemented by the AAA server, and disclosed in this application.

One function of the AAA server is to identify the user in communication with the gateway device in a manner that is transparent to the user. That is, the user will not be required to reconfigure the computer or otherwise change the home network settings, and no additional configuration software will have to be added to the computer. According to one embodiment of the present invention, after a user is directed to a portal page, the AAA server can be accessed to authorize and authenticate the user. Therefore, upon accessing the network, the user may be forwarded to a generic portal page, and after the user may be authenticated, the user can be forwarded via HPR and SAT to a specialized portal page, as described above.

After receiving a request for access from a user, forwarding the user to a portal page, and identifying the user or location the AAA server then determines the access rights of the particular user. In addition to storing whether users have valid access rights, the user profile database can also include specialized access information particular to a specific location or user, such as the bandwidth of the user's access, or a portal page to which a user should be directed. For example, a user accessing the network from a penthouse may receive a higher access band rate than someone accessing the destination network from a typical hotel room. Additionally, a user profile can include historical data relating to a user's access to the network, including the amount of time a user has accessed the network. Such historical information can be used to determine any fees which may be charged to the user, or due from the user, for access. Specialized access information contained within the user profile may be established by the system administrator, or by the user who has purchased or otherwise established access to the network. For example, where a user is transparently accessing the gateway device from a hotel room, the hotel network administrator may enter user access information into the profile database based upon access rights associated with a room in the hotel. This can also be done automatically by the gateway device or a local management system, such as a hotel property management system, when the user checks into his or her room.

Assuming that a user does not have a subscription for access to the network, a login page enables new users to subscribe to the computer network so that they may subsequently obtain access to networks or online services transparently through the gateway device. The user may take steps to become authenticated so that the user's information may be recorded in the user profile database and the user is deemed valid. For example, a user may have to enter into a purchase agreement, requiring the user to enter a credit card number. If the user needs to purchase access, or if the system needs additional information about the user, the user is redirected from the portal page via HPR and SAT to a location, such as a login page, established to validate new users. SAT and HPR can intervene to direct the user to a webserver (external or internal) where the user has to login and identify themselves. Location-based information and authorization, as described in detail in U.S. patent application Ser. No. 60/161,093, incorporated herein by reference, can be sent to the portal page as part of this redirection process. This enables the portal page to be customized to include customized information, such as locale restaurant ads or train schedules.

Assuming that a user has not been authorized access to the network based upon location based identification or user input identification, the user must provide the gateway device with sufficient information to become authorized access. Where the user is not authorized access the user is forwarded via HPR and SAT from the portal page to a login page. The login page enables new users to subscribe to the computer network so that they may subsequently obtain access to networks or online services transparently through the gateway device. To direct the users to a login page the AAA server calls upon the HPR function. The HPR directs the user to the login page, and after the user has entered requisite information into the login page, the AAA server adds the new information to the customer profile database and can direct the user to the user's desired destination, such as an Internet address or can return the user to a portal page, depending upon the design of the system. Thus, new users can gain access to networks or online services without being predefined in the user profile database.

After receiving the user's login information, the AAA server will create a user profile utilizing this information so that the user will be able to obtain immediate access to the network next time the user logs in without being required to enter login information again. The AAA server can create a profile for the user in a locally stored user profile database, or can update the user profile in a database external to the gateway device. Regardless of the location of the user profile, the next time the user attempts to login the user's profile will be located in the user profile database, the user's access rights determined, and the user allowed transparent access to networks or services.

That which is claimed:

1. A method of managing access to network resources, the method being performed by a network management system in communication with a portable communication device, the method comprising:
   receiving, at a communications port of a wireless access point of the network management system from a portable communication device, a connection request for an external server, the connection request comprising one or more network packets;
   transmitting the connection request from the wireless access point to a controller of the network management system;
   determining, using the controller, whether to provide the portable communication device with access to the external server, the determination being based at least in part on comparing an attribute included in the connection request to a user profile database; and
   upon determining that the portable communication device is not at that time permitted with access to the external server, redirecting the portable communication device to an authentication system, the redirection including:
      sending transmission control protocol handshake completion data from the communications port of the wireless access point to the portable communication device in response to the connection request, said transmission control protocol handshake completion data configured to indicate that it was sent by the external server;
      receiving at the controller via the wireless access point a request from the portable communication device for a network resource of the external server;
      receiving, at the wireless access point from the controller, the redirection data comprising resource identification data that identifies the authentication system, the redirection data configured to cause the portable communication device to be redirected to the authentication system; and
      sending, from the communications port of the wireless access point to the portable communication device, a browser redirect message based upon the redirection data;
   whereby the portable communication device provides authentication-related information wherein the portable communication system can be provided access to the network resource, wherein the network management system need not communicate with the external server to redirect the portable communication device.

2. The method of claim 1, further comprising updating the user profile database upon determining that the portable communication device is to be provided with access to the network resource.

3. The method of claim 1, further comprising maintaining in the user profile database a historical log of the portable communication device's access to the network resource.

4. The method of claim 1, wherein the connection request comprises a TCP packet.

5. The method of claim 1, wherein determining whether to provide the portable communication device with access to the network resource further comprises denying the portable communication device access where the user profile database indicates that the portable communication device may not access the network resource.

6. The method of claim 1, wherein the determination of whether to provide the portable communication device with access to the requested network is based at least in part on one of a port, circuit ID, VLAN ID or MAC address.

7. The method of claim 1, further comprising:
   receiving, from the portable communication device, a second request to access a second network resource; and
   determining that the portable communication device is authorized to access the second network resource, based at least upon a MAC address included in the second request.

8. The method of claim 1, wherein the portable communication device is redirected to the authentication system by further storing the request to access the network resource.

9. The method of claim 1, wherein the portable communication device is redirected to the authentication system by further communicating request data to a redirection server, the request data being based on the connection request.

10. The method of claim 1, wherein determining whether to provide the portable communication device with access to the network resource comprises determining whether the portable communication device is authorized to access the requested network resource.

11. The method of claim 1, wherein the connection request is configured with network settings that do not correspond to the network.

12. The method of claim 1, further comprising storing the connection request to access a network resource.

13. The method of claim 1, further comprising communicating a modified request to a redirection server, the modified request being based upon the connection request to access the network resource.

14. The method of claim 1, wherein the redirection data comprises a browser redirect message.

15. The method of claim 1, wherein the method is performed by single device.

16. The method of claim 1, wherein the method is performed by multiple devices in communication with each other.

17. The method of claim 1, wherein the network management system is a gateway device.

18. The method of claim 1, wherein the request for the network resource includes header and body data, wherein request for the network resource is configured with attributes including a source address, a checksum, and a port number, wherein the checksum is calculated based at least in part on header and body data of one or more network packets, and wherein the browser redirect message comprises attributes in which at least one of a source address, a checksum, and a port number differs from those attributes of the request for the network resource.

19. The method of claim 1, wherein the authentication-related information is related to an agreement to access network resources.

20. A network management system configured to manage access to a network resource, the system comprising:
  a wireless access point configured to receive, from a portable communication device, a connection request for an external server, the connection request comprising one or more network packets; and
  a controller configured to receive the connection request from the wireless access point and determine whether to allow the portable communication device to access the external server, the determination being based at least in part on comparing one or more attributes included in the connection request to a user profile database;
  the network management system further configured to redirect the portable communication device to an authentication system, upon determining not to allow the portable communication device to access the external server at that time, the redirect including:
    sending transmission control protocol handshake completion data from the communications port of the wireless access point to the portable communication device in response to the connection request, said transmission control protocol handshake completion data configured to indicate that it was sent by the external server;
    receiving at the controller via the wireless access point a request from the portable communication device for a network resource of the external server;
    receiving, at the wireless access point from the controller, redirection data comprising resource identification data that identifies the authentication system, the redirection data configured to cause the portable communication device to be redirected to the authentication system; and
    sending, from the communications port of the wireless access point to the portable communication device, a browser redirect message based upon the redirection data;
  whereby the portable communication device submits authentication-related information wherein the portable communication system can be allowed to access the network resource, wherein the network management system need not communicate with the external server to redirect the portable communication device.

21. The network management system of claim 20, wherein the controller is further configured to maintain, in the user profile database, a historical log of the portable communication device's access to the network resource.

22. The network management system of claim 20, wherein the connection request comprises a TCP packet.

23. The network management system of claim 20, wherein determining whether to allow the portable communication device to access the network resource further comprises denying the portable communication device access where the user profile database indicates that the portable communication device may not access the network resource.

24. The network management system of claim 20, wherein the determination of whether to allow the portable communication device to access the network resource is based at least in part on one of a port, circuit ID, VLAN ID or MAC address.

25. The network management system of claim 20, wherein the wireless access point is further configured to receive, from the portable communication device, a second request to access a second network resource, and wherein the controller is further configured to determine that the portable communication device is authorized to access the second network resource, based at least upon a MAC address included in the second request.

26. The network management system of claim 20, wherein the user profile database further stores information relating to a time period associated with the portable communication device, and wherein the determination of whether to allow the portable communication device to access the network resource is further based on an amount of time that has elapsed in relation to the time period stored in the user profile database.

27. The network management system of claim 20, wherein the attribute included in the connection request comprises a link-layer header of a network packet, and wherein the determination of whether to allow the portable communication device to access the network resource is based both on the link-layer header of the network packet and on identification information provided automatically by a browser of the portable communication device.

28. The network management system of claim 20, wherein the connection request is configured with network settings that do not correspond to the network.

29. The network management system of claim 20, wherein the controller is further configured to store the connection request to access the network resource.

30. The network management system of claim 20, wherein the controller is further configured to communicate a modified request to a redirection server, the modified request being based upon the connection request to access the network resource.

31. The network management system of claim 20, wherein the redirection data comprises a browser redirect message.

32. The network management system of claim 20, wherein the controller is further configured to determine whether the portable communication device is authorized to access the network resource.

33. The network management system of claim 20, wherein the network management system is a gateway device.

34. The network management system of claim 20, wherein the request for the network resource is configured with attributes including a source address, a checksum, and a port number, wherein the checksum allows for verifying correct data transmission, and wherein the browser redirect message comprises attributes in which at least one of a source address, a checksum, and a port number differs from those attributes of the request for the network resource.

35. The network management system of claim 20, wherein the authentication-related information is related to an agreement to access network resources.

36. A method of accessing a network resource of an external server by a portable communication device, the method performed by a network management system in communication with the portable communication device, the method comprising:
  receiving, at a communications port of a wireless access point of the network management system from a portable communication device, a connection request for an external server, the connection request comprising one or more network packets;
  transmitting the connection request from the wireless access point to a controller of the network management system;
  determining, using the controller, whether to provide the portable communication device with access to the external server, the determination being based at least in part on comparing one or more attributes included in the connection request to a user profile database;
  sending transmission control protocol handshake completion data from the communications port of the wireless access point to the portable communication device in response to the connection request, said transmission control protocol handshake completion data configured to indicate that it was sent by the external server;
  receiving, at the wireless access point from the controller, redirection data comprising resource identification data that identifies an authentication system, the redirection data configured to cause the portable communication device to be redirected to the authentication system; and
  sending, from the communications port of the wireless access point to the portable communication device, a browser redirect message based upon the redirection data, the browser redirect message being sent upon a determination not to provide the portable communication device with access to the external server at that time;
  whereby the portable communication device transmits authentication-related information wherein the portable communication system can be provided access to a network resource of the external server, wherein the network management system need not communicate with the external server to redirect the portable communication device.

37. The method of claim 36, further comprising updating the user profile database upon determining to provide the portable communication device with access to the network resource.

38. The method of claim 36, further comprising maintaining in the user profile database a historical log of the portable communication device's access to the network resource.

39. The method of claim 36, wherein the connection request comprises a TCP packet.

40. The method of claim 36, wherein determining whether to provide the portable communication device with access to the network resource further comprises denying the portable communication device access where the user profile database indicates that the portable communication device may not access the network resource.

41. The method of claim 36, wherein the determination of whether to provide the portable communication device with access to the network resource is one of a port, circuit ID, VLAN ID or MAC address.

42. The method of claim 36, further comprising:
  receiving, from the portable communication device, a second request to access a second network resource; and
  determining to provide the portable communication device with access to the second network resource, based at least upon a MAC address included in the second request.

43. The method of claim 36, further comprising storing the request to access the network resource.

44. The method of claim 36, wherein receiving, from a portable communication device, a connection request to access a network resource comprises receiving, from a portable communication device via a network, a request to access a network resource.

45. The method of claim 36, wherein the determination of whether to provide the portable communication device with access to the network resource is based at least in part on a port.

46. The method of claim 36, wherein the determination of whether to provide the portable communication device with access to the network resource is based at least in part on a circuit ID.

47. The method of claim 36, wherein the determination of whether to provide the portable communication device with access to the network resource is based at least in part on a VLAN ID.

48. The method of claim 36, wherein the determination of whether to provide the portable communication device with access to the network resource is based at least in part on a MAC address.

49. The method of claim 36, further comprising communicating request-related data to a redirection server, the request-related data being based on the connection request.

50. The method of claim 36, wherein the resource identification data is a URL.

51. The method of claim 36, wherein the resource identification data is a network address.

52. The method of claim 36, wherein the step of determining whether to provide the portable communication device with access to the network resource precedes the step of receiving the redirection data.

53. The method of claim 36, wherein determining whether to provide the portable communication device with access to the network resource comprises determining whether the portable communication device is authorized to access the requested network resource.

54. The method of claim 36, further comprising redirecting, upon determining that the portable communication device is not authorized to access the requested network resource, the portable communication device to an authentication system.

55. The method of claim 36, further comprising communicating a modified request to a redirection server, the modified request being based upon the request to access the network resource.

56. The method of claim 36, wherein the redirection data comprises a browser redirect message.

57. The method of claim 36, wherein the method is performed by single device.

58. The method of claim 36, wherein the method is performed by multiple devices in communication with each other.

59. The method of claim 36, wherein the network management system is a gateway device.

60. The method of claim 36, wherein the request for the network resource comprises attributes including a source address, a checksum, and a port number, wherein the checksum allows for verifying correct data transmission, and wherein the browser redirect message comprises attributes in which at least one of a source address, a checksum, and a port number differs from those attributes of the request for the network resource.

61. The method of claim 36, wherein the authentication-related information is related to an agreement to access network resources.

62. A network management system configured to manage access of a portable communication device to a network resource of an external server, the system comprising:
   a wireless access point configured to receive, from a portable communication device, a connection request for an external server, the connection request comprising one or more network packets; and
   a controller configured to receive the connection request from the wireless access point and determine whether to allow the portable communication device to access the external server, the determination being based at least in part on comparing an attribute included in the connection request to a user profile database;
   the network management system further configured to redirect the portable communication device to an authentication system, by performing operations comprising:
      sending transmission control protocol handshake completion data from the communications port of the wireless access point to the portable communication device in response to the connection request, said transmission control protocol handshake completion data configured to indicate that it was sent by the external server;
      receiving, at the wireless access point from the controller, redirection data comprising resource identification data that identifies the authentication system, the redirection data configured to cause the portable communication device to be redirected to the authentication system; and
      sending, from the communications port of the wireless access point to the portable communication device, a browser redirect message based upon the redirection data, the browser redirect message being sent as a result of the determination not to allow the portable communication device to access the network resource;
   whereby the portable communication device transmits authentication-related information wherein the portable communication system can be allowed to access a network resource of the external server, wherein the network management system need not communicate with the external server to redirect the portable communication device.

63. The network management system of claim 62, wherein the controller is further configured to maintain, in the user profile database, a historical log of the portable communication device's access to the network resource.

64. The network management system of claim 62, wherein the connection request comprises a TCP packet.

65. The network management system of claim 62, wherein determining whether to allow the portable communication device to access the network resource further comprises denying the portable communication device access where the user profile database indicates that the portable communication device may not access the network resource.

66. The network management system of claim 62, wherein the determination of whether to allow the portable communication device to access the network resource is based at least in part on one of a port, circuit ID, VLAN ID or MAC address.

67. The network management system of claim 62, wherein the wireless access point is further configured to receive, from the portable communication device, a second request to access a second network resource, and wherein the controller is further configured to determine that the portable communication device is allowed to access the second network resource, based at least upon a MAC address included in the second request.

68. The system of claim 62, wherein the user profile database further stores information relating to a time period associated with the portable communication device, and wherein the determination of whether the portable communication device is allowed to access the network resource is further based on an amount of time that has elapsed in relation to the time period stored in the user profile database.

69. The system of claim 62, wherein the connection request comprises a link-layer header of a network packet, and wherein the determination of whether the portable communication device is allowed to access the network resource is based both on the link-layer header of the network packet and on identification information provided automatically by a browser of the portable communication device.

70. The system of claim 62, wherein the controller further configured to store the connection request to access the network resource.

71. The system of claim 62, wherein the portable communication device communicates with the wireless access point via a network.

72. The network management system of claim 62, wherein the controller is configured to determine whether to allow the portable communication device to access the requested network resource based at least in part on a port.

73. The network management system of claim 62, wherein the controller is configured to determine whether to allow the portable communication device to access the requested network resource based at least in part on a circuit ID.

74. The network management system of claim 62, wherein the controller is configured to determine whether to allow the portable communication device to access the requested network resource based at least in part on a VLAN ID.

75. The network management system of claim 62, wherein the controller is configured to determine whether to provide the portable communication device with access to the requested network is based at least in part on a MAC address.

76. The network management system of claim 62, wherein the controller is further configured to communicate request-related to a redirection server, the request-related data being based on the connection request.

77. The network management system of claim 62, wherein the resource identification data is a URL.

78. The network management system of claim 62, wherein the resource identification data is a network address.

79. The network management system of claim 62, wherein the controller is further configured to determine whether to provide the portable communication device with access to the network resource prior to receiving the redirection data.

80. The network management system of claim 62, wherein the controller is further configured to determine whether the portable communication device is authorized to access the network resource.

81. The network management system of claim 62, wherein the controller is further configured to redirect upon determining that the portable communication device is not authorized to access the requested network resource.

82. The network management system of claim 62, wherein the controller is further configured to communicate a modified request to a redirection server, the modified request being based upon the request to access the network resource.

83. The network management system of claim 62, wherein the redirection data comprises a browser redirect message.

84. The network management system of claim 62, wherein the controller is comprised in the same housing.

85. The network management system of claim 62, wherein the controller is comprised in the separate housings.

86. The network management of claim 62, wherein the network management system is a gateway device.

87. The network management system of claim 62, wherein the request for the network resource comprises a source address, a checksum allowing for verification of correct data transmission, a port number, and a resource locator that identifies the network resource, and wherein the browser redirect message includes at least one of a source address, a checksum, and a port number that differs from those attributes of the request for the network resource.

88. The network management system of claim 62, wherein the authentication-related information is related to an agreement to access network resources.

\* \* \* \* \*